US012634077B2

(12) United States Patent
Nilsson et al.

(10) Patent No.: US 12,634,077 B2
(45) Date of Patent: May 19, 2026

(54) SRS ENHANCEMENT FOR DOPPLER ESTIMATION

(71) Applicant: Telefonaktiebolaget LM Ericsson (publ), Stockholm (SE)

(72) Inventors: Andreas Nilsson, Gothenburg (SE); Eleftherios Karipidis, Stockholm (SE); Sven Jacobsson, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 292 days.

(21) Appl. No.: 18/554,061

(22) PCT Filed: Apr. 5, 2022

(86) PCT No.: PCT/EP2022/058994
§ 371 (c)(1),
(2) Date: Oct. 5, 2023

(87) PCT Pub. No.: WO2022/214475
PCT Pub. Date: Oct. 13, 2022

(65) Prior Publication Data

US 2024/0372664 A1     Nov. 7, 2024

Related U.S. Application Data

(60) Provisional application No. 63/171,511, filed on Apr. 6, 2021.

(51) Int. Cl.
H04L 5/00          (2006.01)
(52) U.S. Cl.
CPC .......... H04L 5/0048 (2013.01); H04L 5/0012 (2013.01); H04L 5/0053 (2013.01)

(58) Field of Classification Search
CPC ... H04L 5/0048; H04L 5/0012; H04L 5/0053; H04L 5/0007; H04L 5/0023; H04L 5/0094
See application file for complete search history.

(56) References Cited

U.S. PATENT DOCUMENTS

| | | | | |
|---|---|---|---|---|
| 2020/0112349 A1* | 4/2020 | Yang | .................... | H04B 7/0404 |
| 2020/0313932 A1* | 10/2020 | Sun | .................... | H04W 74/0808 |
| 2021/0135823 A1* | 5/2021 | Zhang | .................. | H04B 7/0684 |
| 2022/0209914 A1* | 6/2022 | Khoshnevisan | ...... | H04L 5/0091 |

(Continued)

FOREIGN PATENT DOCUMENTS

| | | |
|---|---|---|
| WO | 2019029651 A1 | 2/2019 |
| WO | 2020056180 A1 | 3/2020 |

OTHER PUBLICATIONS

"RAN1 Chairman's Notes", 3GPP TSG RAN WG1 Meeting #103-e, e-Meeting, Oct. 26-Nov. 13, 2020, 1-231.

(Continued)

*Primary Examiner* — Redentor Pasia
(74) *Attorney, Agent, or Firm* — Murphy, Bilak & Homiller, PLLC

(57)          ABSTRACT

A communication device transmits a first SRS at a first time instance and a second SRS at a second time instance separated in time by a gap period from the first time instance. The communication device transmits the first SRS and the second SRS using a same antenna port, without transmitting other SRS signals from the same antenna port during the gap period.

20 Claims, 37 Drawing Sheets

Radio Access Network (RAN)
Node Operations

CONFIGURE A COMMUNICATION DEVICE TO TRANSMIT A FIRST SRS AT A FIRST TIME INSTANCE AND A SECOND SRS AT A SECOND TIME INSTANCE SEPARATED IN TIME BY A GAP PERIOD FROM THE FIRST TIME INSTANCE
3200

CONFIGURE THE COMMUNICATION DEVICE TO TRANSMIT THE FIRST SRS AND THE SECOND SRS USING A SAME ANTENNA PORT AND TO NOT TRANSMIT OTHER SRS SIGNALS FROM THE SAME ANTENNA PORT DURING THE GAP PERIOD
3202

CONFIGURE THE COMMUNICATION DEVICE TO TRANSMIT THE FIRST SRS AND THE SECOND SRS USING A SAME ANTENNA PORT AND TO NOT TRANSMIT OTHER SRS SIGNALS FROM THE SAME ANTENNA PORT DURING THE GAP PERIOD
3204

(56) References Cited

U.S. PATENT DOCUMENTS

| | | | | | |
|---|---|---|---|---|---|
| 2022/0312440 | A1* | 9/2022 | Bagheri | .............. | H04W 72/044 |
| 2022/0337362 | A1* | 10/2022 | Jiang | .................... | H04L 5/0051 |
| 2022/0338027 | A1* | 10/2022 | Gao | .................... | H04B 7/0602 |
| 2022/0393823 | A1* | 12/2022 | Fan | ....................... | H04L 1/1819 |
| 2023/0032326 | A1* | 2/2023 | Levitsky | .............. | H04L 5/0048 |
| 2023/0209537 | A1* | 6/2023 | Kang | ................... | H04L 1/1893 |
| | | | | | 370/329 |

OTHER PUBLICATIONS

3GPP, "3GPP TS 38.211 V16.5.0", 3rd Generation Partnership Project; Technical Specification Group Radio Access Network; NR; Physical channels and modulation (Release 16), Mar. 2021, 1-134.

3GPP, "3GPP TS 38.306 V16.4.0", 3rd Generation Partnership Project; Technical Specification Group Radio Access Network; NR; User Equipment (UE) radio access capabilities (Release 16), Mar. 2021, 1-62.

3GPP, "3rd Generation Partnership Project; Technical Specification Group Radio Access Network; NR; Physical layer procedures for control (Release 16)", 3GPP TS 38.213 V16.5.0, Mar. 2021, 1-183.

3GPP, "3rd Generation Partnership Project; Technical Specification Group Radio Access Network; NR; Physical layer procedures for data (Release 16)", 3GPP TS 38.214 V16.5.0, Mar. 2021, 1-171.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, 1-906.

3GPP, "3rd Generation Partnership Project; Technical Specification Group Radio Access Network; NR; Radio Resource Control (RRC) protocol specification (Release 16)", 3GPP TS 38.331 V16.4.1, Mar. 2021, 1-949.

3GPP, "3rd Generation Partnership Project; Technical Specification Group Radio Access Network; NR; Requirements for support of radio resource management (Release 16)", 3GPP TS 38.133 V16. 2.0, Dec. 2019, 1-1129.

Catt, "PRACH design and UL timing management", 3GPP TSG RAN WG1 Meeting #99, R1-1912165, Reno, USA, Nov. 18-22, 2019, 1-6.

Intel Corporation, "Summary of AI: 8.1.2.4 Enhancements on HST-SFN deployment", 3GPP TSG RAN WG1 Meeting #102-e, R1-2007201, e-Meeting, Aug. 17-28, 2020, 1-22.

Qualcomm Incorporated, "Enhancements on HST-SFN deployment", 3GPP TSG-RAN WG1 Meeting #102-e, R1-2006794, e-Meeting, Aug. 17-28, 2020, 1-15.

Qualcomm Incorporated, "Enhancements on HST-SFN deployment", 3GPP TSG-RAN WG1 Meeting #104-e, R1-2101450, e-Meeting, Jan. 25-Feb. 5, 2021, 1-29.

Qualcomm Incorporated, "Enhancements on HST-SFN deployment", 3GPP TSG-RAN WG1 Meeting #102-e, R1-2009254, e-Meeting, Oct. 26-Nov. 13, 2020, 1-22.

Unknown, Author, "RAN1 Chairman's Notes", 3GPP TSG RAN WG1 Meeting #104-e, e-Meeting, Jan. 25-Feb. 5, 2021, 1-159.

\* cited by examiner

```
SRS-Resource ::=                        SEQUENCE {
    srs-ResourceId                          SRS-ResourceId,
    nrofSRS-Ports                           ENUMERATED {port1, ports2, ports4},
    ptrs-PortIndex                          ENUMERATED {n0, n1 }         OPTIONAL,    -- Need R
    transmissionComb                        CHOICE {
        n2                                      SEQUENCE {
            combOffset-n2                           INTEGER (0..1),
            cyclicShift-n2                          INTEGER (0..7)
        },
        n4                                      SEQUENCE {
            combOffset-n4                           INTEGER (0..3),
            cyclicShift-n4                          INTEGER (0..11)
        }
    },
    resourceMapping                         SEQUENCE {
        startPosition                           INTEGER (0..5),
        nrofSymbols                             ENUMERATED {n1, n2, n4},
        repetitionFactor                        ENUMERATED {n1, n2, n4}
    },
    freqDomainPosition                      INTEGER (0..67),
    freqDomainShift                         INTEGER (0..268),
    freqHopping                             SEQUENCE {
        c-SRS                                   INTEGER (0..63),
        b-SRS                                   INTEGER (0..3),
        b-hop                                   INTEGER (0..3)
    },
    groupOrSequenceHopping                  ENUMERATED { neither, groupHopping, sequenceHopping },
    resourceType                            CHOICE {
        aperiodic                               SEQUENCE {
            ...
        },
        semi-persistent                         SEQUENCE {
            periodicityAndOffset-sp                 SRS-PeriodicityAndOffset,
            ...
        },
        periodic                                SEQUENCE {
            periodicityAndOffset-p                  SRS-PeriodicityAndOffset,
            ...
        }
    },
    sequenceId                              INTEGER (0..1023),
    spatialRelationInfo                     SRS-SpatialRelationInfo      OPTIONAL,    -- Need R
    ...,
    [[
    resourceMapping-r16                     SEQUENCE {
        startPosition-r16                       INTEGER (0..13),
        nrofSymbols-r16                         ENUMERATED {n1, n2, n4},
        repetitionFactor-r16                    ENUMERATED {n1, n2, n4}
    }                                                                    OPTIONAL    -- Need R
    ]]

```
SRS-ResourceSet ::=              SEQUENCE {
    srs-ResourceSetId                SRS-ResourceSetId,
    srs-ResourceIdList               SEQUENCE (SIZE(1..maxNrofSRS-ResourcesPerSet)) OF SRS-ResourceId   OPTIONAL,   -- Cond Setup
    resourceType                     CHOICE {
        aperiodic                        SEQUENCE {
            aperiodicSRS-ResourceTrigger     INTEGER (1..maxNrofSRS-TriggerStates-1),
            csi-RS                           NZP-CSI-RS-ResourceId                                       OPTIONAL,   -- Cond NonCodebook
            slotOffset                       INTEGER (1..32)                                             OPTIONAL,   -- Need S
            ...,
            [[
            aperiodicSRS-ResourceTriggerList      SEQUENCE (SIZE(1..maxNrofSRS-TriggerStates-2))
                                                    OF INTEGER (1..maxNrofSRS-TriggerStates-1)           OPTIONAL    -- Need M
            ]]
        },
        semi-persistent                  SEQUENCE {
            associatedCSI-RS                 NZP-CSI-RS-ResourceId                                       OPTIONAL,   -- Cond NonCodebook
            ...
        },
        periodic                         SEQUENCE {
            associatedCSI-RS                 NZP-CSI-RS-ResourceId                                       OPTIONAL,   -- Cond NonCodebook
            ...
        }
    },
    usage                            ENUMERATED {beamManagement, codebook, nonCodebook, antennaSwitching},
    alpha                            Alpha                                                              OPTIONAL,   -- Need S
    p0                               INTEGER (-202..24)                                                 OPTIONAL,   -- Cond Setup
    pathlossReferenceRS              PathlossReferenceRS-Config                                         OPTIONAL,   -- Need M
    srs-PowerControlAdjustmentStates ENUMERATED { sameAsFci2, separateClosedLoop}                      OPTIONAL,   -- Need S
    ...,
    [[
    pathlossReferenceRSList-r16      SetupRelease { PathlossReferenceRSList-r16}                        OPTIONAL    -- Need M
    ]]
}
```

Figure 4

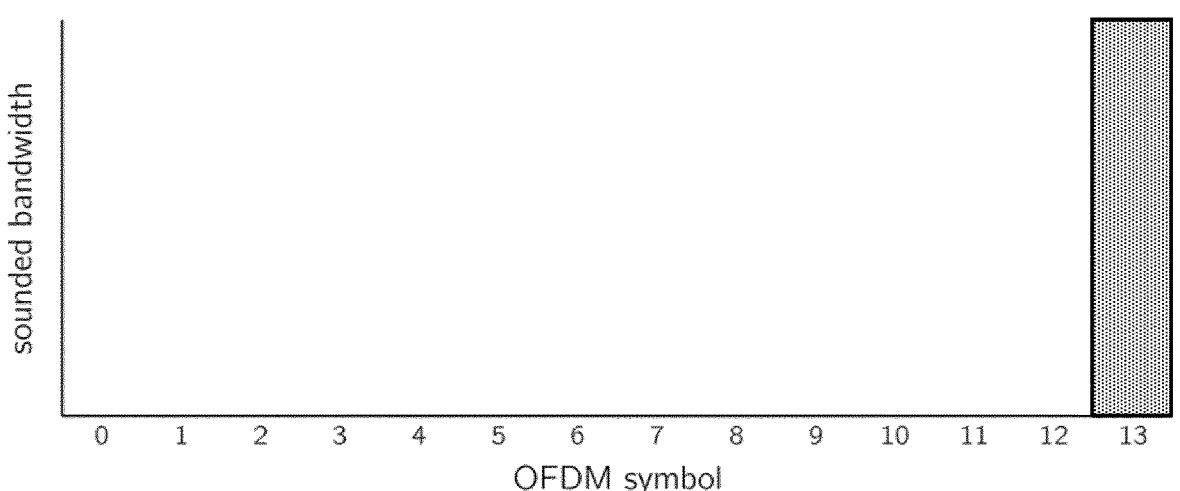
Figure 5
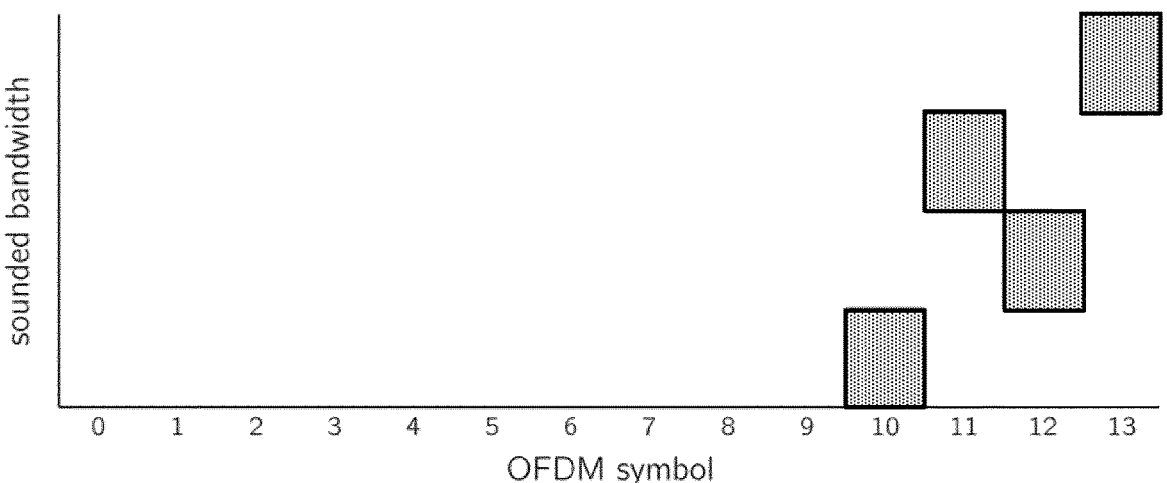
Figure 6

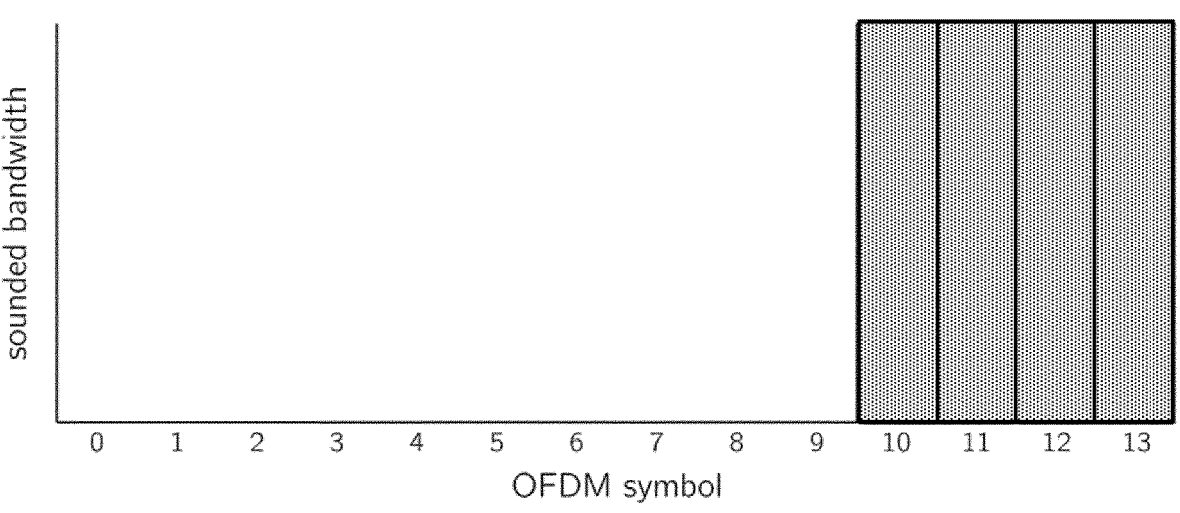
Figure 7
Figure 9
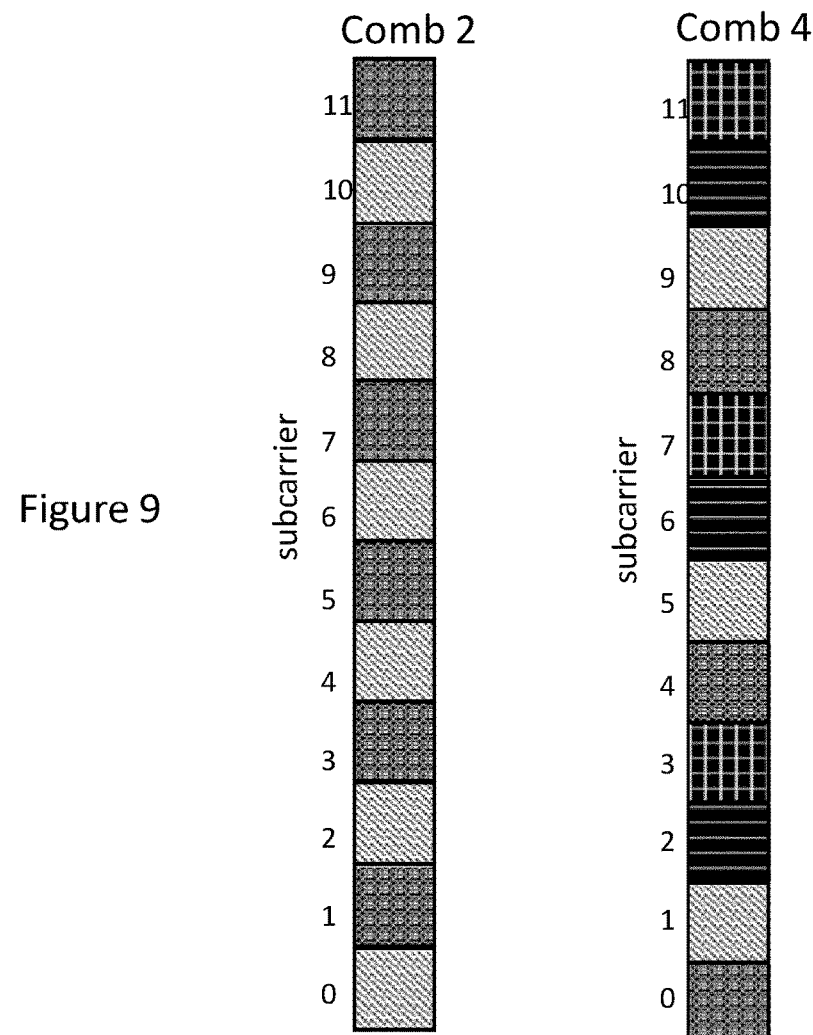

| supportedSRS-TxPortSwitch | supportedSRS-TxPortSwitch-v1610 |
|---|---|
| t1r2 | t1r1-t1r2 |
| t1r4 | t1r1-t1r2-t1r4 |
| t2r4 | t1r1-t1r2-t2r2-t2r4 |
| t2r2 | t1r1-t2r2 |
| t4r4 | t1r1-t2r2-t4r4 |
| t1r4-t2r4 | t1r1-t1r2-t2r2-t1r4-t2r4 |

UL SF with new SRS option

| Carrier freq. | Mobility | Doppler | Ideal time duration/gap with 90 deg phase shift | | |
|---|---|---|---|---|---|
| f0 (GHz) | v (km/h) | fd (Hz) | d(ms) | d(OFDM symbols for 15 kHz SCS) | d(OFDM symbols for 30 kHz SCS) |
| 2 | 100 | 185 | 1.4 | 19 | 38 |
| 2 | 200 | 370 | 0.7 | 9 | 19 |
| 2 | 300 | 556 | 0.5 | 6 | 9 |
| 2 | 400 | 741 | 0.3 | 5 | 6 |
| 2 | 500 | 926 | 0.3 | 4 | 5 |
| | | | | | |
| 6 | 100 | 556 | 0.5 | 6 | 12 |
| 6 | 200 | 1111 | 0.2 | 3 | 6 |
| 6 | 300 | 1667 | 0.2 | 2 | 3 |
| 6 | 400 | 2222 | 0.1 | 2 | 2 |
| 6 | 500 | 2778 | 0.3 | 1 | 2 |

Figure 15

| Carrier freq. | Mobility | Doppler | Ideal time duration/gap with 90 deg phase shift | | |
|---|---|---|---|---|---|
| f0 (GHz) | v (km/h) | fd (Hz) | d(ms) | d(OFDM symbols for 60 kHz SCS) | d(OFDM symbols for 120 kHz SCS) |
| 30 | 100 | 2778 | 0.09 | 5 | 10 |
| 30 | 200 | 5556 | 0.045 | 3 | 5 |
| 30 | 300 | 8333 | 0.03 | 2 | 3 |
| 30 | 400 | 11111 | 0.02 | 1 | 2 |
| 30 | 500 | 13889 | 0.02 | 1 | 1 |

Figure 16

```
SRS-Resource ::=       SEQUENCE {
    srs-ResourceId             SRS-ResourceId,
    nrofSRS-Ports              ENUMERATED {port1, ports2, ports4},
    ptrs-PortIndex             ENUMERATED {n0, n1 }        OPTIONAL,   -- Need R
    transmissionComb           CHOICE {
        n2                         SEQUENCE {
            combOffset-n2              INTEGER (0..1),
            cyclicShift-n2             INTEGER (0..7)
        },
        n4                         SEQUENCE {
            combOffset-n4              INTEGER (0..3),
            cyclicShift-n4             INTEGER (0..11)
        }
    },
    resourceMapping            SEQUENCE {
        startPosition              INTEGER (0..5),
        nrofSymbols                ENUMERATED {n1, n2, n4},
        repetitionFactor           ENUMERATED {n1, n2, n4}
    },
    freqDomainPosition         INTEGER (0..67),
    freqDomainShift            INTEGER (0..268),
    freqHopping                SEQUENCE {
        c-SRS                      INTEGER (0..63),
        b-SRS                      INTEGER (0..3),
        b-hop                      INTEGER (0..3)
    },
    sequenceId                 INTEGER (0..1023),
    spatialRelationInfo        SRS-SpatialRelationInfo        OPTIONAL,   -- Need R
    ...,
    [[
    resourceMapping-r16        SEQUENCE {
        startPosition-r16          INTEGER (0..13),
        nrofSymbols-r16            ENUMERATED {n1, n2, n4},
        repetitionFactor-r16       ENUMERATED {n1, n2, n4}
    }                                               OPTIONAL    -- Need R
    resourceMapping-r17        SEQUENCE {
        startPosition-r17          INTEGER (0..13),
        nrofSymbols-r17            ENUMERATED {n1, n2, n4, n8, n12},
        repetitionFactor-r17       ENUMERATED {n1, n2, n4, n8, n12}
    }                                               OPTIONAL    -- Need R
    }
    ]]
}
```

Figure 18

- SRS resource set
  - dopplerEstimationFlag-r17 = true
  - SRS resource 1
    - startPosition = 12
    - nrofSymbols  = 1
    - repetitionFactor = 1
  - SRS resource 2
    - startPosition = 0
    - nrofSymbols  = 1
    - repetitionFactor = 1

- SRS resource set
  - SRS resource 1
    - startPosition = 8
    - nrofSymbols  = 1
    - repetitionFactor = 1
    - dopplerRepetitionFactor-r17 = 3
    - dopplerRepetitionGap-r17 = 3

```
SRS-Resource ::=            SEQUENCE {
    srs-ResourceId              SRS-ResourceId,
    nrofSRS-Ports               ENUMERATED {port1, ports2, ports4},
    ptrs-PortIndex              ENUMERATED {n0, n1 }         OPTIONAL,        -- Need R
    transmissionComb            CHOICE {
        n2                          SEQUENCE {
                                        combOffset-n2               INTEGER (0..1),
                                        cyclicShift-n2              INTEGER (0..7)
                                    },
        n4                          SEQUENCE {
                                        combOffset-n4               INTEGER (0..3),
                                        cyclicShift-n4              INTEGER (0..11)
                                    }
                                },
    resourceMapping             SEQUENCE {
        startPosition               INTEGER (0..5),
        nrofSymbols                 ENUMERATED {n1, n2, n4},
        repetitionFactor            ENUMERATED {n1, n2, n4}
                                },
    freqDomainPosition          INTEGER (0..67),
    freqDomainShift             INTEGER (0..268),
    freqHopping                 SEQUENCE {
        c-SRS                       INTEGER (0..63),
        b-SRS                       INTEGER (0..3),
        b-hop                       INTEGER (0..3)
                                },
    sequenceId                  INTEGER (0..1023),
    spatialRelationInfo         SRS-SpatialRelationInfo      OPTIONAL,        -- Need R
    ...,
    [[
    resourceMapping-r16         SEQUENCE {
        startPosition-r16           INTEGER (0..13),
        nrofSymbols-r16             ENUMERATED {n1, n2, n4},
        repetitionFactor-r16        ENUMERATED {n1, n2, n4}
                                }                            OPTIONAL         -- Need R
    resourceMapping-r17         SEQUENCE {
        startPosition-r17           INTEGER (0..13),
        nrofSymbols-r17             ENUMERATED {n1, n2, n4, n8, n12},
        repetitionFactor-r17        ENUMERATED {n1, n2, n4, n8, n12}
                                }                            OPTIONAL         -- Need R
    ]]
    dopplerEstimation-r17       Boolean
}
```

```
SRS-Resource ::=      SEQUENCE {
    srs-ResourceId        SRS-ResourceId,
    nrofSRS-Ports         ENUMERATED {port1, ports2, ports4},
    ptrs-PortIndex        ENUMERATED {n0, n1 }      OPTIONAL,    -- Need R
    transmissionComb      CHOICE {
        n2                    SEQUENCE {
            combOffset-n2         INTEGER (0..1),
            cyclicShift-n2        INTEGER (0..7)
        },
        n4                    SEQUENCE {
            combOffset-n4         INTEGER (0..3),
            cyclicShift-n4        INTEGER (0..11)
        }
    },
    resourceMapping       SEQUENCE {
        startPosition         INTEGER (0..5),
        nrofSymbols           ENUMERATED {n1, n2, n4},
        repetitionFactor      ENUMERATED {n1, n2, n4}
    },
    freqDomainPosition    INTEGER (0..67),
    freqDomainShift       INTEGER (0..268),
    freqHopping           SEQUENCE {
        c-SRS                 INTEGER (0..63),
        b-SRS                 INTEGER (0..3),
        b-hop                 INTEGER (0..3)
    },
    sequenceId            INTEGER (0..1023),
    spatialRelationInfo   SRS-SpatialRelationInfo      OPTIONAL,    -- Need R
    ...,
    [[
    resourceMapping-r16   SEQUENCE {
        startPosition-r16     INTEGER (0..13),
        nrofSymbols-r16       ENUMERATED {n1, n2, n4},
        repetitionFactor-r16  ENUMERATED {n1, n2, n4}
    }                                                  OPTIONAL    -- Need R
    resourceMapping-r17   SEQUENCE {
        startPosition-r17     INTEGER (0..13),
        nrofSymbols-r17       ENUMERATED {n1, n2, n4, n8, n12},
        repetitionFactor-r17  ENUMERATED {n1, n2, n4, n8, n12}
    }                                                  OPTIONAL    -- Need R
    dopplerRepetitionFactor-r17   INTEGER (1..4),
    dopplerRepetitionGap-r17      INTEGER (0..12),
    ]]
}
```

SRS resource set
   SRS resource 1
      startPosition = 9
      nrofSymbols  = 2
      repetitionFactor = 2
      dopplerRepetitionFactor-r17 = 3
      dopplerRepetitionGap-r17 = 2

SRS resource set
   SRS resource 1
      startPosition-r17 = 12
      nrofSymbols-r17  = 8
      repetitionFactor-r17 = 2
      No frequency hopping

- SRS resource set
    - SRS resource 1
        - startPosition = 8
        - nrofSymbols = 1
        - repetitionFactor = 1
        - dopplerRepetitionFactor-r17 = 3
        - dopplerRepetitionGap-r17 = 3

- SRS resource 2
        - startPosition = 10
        - nrofSymbols = 1
        - repetitionFactor = 1
        - dopplerRepetitionFactor-r17 = 3
        - dopplerRepetitionGap-r17 = 3

- SRS resource set
  - SRS resource 1
    - startPosition-r17 = 12
    - nrofSymbols-r17 = 10
    - repetitionFactor-r17 = 4
    - No frequency hopping

- SRS resource set
  - SRS resource 1
    - startPosition-r17 = 12
    - nrofSymbols-r17 = 10
    - repetitionFactor-r17 = 4
    - No frequency hopping

Figure 28

```
SRS-Resource ::=            SEQUENCE {
    srs-ResourceId              SRS-ResourceId,
    nrofSRS-Ports               ENUMERATED {port1, ports2, ports4},
    ptrs-PortIndex              ENUMERATED {n0, n1 }    OPTIONAL,    -- Need R
    transmissionComb            CHOICE {
        n2                          SEQUENCE {
            combOffset-n2               INTEGER (0..1),
            cyclicShift-n2              INTEGER (0..7)
        },
        n4                          SEQUENCE {
            combOffset-n4               INTEGER (0..3),
            cyclicShift-n4              INTEGER (0..11)
        }
    },
    resourceMapping             SEQUENCE {
        startPosition               INTEGER (0..5),
        nrofSymbols                 ENUMERATED {n1, n2, n4},
        repetitionFactor            ENUMERATED {n1, n2, n4}
    },
    freqDomainPosition          INTEGER (0..67),
    freqDomainShift             INTEGER (0..268),
    freqHopping                 SEQUENCE {
        c-SRS                       INTEGER (0..63),
        b-SRS                       INTEGER (0..3),
        b-hop                       INTEGER (0..3)
    },
    sequenceId                  INTEGER (0..1023),
    spatialRelationInfo         SRS-SpatialRelationInfo    OPTIONAL,    -- Need R
    ...,
    [[
    resourceMapping-r16         SEQUENCE {
        startPosition-r16           INTEGER (0..13),
        nrofSymbols-r16             ENUMERATED {n1, n2, n4},
        repetitionFactor-r16        ENUMERATED {n1, n2, n4}
    }                           OPTIONAL    -- Need R
    resourceMapping-r17         SEQUENCE {
        startPosition-r17           INTEGER (0..13),
        nrofSymbols-r17             ENUMERATED {n1, n2, n4, n8, n12},
        repetitionFactor-r17        ENUMERATED {n1, n2, n4, n8, n12}
    }                           OPTIONAL    -- Need R
    ]]
    dopplerEst-r17              Boolean
}
```

Figure 37
Radio Access Network (RAN)
Node Operations

CONFIGURE A COMMUNICATION DEVICE TO TRANSMIT A
FIRST SRS AT A FIRST TIME INSTANCE AND A SECOND SRS
AT A SECOND TIME INSTANCE SEPARATED IN TIME BY A
GAP PERIOD FROM THE FIRST TIME INSTANCE
3200

CONFIGURE THE COMMUNICATION DEVICE TO TRANSMIT
THE FIRST SRS AND THE SECOND SRS USING A SAME
ANTENNA PORT AND TO NOT TRANSMIT OTHER SRS
SIGNALS FROM THE SAME ANTENNA PORT DURING THE
GAP PERIOD
3202

CONFIGURE THE COMMUNICATION DEVICE TO TRANSMIT
THE FIRST SRS AND THE SECOND SRS USING A SAME
ANTENNA PORT AND TO NOT TRANSMIT OTHER SRS
SIGNALS FROM THE SAME ANTENNA PORT DURING THE
GAP PERIOD
3204

Figure 38
Communication Device (UE)
Operations

TRANSMIT A FIRST SRS AT A FIRST TIME INSTANCE AND A
SECOND SRS AT A SECOND TIME INSTANCE SEPARATED IN
TIME BY A GAP PERIOD FROM THE FIRST TIME INSTANCE
3300

TRANSMIT THE FIRST SRS AND THE SECOND SRS USING A
SAME ANTENNA PORT AND REFRAINING FROM
TRANSMITTING OTHER SRS SIGNALS FROM THE SAME
ANTENNA PORT DURING THE GAP PERIOD
3302

TRANSMIT UPLINK SIGNALS DURING THE GAP PERIOD
3304

SRS ENHANCEMENT FOR DOPPLER ESTIMATION

TECHNICAL FIELD

The present disclosure relates generally to communications, and more particularly to communication methods and related devices and nodes supporting wireless communications.

BACKGROUND

The sounding reference signal (SRS) is used in 3rd generation partnership project (3GPP) systems 4th Generation (4G) Long Term Evolution (LTE) and 5th Generation (5G) New Radio (NR) to provide channel state information (CSI) in the uplink (UL). The application for the SRS is mainly to provide a reference signal to evaluate the channel quality at an access node, in in LTE denoted as "eNB" (evolved NodeB) and in NR denoted as "gNB" (5G NodeB), in order to, e.g., derive the appropriate transmission/reception beams or to perform link adaptation (i.e., setting the rank, the modulation and coding scheme (MCS), and the multiple-input multiple-output (MIMO) precoder) for, e.g., physical uplink shared channel (PUSCH) transmission. The signal is, in terms of functionality, similar to the downlink (DL) CSI reference signal (CSI-RS), which provides similar beam management and link adaptation functions in the DL. Note that SRS can also be used instead of (or in combination with) CSI-RS to acquire DL CSI (by means of reciprocity) for, e.g., enabling physical downlink shared channel (PDSCH) link adaptation.

In LTE and NR, the SRS is configured via radio resource control (RRC) and some parts of the configuration can be updated (for reduced latency) through medium access control (MAC) control element (CE) signaling. The configuration includes, for example, the SRS resource allocation (the physical mapping and sequence to use) as well as the time behavior (aperiodic/semi-persistent/periodic). For aperiodic SRS transmission, the RRC configuration does not activate an SRS transmission from the user equipment (UE), but instead a dynamic activation trigger is transmitted from the gNB in the DL, via the downlink control information (DCI) in the physical downlink control channel (PDCCH), which instructs the UE to transmit the SRS once, at a predetermined time.

The SRS configuration allows generating an SRS transmission pattern based on SRS resource configurations grouped into SRS resource sets. FIG. 1 illustrates that each SRS resource is configured with the abstract syntax notation (ASN) code in RRC, see, e.g., 3GPP TS 38.331 V16.1.0 (2020-07). To create the SRS resource on the time-frequency grid with the current RRC configuration, each SRS resource is thus configurable with respect to:

The transmission comb (i.e., mapping to every nth subcarrier, where n=2 or n=4), configured by the RRC parameter transmissionComb, which includes:

A comb offset, configured by the RRC parameter combOffset, is specified (i.e., which of the n combs that should be used).

A cyclic shift, configured by the RRC parameter cyclicShift, that maps the SRS sequence to the assigned comb, is also specified. The cyclic shift increases the number of SRS resources that can be mapped to a comb, but there is a limit on how many cyclic shifts that can be used (that depends on the transmission comb being used, e.g., 8 for comb 2 and 12 for comb 4).

The time-domain position within a given slot is configured with the RRC parameter resourceMapping, which includes:

A time-domain start position, which is limited to be one of the last 6 symbols in a slot, is configured by the RRC parameter startPosition.

A number of orthogonal frequency-division multiplexing (OFDM) symbols for the SRS resource (that can be set to 1, 2 or 4) is configured by the RRC parameter nrofSymbols.

A repetition factor (that can be set to 1, 2 or 4) configured by the RRC parameter repetitionFactor. When this parameter is larger than 1, the same frequency resources are used multiple times across OFDM symbols, used to improve the coverage as more energy is collected by the receiver. It can also be used for beam-management functionality, where the gNB can probe different receive beams for each repetition.

The frequency-domain sounding bandwidth and position of an SRS resource in a given OFDM symbol (i.e., which part of the system bandwidth is occupied by the SRS resource) is configured with the RRC parameters freqDomainPosition, freqDomainShift and the freqHopping parameters: c-SRS, b-SRS and b-hop. The smallest possible sounding bandwidth in a given OFDM symbol is 4 resource blocks (RBs).

FIG. 2 illustrates how an SRS resource is allocated in time and frequency, within a slot (note that semi-persistent/periodic SRS resources typically span several slots). FIG. 2 also illustrates a schematic description of how an SRS resource is allocated in time and frequency within a slot if resourceMapping-r16 is not signaled. Note that c-SRS controls the maximum sounding bandwidth, which can be smaller than the maximum transmission bandwidth that the UE supports. For example, the UE may have capability to transmit over 40 MHz bandwidth, but c-SRS is set to a smaller value corresponding to 5 MHz, thereby focusing the available transmit power to a narrowband transmission which improves the SRS coverage and enables multiplexing of SRS resources (and, hence, UEs) over the 40 MHz.

SUMMARY

According to an embodiment, a method of operating a radio access network (RAN) node in a communication network is provided. The method comprises configuring a communication device operating in the communication network to transmit a first SRS at a first time instance and a second SRS at a second time instance separated in time by a gap period from the first time instance. Further, the method comprises configuring the communication device to transmit the first SRS and the second SRS using a same antenna port and to not transmit other SRS signals from the same antenna port during the gap period.

According to a further embodiment, a method of operating a communication device in a communication network is provided. The method comprises transmitting a first SRS at a first time instance and a second SRS at a second time instance separated in time by a gap period from the first time instance. Further, the method comprises transmitting the first SRS and the second SRS using a same antenna port and without transmitting other SRS signals from the same antenna port during the gap period.

According to a further embodiment, a RAN node for a communication network is provided. The RAN node is adapted to configure a communication device operating in the communication network to transmit a first SRS at a first time instance and a second SRS at a second time instance separated in time by a gap period from the first time instance. Further, the RAN node is adapted to configure the communication device to transmit the first SRS and the second SRS using a same antenna port and to not transmit other SRS signals from the same antenna port during the gap period.

According to a further embodiment, According to a further embodiment, a RAN node for a communication network is provided. The RAN node comprises at least one processor and a memory. The memory contains instructions executable by said at least one processor, whereby the RAN node is operative to configure a communication device operating in the communication network to transmit a first SRS at a first time instance and a second SRS at a second time instance separated in time by a gap period from the first time instance. Further, the memory contains instructions executable by said at least one processor, whereby the RAN node is operative to configure the communication device to transmit the first SRS and the second SRS using a same antenna port and to not transmit other SRS signals from the same antenna port during the gap period.

According to a further embodiment, a communication device for operation in a wireless communication network is provided. The communication device is adapted to transmit a first SRS at a first time instance and a second SRS at a second time instance separated in time by a gap period from the first time instance. Further, the communication device is adapted to transmit the first SRS and the second SRS using a same antenna port and without transmitting other SRS signals from the same antenna port during the gap period.

According to a further embodiment, a communication device for operation in a wireless communication network is provided. The communication device comprises at least one processor and a memory. The memory contains instructions executable by said at least one processor, whereby the communication device is operative to transmit a first SRS at a first time instance and a second SRS at a second time instance separated in time by a gap period from the first time instance. Further, the memory contains instructions executable by said at least one processor, whereby the communication device is operative to transmit the first SRS and the second SRS using a same antenna port and without transmitting other SRS signals from the same antenna port during the gap period.

According to a further embodiment of the invention, a computer program or computer program product is provided, e.g., in the form of a non-transitory storage medium, which comprises program code to be executed by at least one processor of a RAN access node for a communication network. Execution of the program code causes the RAN node to configure a communication device operating in the communication network to transmit a first SRS at a first time instance and a second SRS at a second time instance separated in time by a gap period from the first time instance. Further, execution of the program code causes the RAN node to configure the communication device to transmit the first SRS and the second SRS using a same antenna port and to not transmit other SRS signals from the same antenna port during the gap period.

According to a further embodiment of the invention, a computer program or computer program product is provided, e.g., in the form of a non-transitory storage medium, which comprises program code to be executed by at least one processor of a communication device for operation in a communication network. Execution of the program code causes the communication device to transmit a first SRS at a first time instance and a second SRS at a second time instance separated in time by a gap period from the first time instance. Further, execution of the program code causes the communication device to transmit the first SRS and the second SRS using a same antenna port and without transmitting other SRS signals from the same antenna port during the gap period.

Details of such embodiments and further embodiments will be apparent from the following detailed description of embodiments.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is an example abstract syntax notation (ASN) of a SRS resource in RRC;

FIG. 4 is another example abstract syntax notation of a SRS resource in RRC;

FIG. 5 is diagram illustrating an example SRS transmission with neither frequency hopping nor repetition;

FIG. 6 is a diagram illustrating an example SRS transmission using frequency hopping;

FIG. 7 is a diagram illustrating an example SRS transmission using repetition;

FIG. 9 is a diagram illustrating example SRS resources using comb 2 and 4;

FIG. 10 is a table illustrating SRS antenna-switching capabilities supported by a UE;

FIG. 11 is a diagram illustrating an example of RE allocation for a TRS in NR;

FIG. 15 is a diagram of a table illustrating optimal time separation between two SRS transmissions as a function of carrier frequency and UE speed in FR1 (Frequency Range 1) according to some embodiments of inventive concepts of the present disclosure;

FIG. 16 is a diagram of a table illustrating optimal time separation between two SRS transmissions as a function of carrier frequency and UE speed in FR2 (Frequency Range 2) according to some embodiments of inventive concepts of the present disclosure;

FIG. 18 is an example of abstract syntax notation of RRC configuration updates according to some embodiments of inventive concepts of the present disclosure;

FIG. 20 is an example of abstract syntax notation of a RRC configuration with a new parameter according to some embodiments of inventive concepts of the present disclosure;

FIG. 22 is an example of abstract syntax notation of a RRC configuration adding two new parameters according to some embodiments of inventive concepts of the present disclosure;

FIG. 28 is an example of abstract syntax notation of a RRC configuration including an explicit indication that SRS resource configuration for doppler estimation is to be performed by the UE according to some embodiments of inventive concepts of the present disclosure;

FIG. 37 is a flow chart illustrating operations of a RAN node according to some embodiments of inventive concepts of the present disclosure;

FIG. 38 is a flow chart illustrating operations of a communication device according to some embodiments of inventive concepts of the present disclosure;

DETAILED DESCRIPTION

Inventive concepts of the present disclosure will now be described more fully hereinafter with reference to the accompanying drawings, in which examples of embodiments of the inventive concepts are shown. The inventive concepts may, however, be embodied in many different forms and should not be construed as limited to the embodiments set forth herein. Rather, these embodiments are provided so that this disclosure will be thorough and complete, and will fully convey the scope of the present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In the illustrated concepts, a communication device may be configured for SRS transmission with a time gap. The communication device may be a UE for operation in a wireless communication network. The wireless communication network may be based on the NR technology as specified by 3GPP. However, the illustrated concepts could also be applied to other radio technologies, e.g. the LTE technology or a future 6G (6th Generation) technology. The configuration of the communication device with respect to the SRS transmission with the time gap may be accomplished by signaling from a node of the wireless communication network, e.g., from a RAN node like a gNB. The transmission of the SRS with the time gap involves that the communication device transmits a first SRS at a first time instance and a second SRS at a second time instance, which is separated in time by a gap period from the first time instance and that the communication device transmits the first SRS and the second SRS using a same antenna port, without transmitting other SRS signals from the same antenna port during the gap period. The SRS transmission with the time gap may be used for estimation of a Doppler frequency shift of carrier signals used in communication between the communication device and the wireless communication network. The estimated Doppler frequency shift may in turn be used for pre-compensation of Doppler effects due to high-velocity movement of the communication device, e.g., in a high-speed train.

Figure 2:
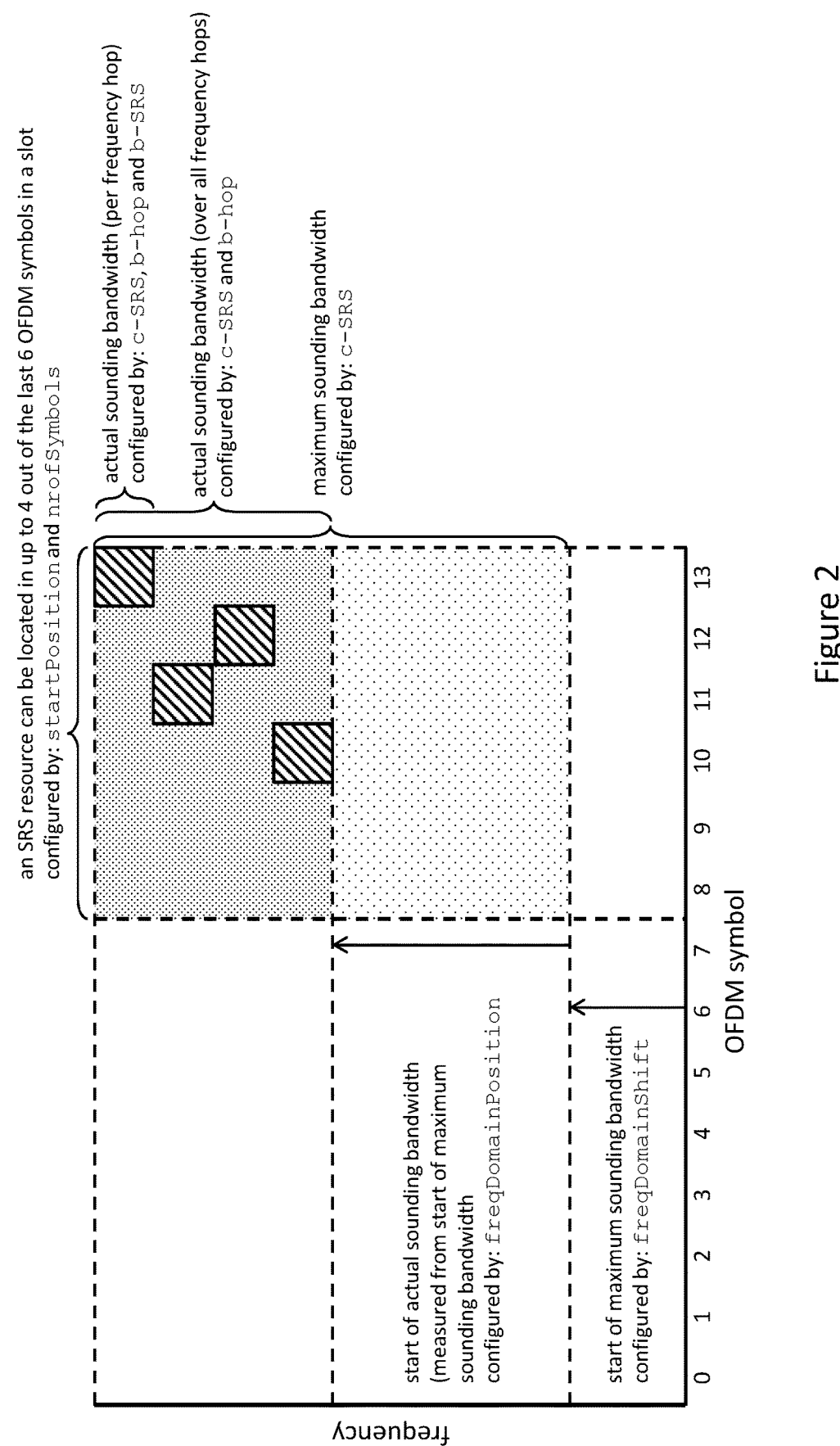
FIG. 2 is a diagram illustrating an example SRS resource allocated in time and frequency within a slot if resourceMapping-r16 is not signaled.
Figure 3:
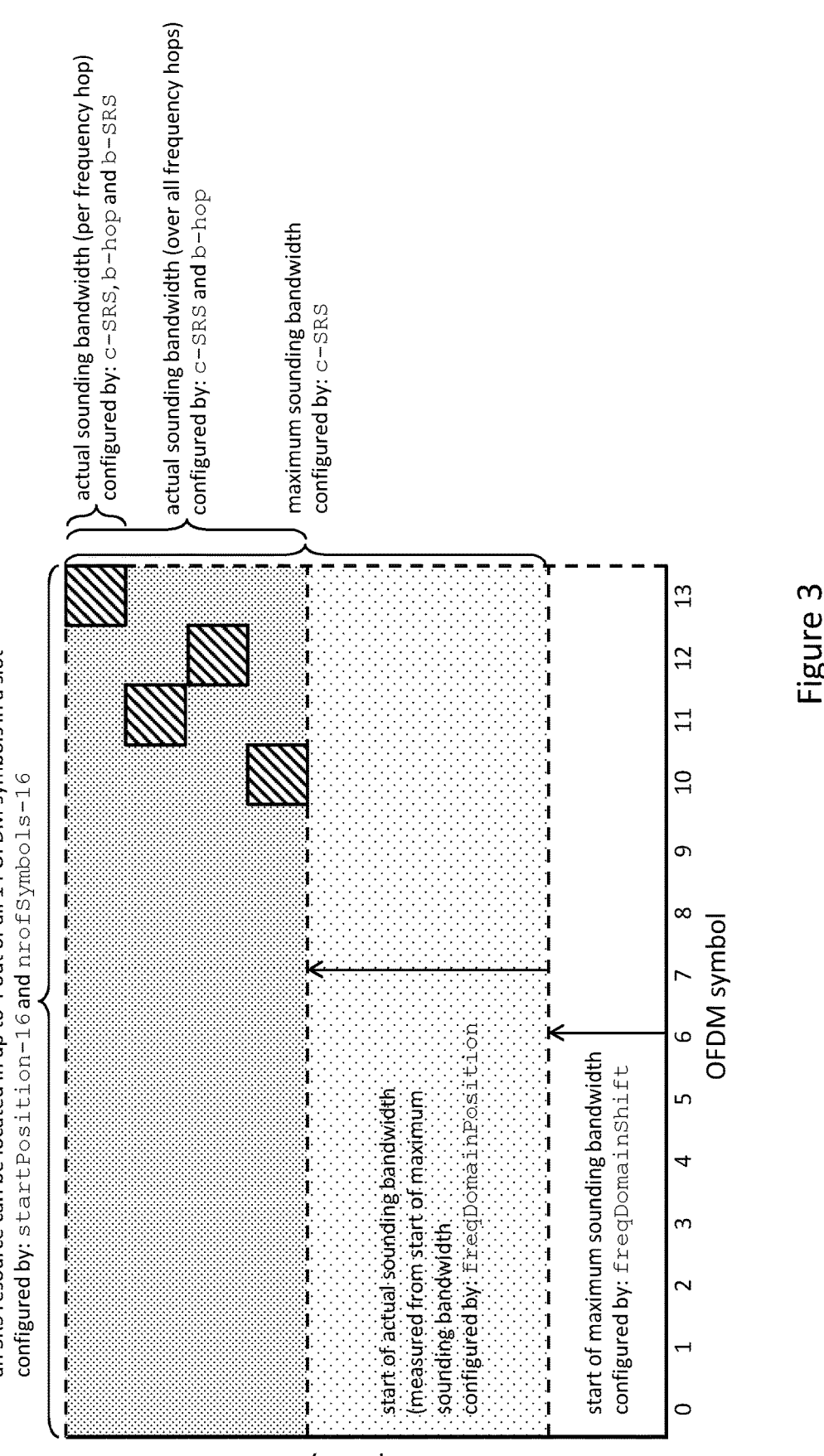
FIG. 3 is a diagram illustrating an example an SRS resource allocated in time and frequency within a slot if resourceMapping-r16 is signaled.

In NR release 16, an additional (and optional) RRC parameter called resourceMapping-r16 was introduced. If resourceMapping-r16 is signaled, the UE shall ignore the RRC parameter resourceMapping. FIGS. 2 and 3 illustrates the difference between resourceMapping-r16 and resourceMapping is that the SRS resource (for which the number of OFDM symbols and the repetition factor is still limited to 4) can start in any of the 14 OFDM symbols within a slot, configured by the RRC parameter startPosition-r16. FIG. 3 also illustrates a schematic description of how an SRS resource is allocated in time and frequency within a slot if resourceMapping-r16 is signaled.

The RRC parameter resourceType determines whether the SRS resource is transmitted as periodic, aperiodic (singe transmission triggered by DCI), or semi persistent (same as periodic except for the start and stop of the periodic transmission is controlled through MAC CE signaling instead of RRC signaling). The RRC parameter sequenceId specifies how the SRS sequence is initialized and the RRC parameter spatialRelationInfo configures the spatial relation for the SRS beam with respect to another reference signal (RS), which could be another SRS, a synchronization signal block (SSB), or a CSI-RS. If an SRS resource has a spatial relation to another SRS resource, then this SRS resource should be transmitted with the same beam (i.e., spatial transmit filter) as the indicated SRS resource.

The SRS resource will be transmitted as part of an SRS resource set. Note that all resources in a resource set must share the same resource type. Within an SRS resource set, the following parameters (common to all SRS resources in the set) are configured in RRC:

The associated CSI-RS resource (this configuration is only applicable for non-codebook-based UL transmission) for each of the possible resource types (aperiodic, periodic and semi persistent).

For an aperiodic SRS, the associated CSI-RS resource is set by the RRC parameter csi-RS.

For semi-persistent/periodic SRS, the associated CSI-RS resource is set by the RRC parameter associatedCSI-RS.

For aperiodic SRS, the slot offset is configured by the RRC parameter slotOffset and sets the delay from the PDCCH trigger reception to the start of the SRS transmission (measured in slots).

The resource usage, which is configured by the RRC parameter usage sets constraints and assumptions on the resource properties (see below and 3GPP TS 38.214 V16.5.0 (2021-03) for details).

The power-control RRC parameters alpha, p0, pathlossReferenceRS (indicating the DL RS that is used for path-loss estimation), srs-PowerControlAdjustmentStates, and pathlossReferenceRSList-r16 (for NR release 16), which are used for determining the SRS transmit power (see 3GPP TS 38.213 V16.5.0 (2021-03) for details).

FIG. 4 illustrates ASN code that each SRS resource set is configured with in RRC (see 3GPP TS 38.331 V16.1.0). To summarize, the SRS resource-set configuration determines, e.g., usage, power control, aperiodic transmission timing, and CSI-RS resource association. The SRS resource configuration, on the other hand, determines the time-and-frequency allocation, the periodicity and offset of each resource, the sequence ID for each resource and the spatial-relation information.

SRS resource sets can be configured with one of four different usages: "beamManagement", "codebook", "nonCodebook" and "antennaSwitching". SRS resources in an SRS resource set that is configured with usage "beamManagement" are mainly applicable for frequency bands above 6 GHz (i.e., for FR2) and the purpose is to allow for the UE to evaluate different UE transmit beams for wideband (e.g., analog) beamforming arrays. The UE will then transmit one SRS resource per wideband beam, and the gNB will perform reference signal received power (RSRP) measurement on each of the transmitted SRS resources and, in this way, determine a suitable UE transmit beam. The gNB then reports to the UE which transmit beam to use by updating the spatial relation for different UL RSs. It is expected that the gNB configures one SRS resource set with usage "beamManagement" for each analog array (i.e., panel) that the UE has.

SRS resources in an SRS resource set that is configured with usage "codebook" are used to sound the different UE antennas and help the gNB to determine a suitable UL precoder, transmission rank, and MCS for PUSCH transmission. How each SRS port is mapped to each UE antenna is, however, up to UE implementation and not known at the gNB side. SRS resources in an SRS resource set that is configured with usage "nonCodebook" are used to sound different potential UL precoders that are determined by the UE (and not known at the gNB side). Specifically, the UE determines a set of precoder candidates (e.g., based on reciprocity) and transmits on one SRS resource per candidate UL precoder. The gNB can then, by indicating a subset of these SRS resources, indicate which UL precoder(s) that the UE should apply for PUSCH transmission. One UL layer will be transmitted per indicated SRS. Note that how the UE maps SRS resources to antenna ports is up to UE implementation.

SRS resources in an SRS resource set that is configured with usage "antennaSwitching" are used to sound the channel in the UL so that the gNB can use reciprocity to determine suitable DL precoders. The UE is expected to transmit one SRS port per UE antenna. The mapping from SRS ports to antenna ports is, however, up to the UE to decide and is transparent to the gNB. SRS antenna switching is covered in greater detail herein below.

UL coverage for SRS has been identified as a bottleneck for NR and a limiting factor for DL reciprocity-based operation. Therefore, some schemes to improve the coverage of SRS have been adopted in NR: repetition of an SRS resource and/or frequency hopping. Before explaining these two schemes, FIG. 5 illustrates an example of SRS transmission without frequency hopping and/or repetition. Here, the entire bandwidth (which is configured by the RRC parameters c-SRS and b-hop are sounded in a single OFDM symbol).

One example of frequency hopping is illustrated in FIG. 6. In the example of FIG. 6, the illustrated frequency-hopping pattern is set according to Section 6.4 of 3GPP TS 38.211 V16.5.0 (2021-03). Here, different parts of the frequency band are sounded in each of four different OFDM symbols, which means that the power spectral density (PSD) for SRS will improve (by a factor four compared to the baseline case in FIG. 5) at the cost of more symbols being used for SRS and a shorter SRS sequence length per OFDM symbol.

FIG. 7 illustrates an example of repetition, where one SRS resource is used for transmission of SRS in four consecutive OFDM symbols (by setting the number of SRS symbols aper slot and the repetition factor to four), which will, again, increase the PSD for SRS (by a factor four compared to the baseline case in FIG. 5), again, at the cost of more symbols being used for SRS and decreased SRS (multiplexing) capacity.

Figure 8:
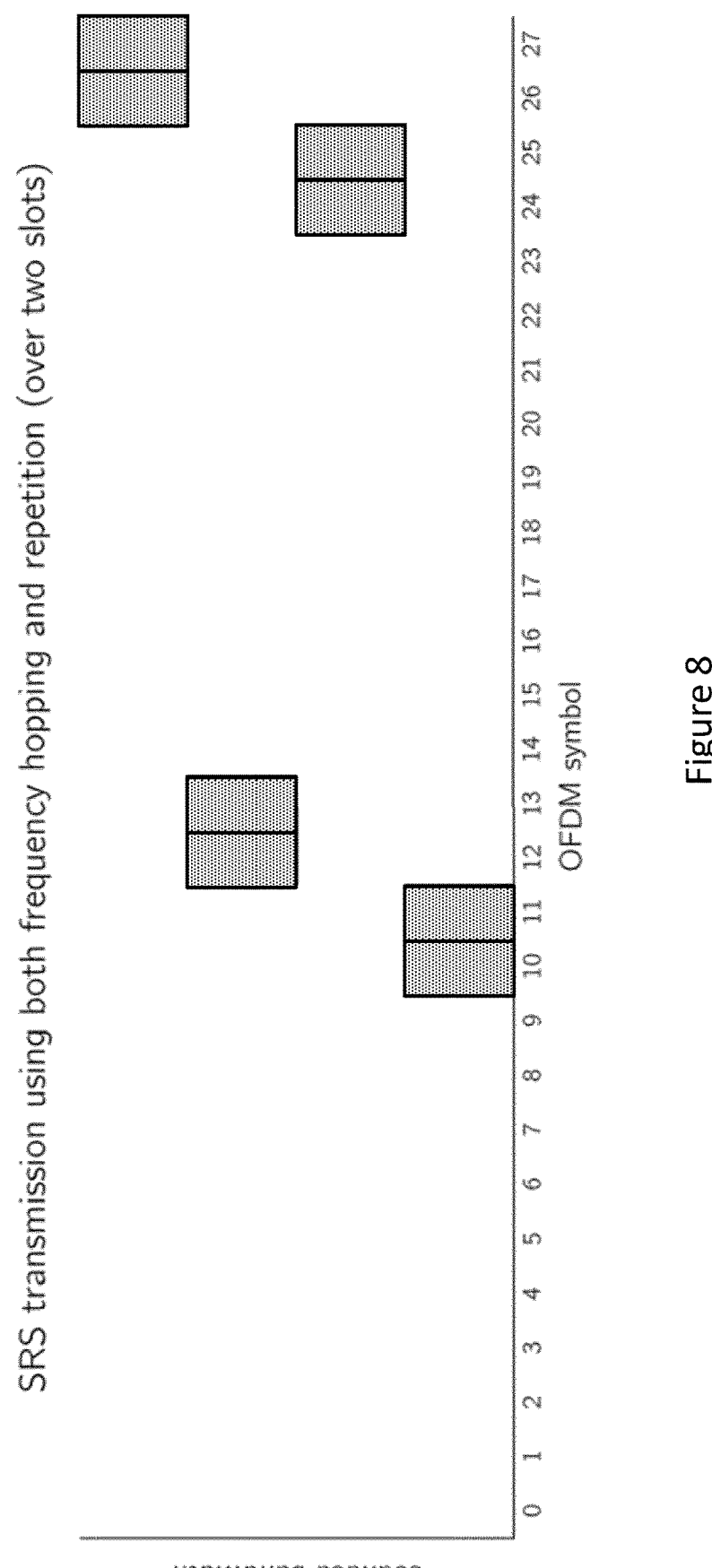
FIG. 8 is a diagram illustrating an example SRS transmission using both frequency hopping and repetition.

It is worth mentioning that frequency hopping and repetition can be used together and, that for semi-persistent and periodic SRS, the frequency-hopping pattern continues beyond the slot boundary (for aperiodic SRS, on the other hand, all parts of the configured bandwidth must be sounded within a slot). To illustrate these two points, FIG. 8 shows an example of a periodic SRS resource (with periodicity one) over two slots. Here, the frequency-hopping configuration is the same as in FIG. 6, the repetition factor is two, and the number of SRS symbols per slot is four. Note that in this example (and in all the previous examples) all hops (highlighted in blue in the figure(s)) belong to the same SRS resource.

SRS capacity (i.e., the number of SRS ports that can be multiplexed onto a limited set of time-and-frequency resources) has also been identified as a bottleneck for NR. Therefore, schemes to improve the capacity of SRS have been adopted in NR, which include using transmission comb 2 or 4 (i.e., sounding only every 2nd or 4th subcarrier within the configured bandwidth), and multiplexing several SRS ports onto the same transmission comb by using different cyclic shifts.

FIG. 9 illustrates and example of how 2 or 4 single-port SRS resources can be multiplexed onto the same configured SRS bandwidth by using transmission comb 2 and 4, respectively. In FIG. 9, the different SRS resources have been configured with a different comb offset (i.e., RRC-configured with different values of the parameter combOffset, as discussed herein above). FIG. 9 also illustrates multiplexing 2 and 4 single-port SRS resources (with varying comb offset) using transmission comb 2 and 4, respectively. Each SRS resource in FIG. 9 is illustrated by means of a unique pattern (e.g., SRS resource 1 is shown in first pattern, SRS resource 2 is shown in different pattern, and so on).

The SRS base sequences, which are used in NR, are such that they are pairwise orthogonal under cyclic shifts. Utilizing this property, it is possible to multiplex several SRS ports onto the same transmission comb by using different cyclic shifts (and the same base sequence) per SRS port. In NR Rel-16, the maximum number of cyclic shifts is 8 and 12 for transmission comb 2 and 4, respectively. For multiport SRS resources, the different SRS ports belonging to the same SRS resource will be configured with a port-specific cyclic shift per SRS port. Furthermore, for four-port SRS resources, it is possible to use up to two different transmission combs (with two SRS ports and, hence, two cyclic shifts per comb). Further details can be found in 3GPP TS 38.211 V16.5.0. Finally, an additional measure to increase the SRS capacity is to not sound the entire transmission bandwidth using SRS. Recall from above that, in NR Rel-16, the minimum configurable SRS bandwidth per OFDM symbol is 4 RBs.

SRS has its own UL power control (PC) scheme in NR, which can be found in Section 7.3 of 3GPP TS 38.213 V16.5.0 and that specifies how the UE should split the available output power between two or more SRS ports during one SRS transmit occasion (an SRS transmit occasion is a time window within a slot where SRS transmission is performed). Since it is desirable for the gNB to sound all UE antennas (where sounding an antenna means transmitting an SRS from that antenna, which, in turn, enables the gNB to estimate the channel between said UE antenna and the gNB antennas) but costly to equip the UE with many transmit ports, SRS antenna switching was introduced in NR release 15, for UEs equipped with more receive chains than transmit chains. If a UE support antenna switching, it will report so by means of UE-capability signaling.

FIG. 10 illustrates an example SRS antenna-switching capabilities supported by the UE. The left column of FIG. 10 lists SRS antenna-switching capabilities that can be reported by a UE in NR release 15, e.g., as specified in 3GPP TS 38.306 V16.4.0 (2021-03). For example, if a UE reports t1r2 it means that it has two receive antennas (i.e., it has two receive chains) but only has the possibility of transmitting from one of those antennas at a time (i.e., it has one transmit chain) with support for antenna switching. In this case, two single-port SRS resources can be configured for the UE such that it can sound both receive ports using a single transmit port with an antenna switch in between.

Additional UE capabilities were introduced in NR release 16. Such capabilities are listed in the right column of FIG. 10, which indicates support for the UE to be configured with SRS resource set(s) with usage 'antennaSwitching' but where only a subset of all UE antennas is sounded. For example, the UE capability t1r1-t1r2 indicates that the gNB can configure one single-port SRS resource (no antenna switching) or two single-port SRS resources (same as for the capability "1t2r" described above) with usage 'antennaSwitching' per SRS resource set. In this case, if the UE is configured with a single SRS resource (no antenna switching) it will only sound only one of its two antennas, which will save UE power consumption at the cost of reduced channel knowledge at the gNB (since the gNB can only estimate the channel between itself and the UE based on one of the two UE antennas).

In 3GPP meeting RAN1 #104-e, the following was agreed with regards to SRS capacity-and-coverage enhancements (see RAN1 Chairman's Notes of 3GPP TSG RAN WG1 Meeting #104-e, Jan. 25-Feb. 5, 2021):

Increase the maximum number of repetition symbols in one slot and one SRS resource to S Support at least one S value from {8, 10, 12, 14}.

Other candidate values are for further study.

Support to transmit SRS only in $m_{SRS,b_{SRS}}/P_f$ contiguous RBs in one OFDM symbol, where $m_{SRS,b_{SRS}}/P_f$ indicates the number of RBs configured by $b_{SRS}$ and $c_{SRS}$.

Support at least one $P_f$ value from {2, [3], 4, 8}.

Other candidate values, e.g., non-integer values for $P_f$, are for further study.

SRS sequence shorter than the minimum length supported in the current specification was not pursued.

No new sequence lengths was introduced.

It is for further study if it is applicable to frequency hopping and non-frequency hopping.

A detailed signaling mechanism to determine $P_f$ and the location of the $m_{SRS,b_{SRS}}/P_f$ RBs is for further study.

Support Comb 8.

SRS sequence shorter than the minimum length supported in the current specification is not pursued.

It is for further study whether and if needed, how to use harmonized approach to define the three supported schemes.

Note: Other schemes for SRS capacity and coverage enhancements are not supported in Rel-17.

It should be noted that it has been agreed to support higher-order SRS repetition factors in NR Rel-17. Since the number of symbols of an SRS resource, hereinafter denoted by N, should always be larger than or equal to SRS repetition factor, hereinafter denoted by R, this agreement implies both N and R need to be extended to S.

Channel state information reference signal (CSI-RS) was introduced in NR for channel measurement in the downlink. A CSI-RS is transmitted over an antenna port (either a physical or virtual antenna) on certain resource elements (REs) for a UE to measure the downlink channel associated with the antenna port. CSI-RS for this purpose is also referred to as non-zero power (NZP) CSI-RS. The supported number of antenna ports or CSI-RS ports in NR are {1, 2, 4, 8, 12, 16, 24, 32}.

A tracking reference signal (TRS) is a special NZP CSI-RS with one port and is used for time and frequency tracking in the downlink. FIG. 11 illustrates an example of a TRS resource configuration in a PRB and 2 slots. A UE can be configured with one or more periodic TRS, or one or more periodic TRS and aperiodic TRS in NR. For a periodic TRS, it has a periodicity and a slot offset. The periodicity can be one of $2^\mu X_p = 10$ slots where $X_p = 10$, 20, 40, or 80. A TRS occupies multiple RBs. When a NZP CSI-RS resource set contains "trs-info" set to "true" as specified in NZP-CSI-RS-ResourceSet IE in 3GPP TS 38.331 V16.1.0, then the NZP CSI-RS resource set is for TRS.

Demodulation reference signals (DMRS) are used for coherent demodulation of PDSCH. The DMRS is confined to resource blocks carrying the associated PDSCH and is mapped to allocated REs on the time-frequency resource grid in NR such that the receiver can perform good channel estimation of time/frequency-selective fading channels. A PDSCH can have one or multiple DMRS, each associated with an antenna port, or DMRS port. The antenna ports used for PDSCH are indicated in DCI scheduling the PDSCH.

Several signals can be transmitted from different antenna ports in a same location. These signals can have the same large-scale properties, for instance in terms of Doppler shift/spread, average delay spread, or average delay, when measured at the receiver. These antenna ports are then said to be quasi co-located (QCL). If the UE knows that two antenna ports are QCL with respect to a certain parameter (e.g., Doppler spread), the UE can estimate the parameter for one reference signal (e.g., DMRS) received from one antenna port based on another reference signal (e.g., TRS) transmitted from the other antenna port. The reference signal (e.g., TRS) on which the channel parameter is measured is known as a QCL-source RS and the reference signal (e.g., DMRS) for which its channel parameter is obtained from another RS is known as a QCL-target RS.

In NR, a QCL relationship between a demodulation reference signal (DMRS) in PDSCH and other reference signals is described by a transmission configuration indicator (TCI) state, which contains one or two source RS and the associated QCL types. A UE can be configured through RRC signaling with up to 128 TCI states in FR2 and up to 8 TCI states in FR1, depending on UE capability. Each TCI state contains QCL information, for the purpose of PDSCH reception.

A UE can be dynamically signaled one or two TCI states in the TCI field in a DCI scheduling a PDSCH.

The supported QCL types in NR are:

'QCL-TypeA': Doppler shift, Doppler spread, average delay, delay spread

'QCL-TypeB': Doppler shift, Doppler spread

'QCL-TypeC': Doppler shift, average delay

'QCL-TypeD': Spatial Rx parameter

Table 1 is a summary of possible source RS and target RS in NR. SSB refers to synchronization signal and broadcast channel, CQI refers to Channel Quality Information. Furthermore, BM refers to CSI-RS for beam management in FR2.

TABLE 1

Target and Source RS supported in NR

| Target RS | QCL source RS | | | |
| --- | --- | --- | --- | --- |
| | QCL type A | QCL type B | QCL type C | QCL type D |
| Periodic TRS | | | SSB | SSB |
| | | | SSB | CSI-RS (BM) |
| Aperiodic TRS CSI-RS (CSI) | Periodic TRS | | | Periodic TRS |
| | TRS | | | TRS |
| | TRS | | | SSB |
| | TRS | | | CSI-RS (BM) |
| | | TRS | | |
| CSI-RS (BM) | TRS | | | TRS |
| | TRS | | | CSI-RS (BM) |
| | | | SSB | SSB |
| DMRS for PDCCH | TRS | | | TRS |
| | TRS | | | CSI-RS (BM) |
| | CSI-RS for CQI | | | CSI-RS for CQI |
| DMRS for PDSCH | TRS | | | TRS |
| | TRS | | | CSI-RS (BM) |
| | CSI-RS for CQI | | | CSI-RS for CQI |

Figure 12:
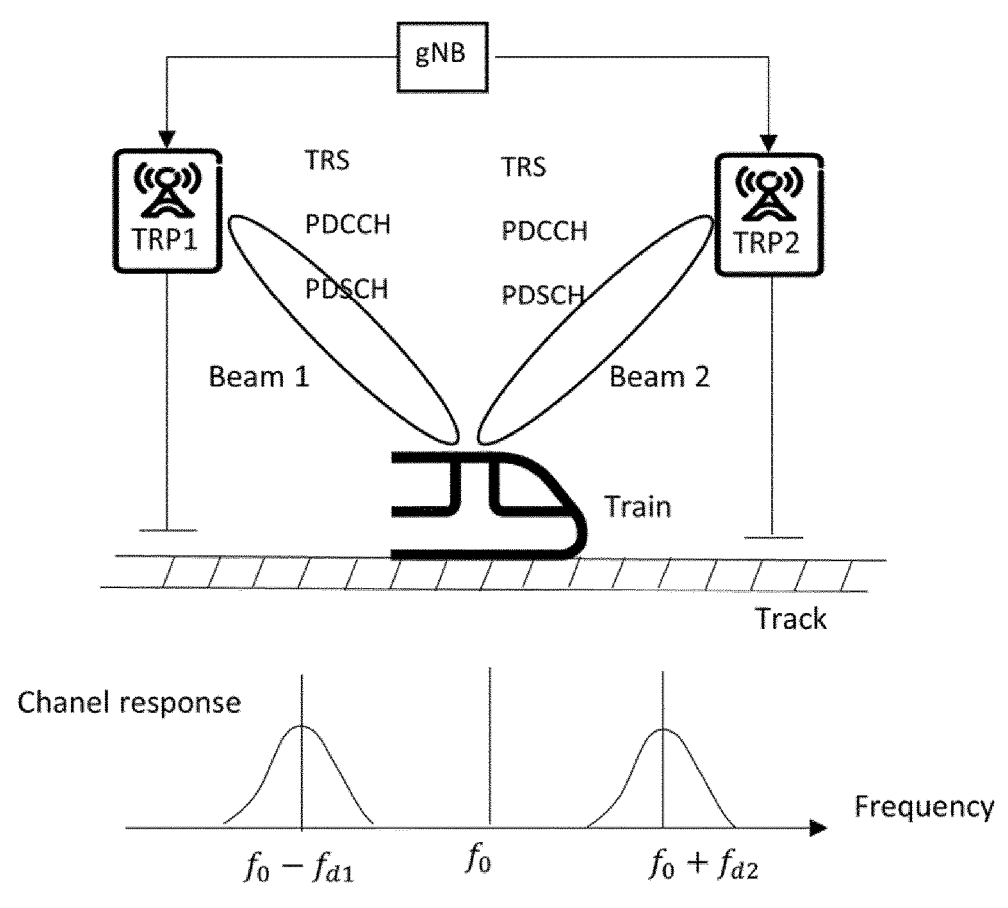
FIG. 12 is a diagram illustrating an example HST-SFN network.

In a high-speed train (HST) single frequency network (SFN), duplicated DL signals are transmitted to a UE from multiple transmission and reception points (TRPs) along the train track in order to reduce handover frequency and improve coverage. An example is shown in FIG. 12, where two TRPs are used to transmit the same DL signals to UEs in a high-speed train. A tracking reference signal (TRS) is transmitted also in a SFN manner for the UEs to perform DL timing and frequency tracking as well as channel property analysis such as delay spread and Doppler frequency spread.

Figure 13:
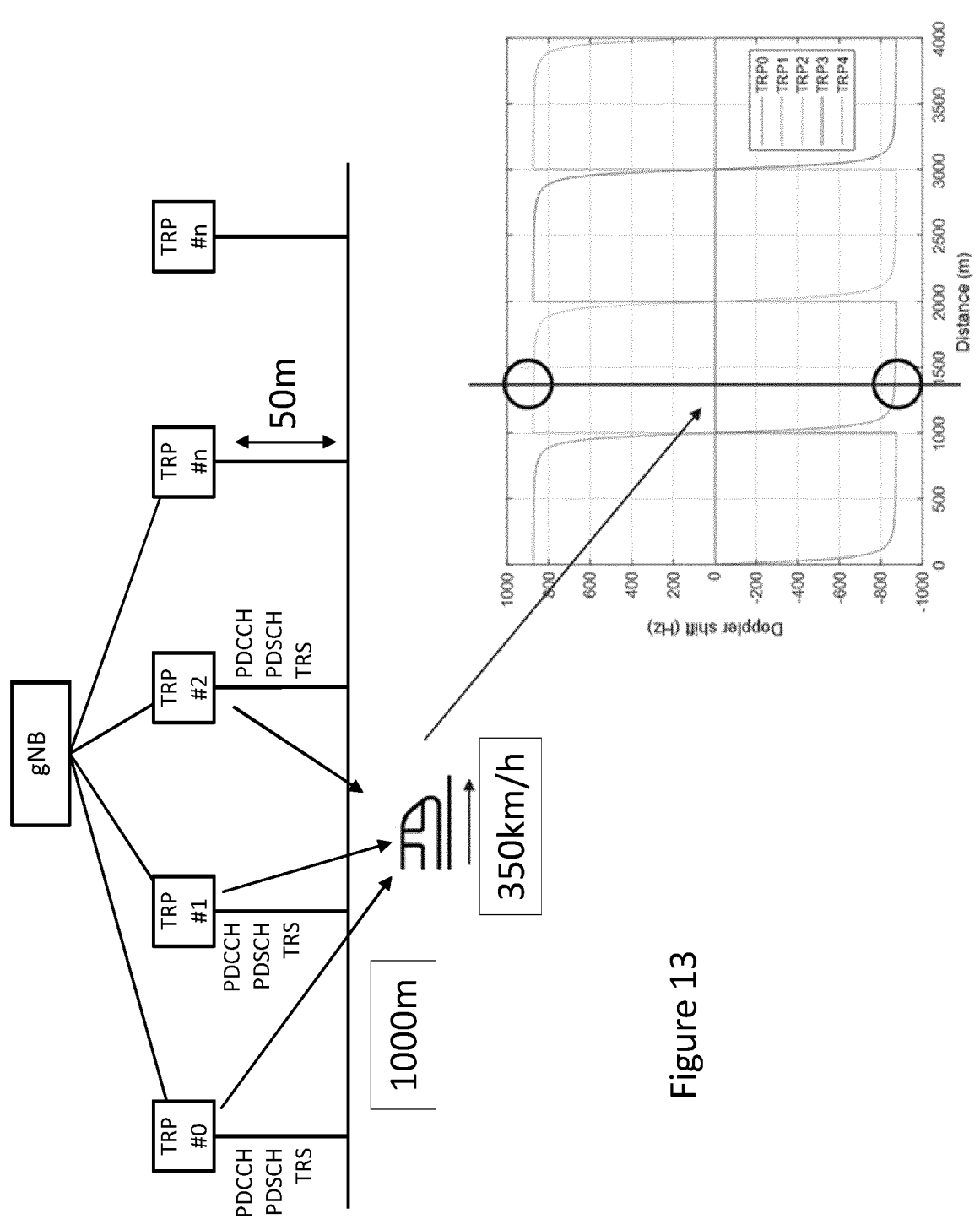
FIG. 13 is a diagram illustrating an example doppler shift change at the middle of two TRPs in HST-SFN.

One issue with HST-SFN is large Doppler frequency spread observed at a UE when the train is in the middle of two TRPs, the UE would observe a maximum positive Doppler frequency from one TRP and a maximum negative Doppler frequency from the other TRP as illustrated in FIG. 13, where the Doppler shifts from TRP #1 and TRP #2 have opposite signs around 1500 meters distance from TRP #0. This large Doppler spread makes demodulation at the UE more difficult and thus results in poor performance. FIG. 13 also illustrates a Doppler shift change at the middle of two TRPs in HST-SFN.

To improve the HST-SFN performance, two enhance-ments (a UE-based and a NW-based) are being considered in Rel-17 NR. The UE-based enhancement was agreed in 3GPP meeting RAN1 #104-e to be supported in the speci-fications. The main new feature is that TRS is transmitted in TRP-specific (i.e., non-SFN) manner, enabling the UE to track timing and frequency per TRP. In the agreed UE-based scheme, the DMRS and PDCCH/PDSCH from TRPs are transmitted in SFN manner. The same DMRS port(s) can be associated with two TCI states containing TRS as source reference signal. Both TCI states can be associated with {average delay, delay spread, Doppler shift, Doppler spread} (i.e., QCL-TypeA). The Rel-17 UE can dynamically decide the demodulation TCI depending on received TRS measurement. If the two received TRS are equally good, which may indicate the pathloss from the 2 TRPs are the same in the SFN channel, UE may either select one of the DL-RSs as SFN channel estimation reference or combine the 2 received DL-RSs first and demodulate accordingly.

In 3GPP meeting RAN1 #104-e it was agreed to support in specifications a NW-based enhancement to be made in RAN1 #104-e-bis meeting. Specifically, what is being con-sidered is a TRP-specific Doppler frequency pre-compen-sation scheme on PDSCH and PDCCH transmission for HST-SFN scenario, based on the estimated Doppler fre-quency estimation. The estimation may be based on UL signals such as SRS or based on UE reported Doppler frequency estimation. In case of pre-compensation based on UL signals, the gNB needs to know which of the DL TRS is used in deriving the UL transmit frequency so that proper pre-compensation can be performed.

Figure 14:
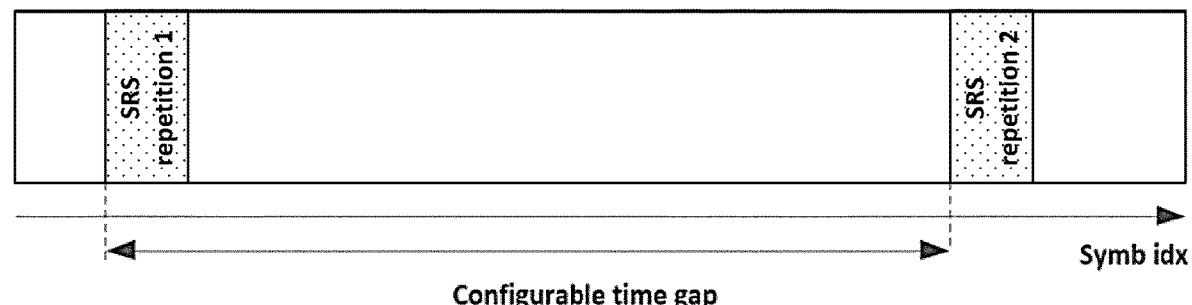
FIG. 14 is a block diagram illustrating an example SRS with gap period in between the SRS transmissions according to some embodiments of inventive concepts of the present disclosure.

SRS based doppler estimation can be done by transmitting SRS on an SRS resource with the same UE antenna virtu-alization at two different time instances and calculate the correlation of the channel estimates for respective SRS transmission. As described in 3GPP contribution "Enhance-ments on HST-SFN deployment", document R1-2101450, 3GPP TSG-RAN WG1 Meeting #102-e, August 17th-28th, 2020, in the following denoted as R1-2101450, it is benefi-cial to have a suitable time difference between the two SRS transmissions in order to enhance the reliability of the doppler estimation. To enable this, it has been proposed in R1-2101450 to configure SRS with a gap period in between two SRS transmissions as illustrated in FIG. 14.

How long the time gap should between two SRS trans-missions in order to maximize the Doppler estimation reli-ability is a function of carrier frequency (f0) and UE speed (v). To get as accurate Doppler estimate as possible, the phase difference of the channel estimates measured at two different time instances should be equal to 90 degrees. FIG. 15 illustrates a table illustrating an optimal time separation (d) between two SRS transmissions (in order to maximize the doppler estimation reliability) as a function of carrier frequency (f0) and UE speed (v). The optimal time gap is counted both in ms and number of OFDM symbols for two different SCSs (Subcarrier Spacings). As can be seen, the optimal number of OFDM symbols between two SRS trans-missions can become quite large, especially for lower UE speeds and higher SCSs. FIG. 16 illustrates a table with similar results as the table of FIG. 15, but for FR2.

Figure 17:
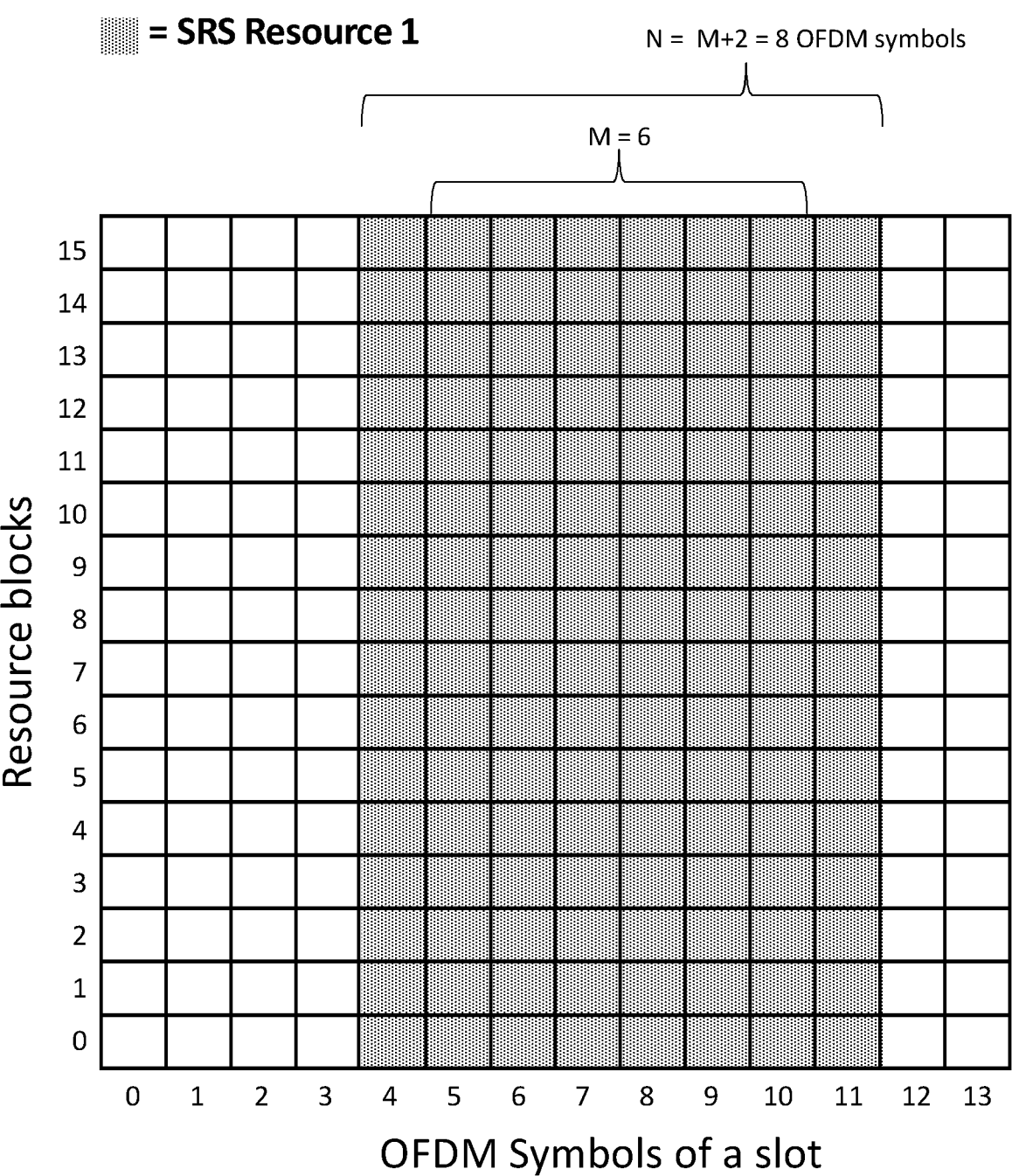
FIG. 17 is a block diagram of an example SRS transmission for doppler estimation according to some embodiments of inventive concepts of the present disclosure.

In current NR specification, an SRS resource consists of N consecutive OFDM symbols. This means that, in order to perform Doppler estimation based on SRS transmitted in two different time instances separated by at least M OFDM symbols, an SRS resource consisting of M+2 symbols needs to be configured, as schematically illustrated in FIG. 17 for M=6. This causes unnecessary overhead, since the SRS resource needs to be utilized for transmission in M+2 consecutive OFDM symbols, instead of only in 2 OFDM symbols, which increases the UE power consumption, and wastes precious UL resources. Moreover, such a single SRS resource solution is limited by the value N, up to 4 for Rel-15/16 UEs, and at least one from {8, 10, 12, 14} for Rel-17 UEs, albeit as optional capability. FIG. 17 also illustrates an example of a SRS transmission for Doppler estimation, where an SRS resource is configured with rep-etition factor 8 in order to attain a SRS transmission sepa-ration in time of M=6 OFDM symbols between the first and last symbols, which results in waste of UL resources. R1-2101450 suggests a solution to mitigate this problem by configuring an SRS transmission with a gap period in between the SRS transmissions, however, without providing details of how this could be done.

A framework for enabling sounding a UE antenna with an SRS at two separate time instances, and where there is a gap between the two instances, for which there is no SRS transmitted from that UE antenna is described herein. An advantage of the proposed solutions described herein includes a more flexible SRS configuration that will enhance Doppler estimation in UL with reduced overhead.

In order to support increased number of symbols per slot (as agreed for NR Rel-17), the RRC configuration for an SRS resource needs to be updated, e.g., as shown in FIG. 18. FIG. 18 illustrates an example RRC configuration updates, shown in bold, to support the higher number of OFDM symbols and repetition factors that will be specified in NR Rel-17. In this example, the field resourceMapping-r17 contains the fields nrofSymbols-r17 and repetitionFactor-r17, which can be set, e.g., to the values 1, 2, 4, 8, and 12. If resourceMapping-r17 is configured for a UE (whether resourceMapping-r17 can be configured for a UE may depend on signaled UE capability), the values for N and R will be set by nrofSymbols-r17 and repetitionFactor-r17, respectively.

Figure 19:
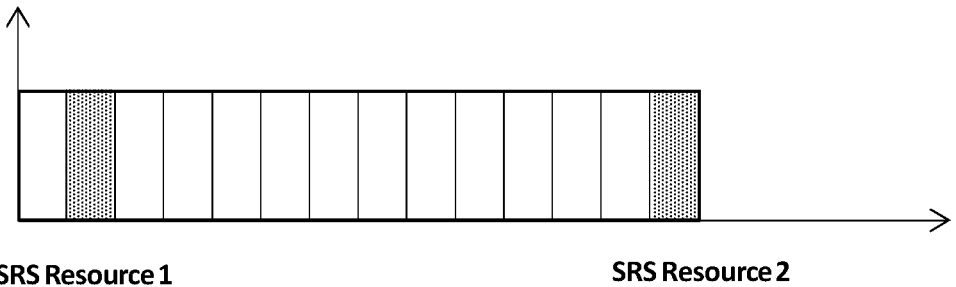
FIG. 19 is a block diagram of an example SRS resource set that has been configured with two SRS resources according to some embodiments of inventive concepts of the present disclosure.

FIG. 19 illustrates an embodiment according to the pres-ent disclosure. In this case an SRS resource set has been configured with two SRS resources, one with startPosition 12 (which means that it will start at the second symbol of the slot) and one with startPosition 0 (which means that it will start at the last OFDM symbol). A new parameter (here called dopplerEstimation-r17) is set to true in the SRS resource set, which indicates to the UE that the same SRS port to antenna port mapping should be applied for all the SRS resources in that SRS resource set. For example, assume that a 2T4R (or 2T2R) UE is configured with one SRS resource set with two 2-port SRS resources and with usage 'codebook'. If the flag dopplerEstimation-r17 is set to "true", then the UE should apply the same virtualization (i.e., the same SRS-port to antenna-port mapping) for both SRS resources. So, for example, if the UE transmits SRS port 1 on UE antenna 1 and SRS port 2 on UE antenna 2 for SRS resource 1, then the UE should transmit SRS port 1 on UE antenna 1 and SRS port 2 on UE antenna 2 for SRS resource 2.

FIG. 20 illustrates an example of how the RRC configu-ration could look for this embodiment, by introducing the parameter "dopplerEstimation-r17" in "SRS resource set IE" as specified in TS 38.311. The new parameter (here referred to as "dopplerEstimation-r17") can be configured in SRS resource sets with any kind of usage, for example 'codebook', 'antennaSwitching', 'beamManagement' and 'nonCodebook'. In one alternative of this embodiment, the UE does not expect different SRS resources belonging to the same SRS resource set to be configured with different spatial relations in case the new parameter "dopplerEstimation-r17" is set to true. In one alternative of this embodiment, in case the new parameter "dopplerEstimation-r17" is set to true, the SRI bitfield used to indicate selected SRS resource(s) in DCI Format 0_1 and 0_2, for example for codebook based and non-codebook-based UL transmission, is omitted from the DCI triggering the PUSCH transmission (e.g., DCI Format 0_1 and 0_2).

In one alternative of this embodiment, the phase coherent transmission of time-distant SRS resources is achieved implicitly, without introducing new signaling. For example, when the UE is configured with the higher layer parameter usage in SRS-ResourceSet set as 'antennaSwitching' and the SRS configuration exceeds the maximum indicated support-edSRS-TxPortSwitch UE capability, the additional resources are transmitted with the same antenna port. For example, when a UE indicates 't1r1', i.e. it does not support antenna switching, it may be configured as an 1T2R UE, i.e. with up to two SRS resource sets configured with a different value for the higher layer parameter resourceType in SRS-ResourceSet set, where each SRS resource set has two SRS resources for transmission of SRS in different symbols, each SRS resource in a given SRS resource set consisting of a single SRS port. Differently to the Rel-15/16 functionality, the UE will associate the SRS port of each SRS resource belonging to one SRS resource set with the same antenna port (i.e. using the same SRS port to antenna port mapping and transmitting the SRS with the same phase and output power). Accordingly, the gap functionality that was introduced for antenna switching is used instead for Doppler estimation.

Figure 21:
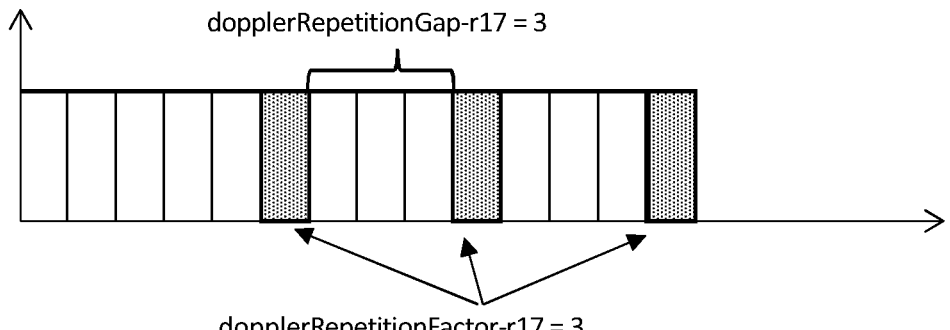
FIG. 21 is a block diagram illustrating an example repetition of a transmission of a SRS resource with a gap period in between each repetition according to some embodiments of inventive concepts of the present disclosure.

FIG. 21 illustrates one schematic example of a further embodiment of the present disclosure. FIG. 21 illustrates two new parameters ("dopplerRepetitionFactor-r17" and "dopplerRepetitionGap-r17") are introduced per SRS resource to indicate that the UE should repeat the transmission on the SRS resource with a gap period in between each repetition. In this embodiment, an extra repetition factor (called here "dopplerRepetitionFactor-r17") is included per SRS resource configuration, as well as a parameter indicating the gap period (in number of OFDM symbols) between each repetition of the SRS resource (called here "dopplerRepetitionGap-r17"). Since it is the same SRS resource that is utilized for transmission in multiple different time instances, the UE knows according to current specification that the same SRS port to antenna port mapping should be applied during all the transmissions. FIG. 22 illustrates an example of RRC configuration with the new parameters "dopplerRepetitionFactor-r17" and "dopplerRepetitionGap-r7". FIG. 22 also illustrates an example of how this embodiment can be RRC configured by adding the two new parameters in an "SRS resource IE" as specified in TS 38.311.

Figure 23:
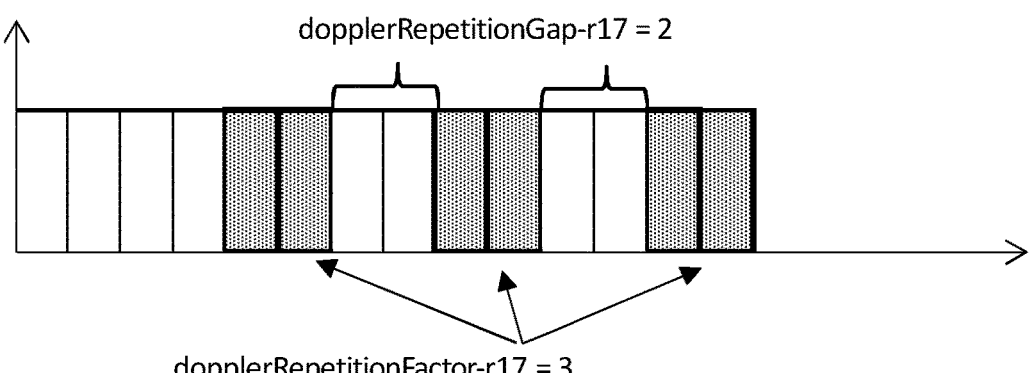
FIG. 23 is a block diagram illustrating an example SRS resource repeated within each SRS resource transmission occasion according to some embodiments of inventive concepts of the present disclosure.

FIG. 23 illustrates an example of where a single SRS resource is repeated within each SRS resource transmission occasion (and an example of corresponding RRC configuration). FIG. 23 also illustrates, where each SRS resource is repeated twice within each transmission instance (which can be configured by setting for example the legacy SRS resource parameters "repetitionFactor" and "nrofSymbols" to two). It is noted that the parameter "dopplerRepetition-Gap-r17" can be interpreted in different ways. In the illustrated example it is interpreted as the gap (in number of OFDM symbols) between the last OFDM symbol of an SRS resource transmission occasion and the first OFDM symbol of the subsequent SRS resource transmission occasion. However, another possible interpretation is that "doppler- RepetitionGap-r17" is interpreted as the gap period between the first OFDM symbol of each SRS resource transmission occasion. If that were the case, "dopplerRepetitionGap-r17" in FIG. 24 would be equal to 3.

Figure 24:
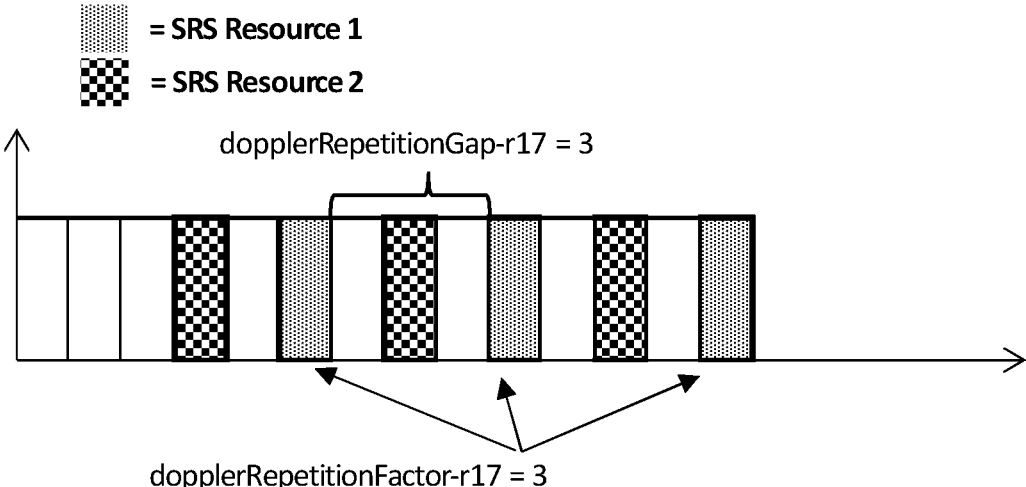
FIG. 24 is a block diagram illustrating an example transmission of two SRS resources in multiple different SRS resource transmission occasions according to some embodiments of inventive concepts of the present disclosure.

FIG. 24 illustrates another example embodiment of the present disclosure. FIG. 24 illustrates an example in which where two SRS resources are utilized for transmitting SRS in multiple different SRS transmission occasions (and an example of corresponding RRC configuration). In this case a 1T2R UE is configured with an SRS resource set with two SRS resources with usage 'antennaSwitching'. In this case the UE will transmit a first SRS on SRS resource 1 from UE antenna 1, and a second SRS on SRS resource 2 from UE antenna 2 three times each.

In a further embodiment, a new interpretation of the SRS resource parameters for the time domain resource allocation may be used (either for the legacy "resourceMapping" and/or for a new "resourceMapping-r17" as schematically illustrated in FIG. 20), which implicitly enables SRS resource configuration for Doppler estimation (i.e., that an SRS resource can be transmitted at two or more different time instances but with a time gap of one or several OFDM symbols in between).

Figure 25:
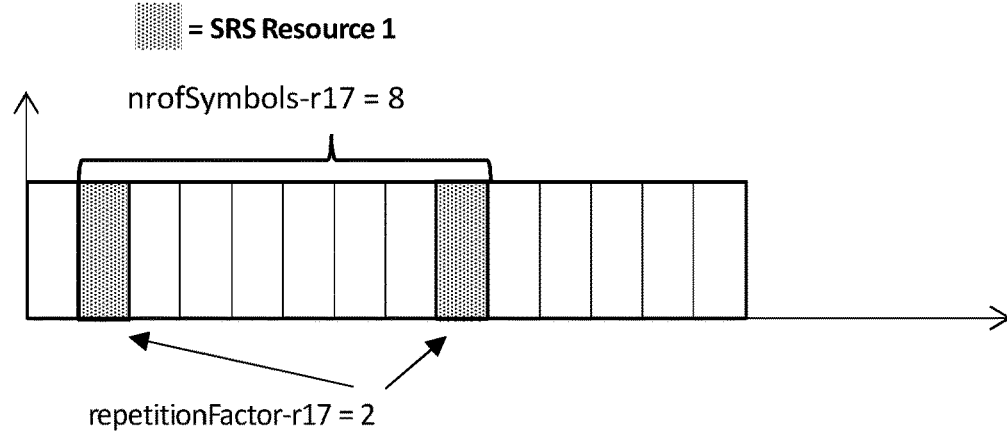
FIG. 25 is a block diagram illustrating when a UE implicitly interprets a certain SRS configuration as an SRS resource being transmitted at different time instances with a gap period in between according to some embodiments of inventive concepts of the present disclosure.

One example of this embodiment is illustrated in FIG. 25, where the number of symbols ("nrofSymbols-r17") are set to 8, the repetition factor ("repetitionFactor-r17") is set to 2, and no frequency hopping is configured. In this embodiment, when the number of symbols for an SRS resource is larger than the repetition factor (and no frequency hopping is configured for that SRS resource), the UE should implicitly understand that the SRS resource should be configured with a gap period between the repetitions, such that the total SRS resource length is equal to the configured "nrofSymbols-r17". Note that according to current NR specification, in case the UE is configured with an SRS resource with a number of symbols ("nrofSymbols" in TS 38.311) that is larger than a number of repetitions ("repetitionFactor" in TS 38.311), the UE shall extend the number of SRS repetitions of the SRS resource to equal the number of symbols, under the condition that no frequency hopping is configured for that SRS resource.

Figure 26:
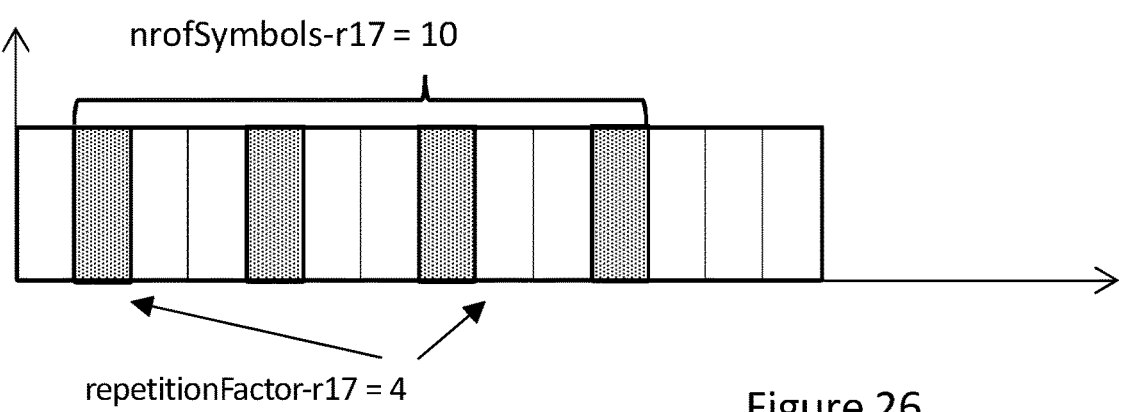
FIG. 26 is a block diagram illustrating SRS repetitions uniformly distributed in time according to some embodiments of inventive concepts of the present disclosure.

FIG. 26 illustrates an example where the UE implicitly interprets a certain SRS configuration as an SRS resource for transmission at different time instances with a gap period in between, and where the SRS repetitions are uniformly distributed in time. In this embodiment, the SRS repetitions of an SRS resource are uniformly distributed in time between the first and last OFDM symbol of the SRS resource, as schematically illustrated in FIG. 26, where an SRS resource has been configured with a repetition factor 4 (i.e. "repetitionFactor-r17"=4) and number of symbols equals to 10 (i.e., "nrofSymbols-r17"=10). In some scenarios, it could be standardized (e.g., in 3GPP TS 38.214 V16.5.0) that this implicit interpretation shall only be applied when a UE is configured with "repetitionFactor-r17" and "nrofSymbols-r17" such that the SRS transmissions are equidistantly (uniformly) distributed in time.

If the SRS transmission cannot be equidistantly (uniformly) distributed in time, the UE may instead assume that the repetition factor is the same as the number of symbols (as for example assumed in legacy NR). In a further variant, if the UE has been configured with no frequency hopping, and with values of N and R for which N is not integer divisible by R, then the UE shall transmit SRS with non-uniform time separation according to a rule. The rule could for example be based on rounding to the nearest OFDM symbol.

Figure 27:
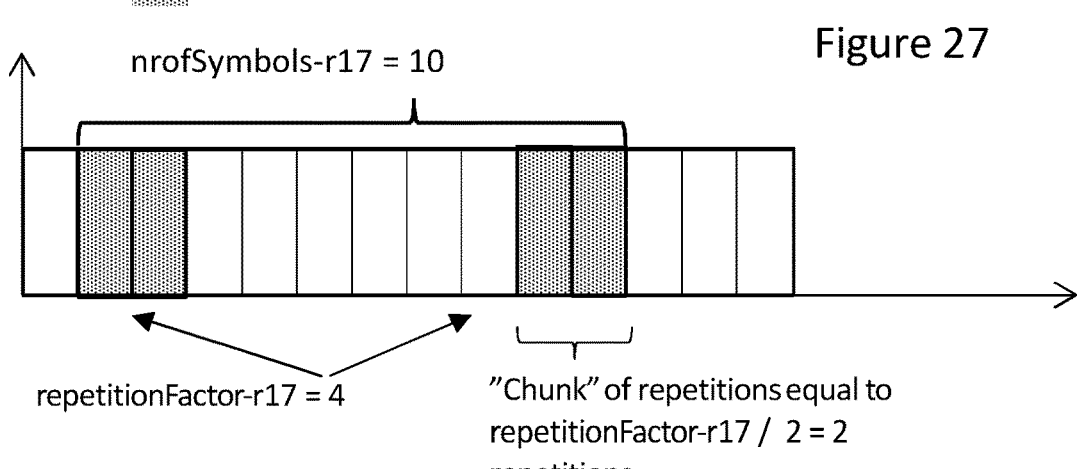
FIG. 27 is a block diagram illustrating SRS repetitions divided in two equally large sections according to some embodiments of inventive concepts of the present disclosure.

FIG. 27 illustrates an example of a further embodiment in which the UE implicitly interprets a certain SRS configuration as an SRS resource for transmission at different time instances with a gap period in between, and where the SRS repetitions are divided in to two equally large "chunks", one at the beginning of the SRS resource, and one at the end of the SRS resource. In this example, the SRS repetitions of an SRS resource is divided in to two equally large chunks of SRS transmissions (where each chunk consist of half of the "repetitionFactor-r17" repetitions), one at the beginning of the SRS resource and one at the end of the SRS resource. In the example of FIG. 27, an SRS resource has been configured with a repetition factor 4 (i.e. "repetitionFactor-r17"=4) and number of symbols equals to 10 (i.e. "nrofSymbols-r17"=10).

Alternatively or in addition, an additional parameter may be RRC configured to indicate that the UE should apply the solutions described with regards to FIGS. 26 and 27 as described above. One example of this can be seen in FIG. 28, where a new parameter "dopplerEst-r17" has been introduced per SRS resource IE, in the SRS resource IE specified in 3GPP TS 38.311. In this case the parameter "dopplerEst-r17" is a Boolean, and if it is set to true, the UE shall apply the implicit interpretation described above with regards to FIGS. 26 and 27.

In a further embodiment, a UE capability may be used to indicate whether or not the UE shall apply any of the two above-described implicit interpretation options. For example, if the UE has signaled in UE capability that it supports a corresponding functionality, then the UE would apply the implicit interpretation of the first or second option as described above with regards to FIGS. 26 and 27. It should be noted that these solutions may require that no frequency hopping is configured for the SRS resource. However, since it might be difficult for the UE to maintain phase between two SRS transmissions allocated at different parts of the frequency band and since it is preferred that the true channel is the same for the two transmission occasions, using SRS with frequency hopping might anyway not be a desirable choice for Doppler estimation.

In another embodiment, Doppler estimation is enabled by phase coherent SRS transmissions across slots. In this embodiment, a multitude of SRS sets, with one or a multitude of SRS resources each, are configured to be transmitted in the same or different slot, where the union or a subset of all the SRS resources of the multitude of SRS resource sets are transmitted phase coherently and separated sufficiently in time domain to enable Doppler estimation. For example, aperiodic sounding of 1T4R UEs is achieved with Rel-15/16 specifications as follows: zero or two SRS resource sets each configured with higher layer parameter resourceType in SRS-ResourceSet set to 'aperiodic' and with a total of four SRS resources for transmission of SRS in different symbols of two different slots. The two sets are each configured with two SRS resources, or one set is configured with one SRS resource and the other set is configured with three SRS resources. The UE shall expect that the two sets are both configured with the same values of the higher layer parameters alpha, p0, pathlossReferenceRS, and srs-PowerControlAdjustmentStates in SRS-ResourceSet. Different to Rel-15/16 specifications though, the SRS port of each SRS resource in the given two sets is associated with the same UE antenna port.

In some embodiments, the UE could be configured with transmission of other UL signals, e.g. PUCCH (Physical Uplink Control Channel) and/or PUSCH, during the gap period attained between the different SRS transmissions. In variant of such embodiments, UE capability signaling may be used to indicate whether the UE is capable of transmitting UL signals in the gap period between different SRS transmissions or not. Here, it is noted that such capability typically requires that the UE can maintain the phase of two SRS transmissions even when other signals have been transmitted in between.

In the following, some further embodiments of the present disclosure will be described. In these embodiments, the RAN node is embodied as a TRP and the communication device is embodied as a UE.

In 3GPP meeting RAN1 #104-e, the following agreements were reached on enhancements for HST-SFN (see RAN1 Chairman's Notes of 3GPP TSG RAN WG1 Meeting #104-e, Jan. 25-Feb. 5, 2021):

Scheme 1 is supported in Rel-17
  TRS is transmitted in TRP-specific/non-SFN manner
  DMRS and PDCCH/PDSCH from TRPs are transmitted in SFN manner
For scheme 1 and SFN transmission of PDCCH support
  Variant E for QCL assumption in TCI state when TRS is used as source RS
Two TCI states are supported for scheme 1 in FR2
  Support MAC CE activation of two TCI states for PDCCH An evaluation of the decision on support of specification based TRP pre-compensation scheme for HST-SFN scenario was agreed to be made on evaluation assumptions, including support semi-static (RRC based) switching of scheme 1 (PDSCH) with 2a, 2b, 3, 4.

In the following, options on possible TRP pre-compensation schemes will be further discussed.

According to one option, a Scheme 1 Based SFN Solution may use Dynamic Switching Between SFNed and Single TRP (S-TRP) Transmission. Scheme 1 based SFN may be configured by RRC. Dynamically switching between Scheme 1 and single TRP PDSCH transmission might however increase UE implementation complexity.

Even Scheme 1 based SFN is configured, system information and paging information still need to be transmitted from single TRP because these common signaling must be transmitted in a manner that all UE in the network can correctly decode the message, including UEs that don't support SFN transmission and UEs who's capability are unknown to the gNB.

Moreover, in a practical HST SFN deployment, the PDCCH transmission is not necessarily to be SFNed. If PDCCH is not transmitted in SFN manner, each of the CORESETs, which is also used as the default TCI state for PDSCH, is then associated with a single TCI state. Here, a CORESET refers to a set of physical resources (i.e., a specific area on NR Downlink Resource Grid) and a set of parameters that is used to carry PDCCH/DCI. When the offset between the reception of a DL DCI and the corresponding PDSCH is less than a threshold timeDurationForQCL, the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the UE. The default TCI state for the PDSCH would not work if UE doesn't support dynamic switch between S-TRP and SFN transmission for PDSCH.

Dynamic switching between PDSCH transmission to single and multiple TRPs is already supported in Rel-16

M-TRP transmission with single DCI. For PDSCH transmission, up to 8 TCI states or pair of TCI states may be activated and a UE may be dynamically indicated by a TCI codepoint in DCI one or two of the activated TCI states for PDSCH reception. The UE shall use the TCI-State according to the value of the 'Transmission Configuration Indication' field in the detected PDCCH with DCI for determining PDSCH antenna port quasi co-location. Accordingly, it can be expected that there is no significant additional UE implementation complexity due to dynamic switching between single TRP and Scheme 1 based SFN.

Furthermore, as there could be other areas that may be impacted by not supporting single TRP transmission, there can be undesirable consequences of not supporting dynamic switching. Therefore, dynamic indication of one or two activated TCI may be supported also for the SFN scenario in Rel-17, and it may be beneficial to support dynamic switching between S-TRP and SFNed transmission. As regards PDCCH SFN related issues and the default beam, MAC CE activation of two TCI states for PDCCH may be supported.

When two TCI states are activated for a CORESET and the CORESET has the lowest CORESET ID among CORESETs in a slot monitored by a UE, one question is how to define the default TCI state(s) for a PDSCH when the time offset between the reception of a DL DCI in the slot scheduling the PDSCH and the PDSCH is less than the threshold timeDurationForQCL. There are two possible options, i.e., Option 1: Only one of the two activated TCI states for the CORESET is used as the default TCI state for the PDSCH (e.g., either specified or indicated in the activation MAC CE).

Option 2: Both the two activated TCI states for the CORESET are used as the default TCI states for the PDSCH if it is supported by a UE.

It should be noted that default TCI state may also be used for UL power control when pathloss RS is not configured or for link monitoring when link monitoring RS is not configured. In these cases, only one DL RS is needed. Therefore, Option 1 seems preferable.

For a CORESET activated with two TCI states, one of the two activated TCI states may be used as the default TCI state, this TCI state could be specified or indicated in a MAC CE activating the TCI states.

Figure 29:
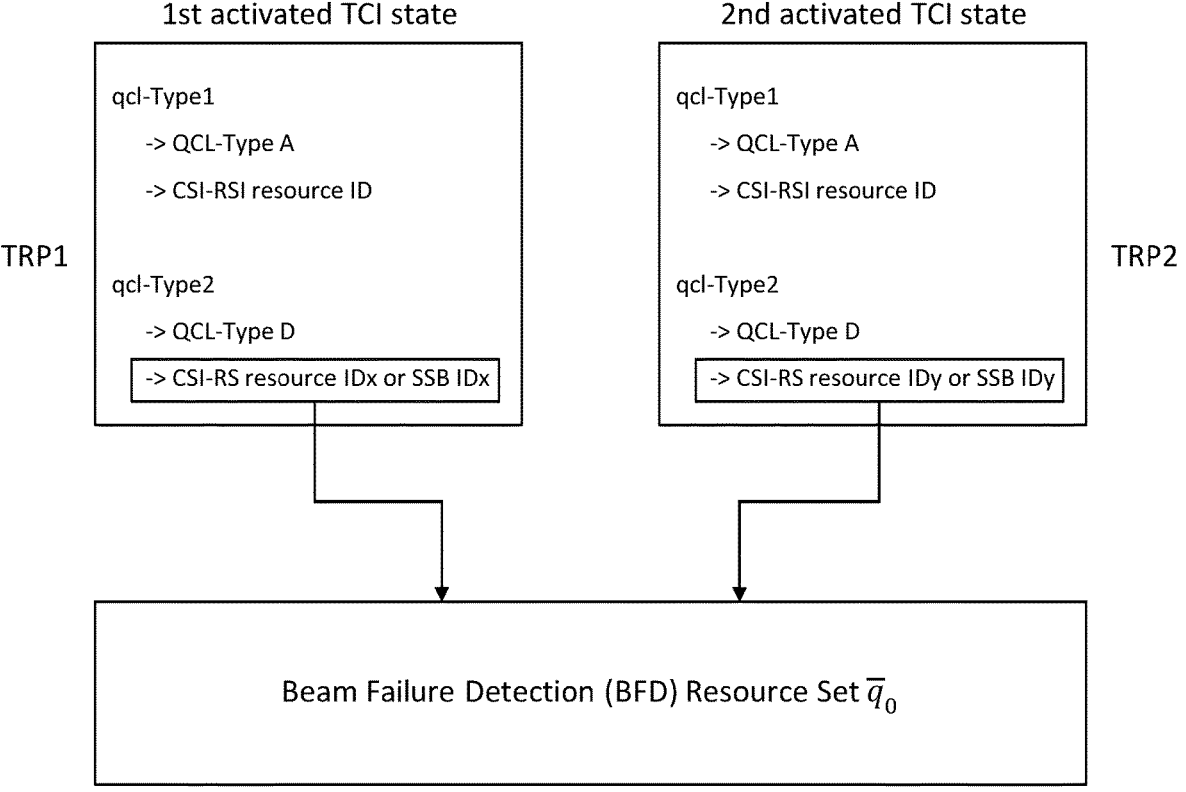
FIG. 29 illustrates an example of determining a Beam Failure Detection resource set.

As regards the BFD (Beam Failure Detection) Resource, when a CORESET is activated with two TCI states, there are different possibilities which TCI state the UE should use for determining the BFD-RS. Note that the SFN scheme is essentially a single-DCI based multi-TRP scheme since the same DCI is transmitted from two TRPs in SFN fashion. If implicit per-TRP BFD-RS configuration is not supported for single-DCI based multi-TRP in Rel-17, then there will be only a single BFD-RS set. One solution is to let the UE assume that the reference signals used as QCL sources (if each TCI state contains two reference signal, the UE will utilize the QCL-TypeD RS) in the two activated TCI states for the CORESET can be used as BFD-RSs in the single BFD-RS set. FIG. 29 illustrates an example of BFD resource determination with a single BFD resource set when CORESET is configured for SFN-based PDCCH diversity.

As shown in the example of FIG. 29, the QCL source reference signal with CSI-RS resource IDx (or SSB IDx) corresponding to the 1st activated TCI state and QCL source reference signal with CSI-RS resource IDy (or SSB IDy) corresponding to the 2nd activated TCI state shall be included by the UE in the beam failure detection resource set $\bar{q}_0$. When two TCI states are activated for a CORESET, it may thus be beneficial to support inclusion of reference signals used as QCL sources in the two activated TCI states as BFD-RSs in the single BFD-RS set $\bar{q}_0$. If the activated TCI states contains two reference signals, the UE may use the reference signals configured with QCL-TypeD.

Concerning gNB pre-compensation, in the following evaluation results are shown for scenarios with adaptive MCS for both DPS (Dynamic Point Switching) and SFN with Doppler pre-compensation. The evaluations were done based on simulations assuming a carrier frequency of 2 GHz, a DMRS configuration of '1+2 additional', 64-QAM table, rank 1 transmission and a UE velocity of 500 km/h. In the case of SFN transmission with Doppler pre-compensation, CSI-RS were assumed to be transmitted in an SFN manner so that the UE can measure a channel equivalent to the one experienced by the PDSCH, also assumed to be transmitted in an SFN manner, and report a suitable PMI and CQI. The CSI-RS were assumed to be Doppler pre-compensated in the same way as for the PDSCH transmitted from the same TRP.

In the simulations, a same precoder indicated by the PMI was applied to the two cross-polarized antennas at all the TRPs. For more than 2 antennas, however, applying a same precoder for all TRPs would not bet appropriate, as for different TRPs the directions to the UE would be different. In the case of DPS, CSI-RS were assumed to be transmitted from each TRP, and PMI and CQI were calculated and provided as feedback for each TRP. A TRP with the best CQI was selected for PDSCH transmission similar to the case of a single TRP transmission.

Figure 30A:
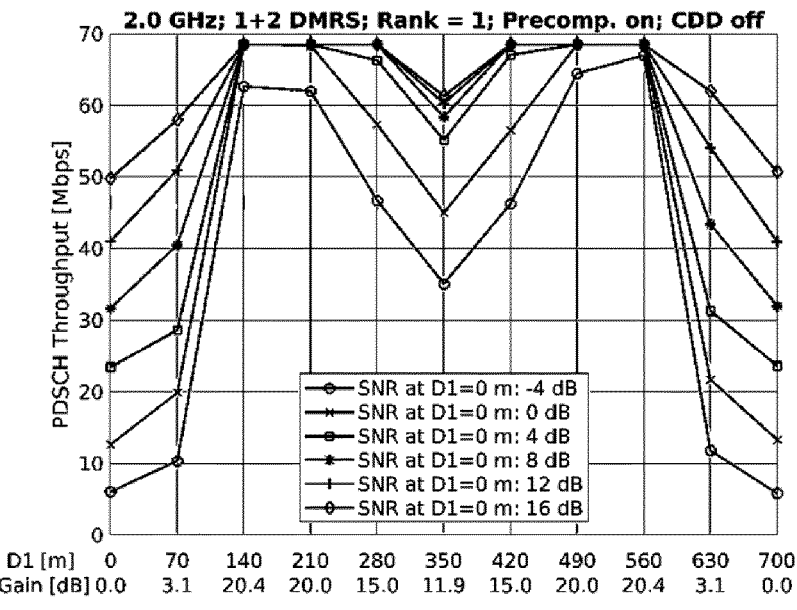
FIGS. 30A and 30B illustrates evaluated throughputs for an HST-SFN scenario.
Figure 30B:
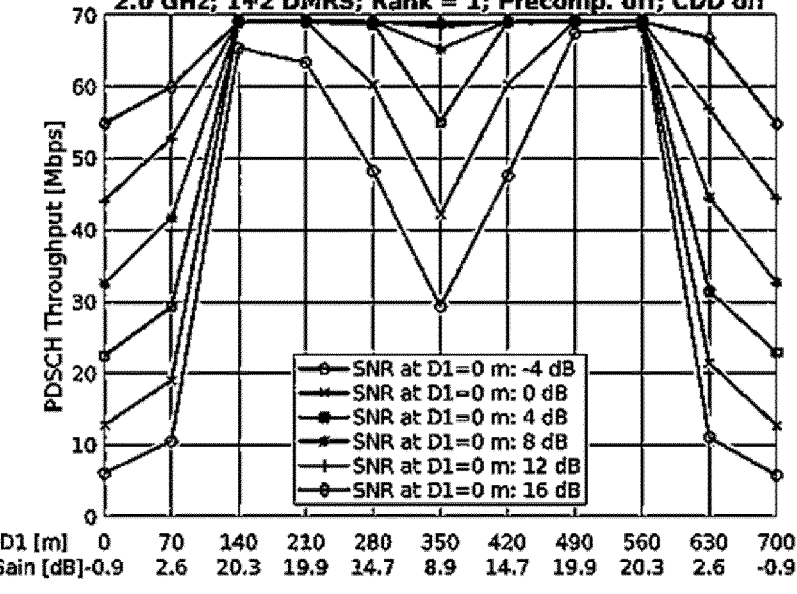

FIGS. 30A and 30B show the evaluated throughput as a function of UE location D1 in the case of SFN with Doppler pre-compensation and DPS. The value of D1=0 m corresponds to the closest distance of the UE to a TRP (e.g., like the 50 m distance from TRP to the train in the example of FIG. 13). The throughputs are shown for different SNRs. FIG. 30A shows the case with pre-compensation, and FIG. 30B shows the case without pre-compensation. At UE locations with high SNRs (Signal-to-Noise Ratios), the peak throughput of the highest MCS of the 64-QAM MCS table is achieved by both DSP and SFN with pre-compensation. This is because, in case of DPS transmission, the equivalent channel has lower Doppler spread and simple characteristics in contrast to the equivalent SFN channel.

As can be seen, at very low SNRs, i.e., SNR≤0 dB, SFN with pre-compensation performs slightly better than DPS at the midpoint, likely due to higher signal power from both TRPs and thus an MCS with a higher spectral efficiency. However, at high SNR, i.e., SNR>=8 dB, DPS performs better than SFN with pre-compensation at midpoint. It can thus be concluded that both DPS and SFN with pre-compensation perform well in the case of link adaptation. Peak throughputs of the highest MCS in the 64-QAM table were reached at high SNRs. Further, DPS performs better than SFN with pre-compensation at high SNRs for UE close to the midpoint between TRPs. SFN with pre-compensation performs better than DPS at very low SNRs (i.e., at or below 0 dB SNR) for UE close to the midpoint between TRPs.

As regards steps and procedures that may be needed for a gNB pre-compensation solution, the following may be considered for a TRP-based frequency offset pre-compensation scheme:

1st step: Transmission of the TRS resource(s) from TRP(s) without pre-compensation, 2nd step: Transmission of the uplink signal(s)/channel(s) with carrier frequency determined based on the received TRS signals in the 1st step, 3rd step: Transmission of the PDCCH/PDSCH from TRP(s) with frequency offset pre-compensation determined based on the received signal/channel in the 2nd step. A second set of TRS resource(s) may be transmitted at 3rd step.

In this respect, the following aspects of TRP-based frequency offset pre-compensation may be further considered:

Aspects related to indication of the carrier frequency determined based on the received TRS resource(s) in the 1st step Option 1: Implicit indication of the Doppler shift(s) using uplink signal(s) transmitted on the carrier frequency acquired in the 1st step Indication for QCL-like association of the resource(s) received in the 1st step with UL signal transmitted in the 2nd step Type of the uplink reference signals/physical channel used in the 2nd step, necessity of new configuration and corresponding signaling details Option 2: Explicit reporting of the Doppler shift(s) acquired in the 1st step using CSI framework Indication for QCL-like association of the resource(s) received in the 1st step with UL signal transmitted in the 2nd step CSI reporting aspects, configuration, quantization, signaling details, etc.

New QCL types/assumption for TRS with other RS (e.g., SS/PBCH), when TRS resource(s) is used as target RS in TCI state New QCL types/assumptions for TRS with other RS (e.g., DM-RS), when TRS resource(s) is used as source RS in the TCI state Target physical channels (e.g., PDSCH only or PDSCH/PDCCH) and reference signals that should be supported for pre-compensation Signaling/procedural details on whether/how the pre-compensation is applied to target channels Whether multiple sets of TRS and pre-compensation on TRS is needed in 3rd step.

As regards anchoring DL RS for UL frequency, two options may be considered depending on whether the Doppler frequency is estimated at the gNB (Option 1) or at the UE (Option 2). In both options, it can be assumed that multiple TRS are transmitted from multiple TRPs. Different TRS transmission schemes are possible.

Figure 31:
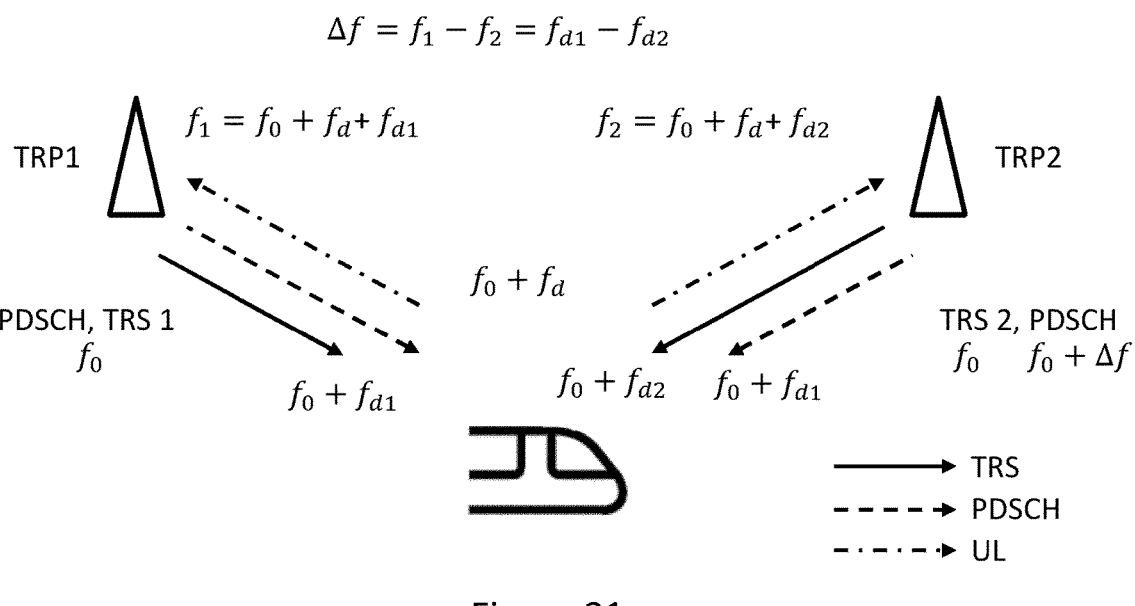
FIG. 31 shows an example of a HST-SFN scenario with Doppler pre-compensation with separate TRS per TRP.
Figure 32:
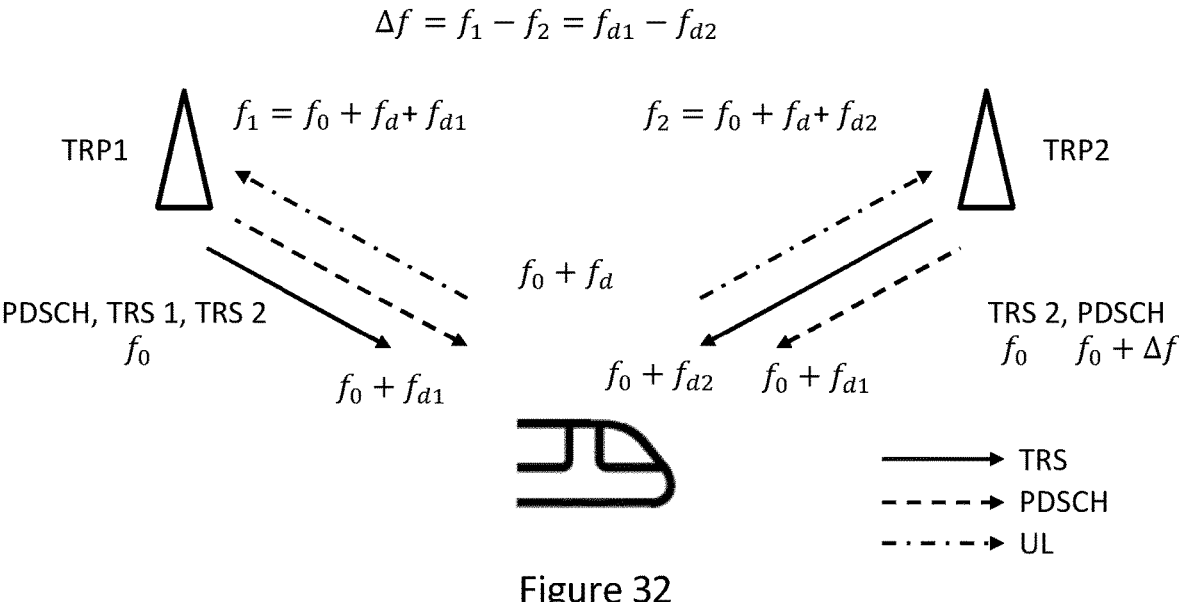
FIG. 32 shows example of a HST-SFN scenario with Doppler pre-compensation with a first TRS in one TRP and a second SFNed TRS over both TRPs.

In one option, it is assumed that a separate TRS is transmitted from each TRP and the TRS is not pre-compensated. A UE derives DL frequency from one of the TRSs for UL transmissions to both TRPs, the gNB measures the UL frequency difference between two TRPs based one a UL signal and pre-compensate DL frequency for one of the TRPs such that from UE perspective, a same DL frequency is observed from both TRPs. This is illustrated in FIG. 31. In this case, the UE can use any one of the TRSs to derive frequency for UL transmission. The gNB doesn't need to know which TRS was used for the purpose at the UE. The benefit is that UE can make decision based on, for example, the received RSRP and the strongest TRS can always be used for better estimation reliability and accuracy. With separate TRS per TRP and PDSCH over one TRP being pre-compensated, more reliable and accurate frequency estimation can be achieved by letting UE to select the TRS for deriving UL frequency. In this option, a third SFNed TRS may be needed for supporting legacy SFN UEs.

In another option, it is assumed that a first TRS is transmitted over one TRP, and a second TRPs is transmitted over two TRPs in a SFN manner. This is illustrated in FIG.

32. A UE can derive the DL frequency from one of the two TRS and use it for UL transmissions to both TRPs. The gNB measures the UL frequency difference between two TRPs based on a UL signal and pre-compensate DL frequency for one of the TRPs such that from UE perspective, a same DL frequency is observed from both TRPs. If the UE use the SFNed TRS for frequency estimation, the estimated frequency would be a value between the two received DL frequencies from the two TRPs, depending on the relative received signal power from the two TRPs. This can be expected to work as long as the estimation is stable. The absolute value is not important as only the UL frequency difference between the two TRPs would be used for the pre-compensation. Accordingly, with a first TRS over one TRP and a second SFNed TRS over both TRPs, it is still possible to let the UE to select the TRS for deriving UL frequency. For gNB based Doppler pre-compensation, there is no need to indicate a DL RS to a UE as a source RS for deriving the UL frequency.

As mentioned above, gNB based Doppler estimation may be used in the pre-compensation. This corresponds to above Option 1 and relies on the gNB to estimate the Doppler shift based on a UL signal for each UE served by the gNB. For a train with many passengers, Option 1 may cost a rather large amount of UL resources and may not be feasible in a deployment when pre-compensation is considered to serve many users. The UL resources could be exhausted and the effort on coordinate the scheduling can be heavy. In addition, as observed in the above evaluation, pre-compensation is slightly better than DPS only at very low SNR. How reliable or accurate Doppler estimation can be achieved based on a UL signal at very low SNR may need to be further investigated.

It should be noted that the Doppler estimation in the pre-compensation simulation is based on ideal assumptions, i.e., that the gNB can accurately estimate the UL frequency difference between the two TRPs. In case of real implementation, different local oscillators (LOs) are typically used in the two TRPs and the associated frequency difference cannot be compensated. In addition, the frequency estimation accuracy depends on the SNR of the UL signal, the same level of accuracy of the doppler shift may be difficult to achieve and the performance of pre-compensation will degrade in practice.

It should also be noted that in the simulation used for the above evaluation, two cross-polarized antennas were assumed to be used at each TRP, with only co-phasing being applied based on a SFNed PMI feedback. In case that there are more than two antennas at each TRP, precoding at each TRP typically also involves beam steering. Assuming a common PMI at the UE based on SFNed CSI-RS then wouldn't make sense anymore. Using precoder cycling can be possible, but there could be a CQI mismatch between what was assumed at the UE in calculating the CQI and what was actually being applied at the gNB. In addition, in case of HST, short-term channel property changes quickly and co-phasing may no longer be adequate. Therefore, achieving more accurate CSI feedback in HST-SFN may require further measures. Accordingly, it can be observed that the performance gain achieved by pre-compensation relies on accurate Doppler shift estimation at gNB and reported CSI from UE. UL signals, including PUCCH, PUSCH and SRS, can be configured and scheduled by gNB to derive the experienced Doppler shift from the UE. However the accuracy of frequency offset estimation based on PUCCH is unclear. Estimating based on PUSCH may be more reliable than PUCCH, however that solution come with a cost of constant scheduling of PUSCH for that UE even when there's no uplink data in the data buffer. For HST network with many connected UEs, the solution exhausting PDCCH and PUSCH resources seems unattractive for commercial deployment. In other words, PUSCH based Doppler estimation may excessively exhaust PDCCH and PUSCH resources when there are many users in the network.

A more practical solution is to configure SRS and derive the frequency offset based on received SRS. The existing SRS configuration is however not designed for the purpose of Doppler estimation. Accordingly a further enhancement may be needed in the HST scenario. If periodic SRS is configured, in order to increase number of supported UEs, SRS periodicity may need to increase accordingly, which can lead to inadequate estimation.

As mentioned above, some solutions may involve UE reporting of Doppler shift. For example in above Option 2 in the previous agreements, instead of measuring Doppler shift by the gNB based on a UL signal, a UE measures and reports the Doppler shifts or the difference of Doppler shifts received from two TRPs based on DL RS such as TRS. In the above evaluation, pre-compensation is slightly better than DPS only at very low SNR. As coverage is typically UL limited, Doppler measurement based on DL RS can provide better reliability and/or accuracy than UL signal based Doppler estimation, particularly when a UE is at the cell edge. In case of HST-SFN, cell edge can typically assumed to be at the middle of two TRPs. Accordingly, it can be observed that pre-compensation performs better than DPS at very low SNR, in which a UE is likely power limited. Doppler estimation based on DL RS can expected to be more reliable and accurate than based on a UL signal. For SFN with Doppler pre-compensation, UE reporting of Doppler shift may be preferred.

As regards, the QCL type there may be four variations of TCI association with DMRS of PDCCH and PDSCH with downlink RS (see, e.g., see RAN1 Chairman's Notes of 3GPP TSG RAN WG1 Meeting #103-e, Oct. 26-Nov. 13, 2021):

Variant A: One of the TCI state can be associated with {average delay, delay spread} and another TCI states can be associated with {average delay, delay spread, Doppler shift, Doppler spread} (i.e., QCL-TypeA)

Variant B: One of the TCI state can be associated with {average delay, delay spread} and another TCI state with {Doppler shift, Doppler spread} (i.e., QCL-TypeB)

Variant C: One of the TCI state can be associated with {delay spread} and another TCI states can be associated with {average delay, delay spread, Doppler shift, Doppler spread} (i.e., QCL-TypeA)

Variant E: Both TCI states can be associated with {average delay, delay spread, Doppler shift, Doppler spread} (i.e., QCL-TypeA)

Variants A, B and C are for supporting pre-compensation based HST-SFN enhancements in which TRS is not pre-compensated while an associated PDSCH is. In Variant A, the Doppler shift and spread are derived from one TRS while the average delay and delay spread are derived from either one of or both TRS'. In Variant B, the Doppler shift and spread are derived from one TRS while the average delay and delay spread are derived from the other TRS. In Variant C, similar to Variant A, the delay spread is associated with both TRS.

Figure 33:
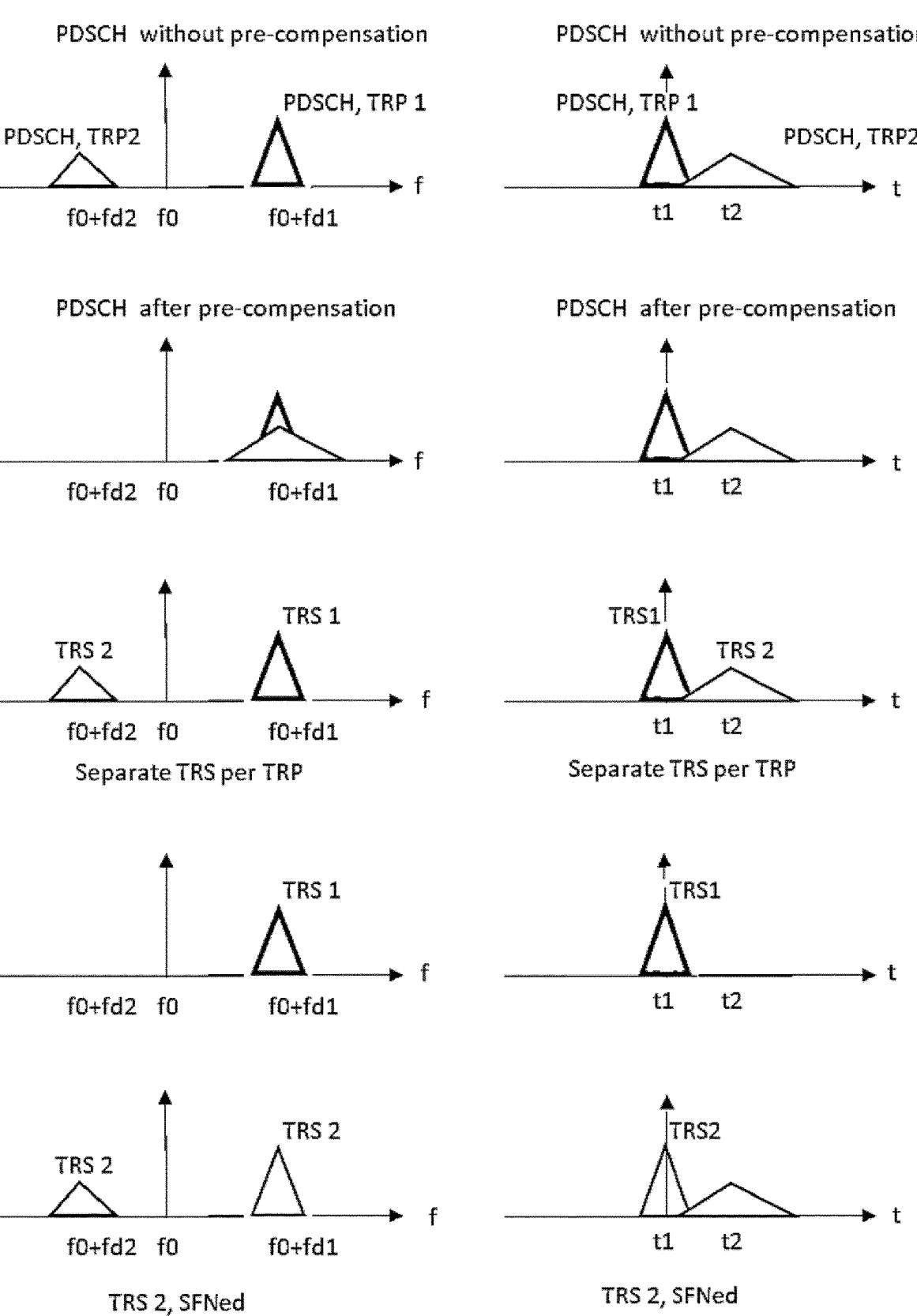
FIG. 33 shows an example of time and frequency domain signals with and without Doppler pre-compensation.

QCL relation between a PDSCH DMRS and a DL RS is used to help perform channel filtering in both time and frequency domain. FIG. 33 illustrates an example of the time and frequency domain channels experienced by PDSCH, with and without pre-compensation, and by the TRS transmitted from two TRPs. For TRS, two scenarios are shown. In a first scenario, separated TRS are transmitted from each TRP. In a second scenario, TRS1 is transmitted from TRP1 only while TRS2 is transmitted from both TRPs in a SFN manner.

In case of separate TRS per TRP, it can be seen that TRS1 has the same Doppler frequency as the pre-compensated PDSCH, but not exactly the same for Doppler spread if the Doppler spread from TRP2 is different from TRP1. In the time domain, each TRS represent part of the time domain channel experienced by the PDSCH. Therefore, the UE can determine the Doppler shift based on TRS1, Doppler spread based on both TRS1 and TRS 2, average time and delay spread based on both TRS 1 and TRS 2. This corresponds to using TRS1 for {Doppler shift/spread, average delay and delay spread} (i.e., QCL type A), and TRS2 for {Doppler spread, average delay and delay spread}, which doesn't correspond to any QCL type. If we assume that the two TRPs have the same Doppler spread, then it may be estimated based on only TRS1, then TRS2 may be used for {average delay and delay spread}. This corresponds to variant A. Accordingly, in case of separate TRS per TRP and if a same Doppler spread is assumed from two TRPs, then variant A can be used.

In case that one TRS is transmitted over both TRPs, it can be seen that again TRS1 has the same Doppler frequency as the pre-compensated PDSCH, but not exactly the same for Doppler spread if the Doppler spread from TRP2 is different from TRP1. In the time domain, TRS 2 has the same average delay and delay spread as the PDSCH. Therefore, the UE can determine the Doppler shift based on TRS1, Doppler spread based on both TRS1 (even though it is not exactly the same as PDSCH), average time and delay spread based on TRS 2. This corresponds to using TRS1 for {Doppler shift/spread} (i.e., QCL type B), and TRS2 for {average delay and delay spread}. This corresponds to variant B. Accordingly, in case that one TRS is transmitted with SFN and if a same Doppler spread is assumed from two TRPs, then variant B can be used.

In Variant C, average delay, Doppler shift and Doppler spread would be determined based one TRS while delay spread is based two TRS. From FIG. 33, it can be seen that the average delay depends on delays from both TRPs unless the two TRPs have the exact same delay to the UE. Therefore, as compared to variant A, variant C has one more assumption to be considered.

From the above, it can thus be seen that for different TRS transmission schemes, different variants are needed with certain assumptions such as about Doppler spread or average delay difference between the two TRPs. The variant which is preferred to be utilized also depends on how TRSs are transmitted. For example, either variant A or B could be utilized. Given that with one SFNed TRS as one of the two TRSs could also be used to support legacy UEs and thus one TRS overhead can be saved, variant B could be preferred for a gNB based pre-compensation scheme.

As regards TA (Timing Advance) adjustment, 3GPP TS 38.133 V16.20 (2019-12) specifies a TA adjustment denoted as "gradual timing adjustment". This gradual timing adjustment may however be not sufficient to support the HST deployment. In HST scenario, uplink timing relies on the timing advance command (TAC) being sent via MAC CE to UE for adjusting the uplink transmit timing. For each UE connected to gNB, its uplink transmit timing need to be adjusted very frequently such that the uplink signal arrives to gNB within the time frame of uplink detection window. Updating the TA via MAC CE consumes both PDCCH and PDSCH resources. Considering a train with 1323 passengers moving at a speed of 300 km/h and passes by a new TRP per 8 seconds, updating TA for each UE impacts the PDCCH capacity and the overall system performance. In a real network where discontinuous reception (DRX) is typically enabled, the issue with TA gets even worse. The timing UE maintained at the beginning of a DRX period will get shifted rapidly that the timing misalignment may exceed the cyclic prefix when there's no active traffic during several DRX cycles. For a high loaded network that a TAC can't get sent to UE on the short DRX inactivity time, UE may frequently lose the uplink synchronization and have to perform random access to get resynchronized.

Further, 3GPP TS 38.133 V16.20 also specifies a TA scheme denoted as "one shot timing adjustment". In this case, a UE adjust its transmitting time autonomously based on the received downlink signal. For HST deployment supporting of this scheme would resolve the issue of TA adjustment as the TA is maintained autonomously by UE at receiving downlink signals. A TA scheme similar to the "one shot timing adjustment" scheme may be a preferred solution for HST.

Accordingly, the following observations can be summarized for HST-SFN:

Both DPS and SFN with pre-compensation perform well in the case of link adaptation, peak throughputs of the highest MCS in the 64-QAM table was reached at high SNRs.

DPS performs better than SFN with pre-compensation at high SNRs for UE close to the midpoint between TRPs.

SFN with pre-compensation performs better than DPS at very low SNRs (i.e., at or below 0 dB SNR) for UE close to the midpoint between TRPs.

With separate TRS per TRP and PDSCH over one TRP is pre-compensated, more reliable and accurate frequency estimation can be achieved by letting UE to select the TRS for deriving UL frequency.

With a first TRS over one TRP and a second SFNed TRS over both TRPs, it is still possible to let the UE to select the TRS for deriving UL frequency.

The performance gain achieved by pre-compensation relies on accurate Doppler shift estimation at gNB and reported CSI from UE. How to achieve both needs further study.

PUSCH based doppler estimation exhausting PDCCH and PUSCH resources when there're many users in the network.

Pre-compensation performs better than DPS at very low SNR, in which a UE is likely power limited. Doppler estimation based on DL RS should be more reliable and accurate than based on a UL signal.

In case of separate TRS per TRP and if a same Doppler spread is assumed from two TRPs, then variant A can be used.

In case that one TRS is transmitted with SFN and if a same Doppler spread is assumed from two TRPs, then variant B can be used.

Which variant to support also depends on how TRSs are transmitted.

Using "gradual timing adjustment" scheme for TA adjustment may not be sufficient for HST scenario.

The "one shot timing adjustment" TA scheme may a preferred solution for HST.

Further, in view of the above, the following measures may be beneficial:

Support of Dynamic switching between s-TRP and SFNed transmission shall be supported.

For a CORESET activated with two TCI states, one of the two activated TCI states is used as the default TCI state, FFS whether the one is specified or indicated in a MAC CE activating the TCI states.

When two TCI states are activated for a CORESET, support inclusion of reference signals used as QCL sources in the two activated TCI states as BFD-RSs in the single BFD-RS set q. If the activated TCI states contains two reference signals, the UE will use the reference signals configured with QCL-TypeD For gNB based Doppler pre-compensation, there is no need to indicate a DL RS to a UE as a source RS for deriving the UL frequency.

For SFN with Doppler pre-compensation, UE reporting of Doppler shift is preferred.

Variant B may be slightly preferred for gNB based pre-compensation scheme.

Figure 34:
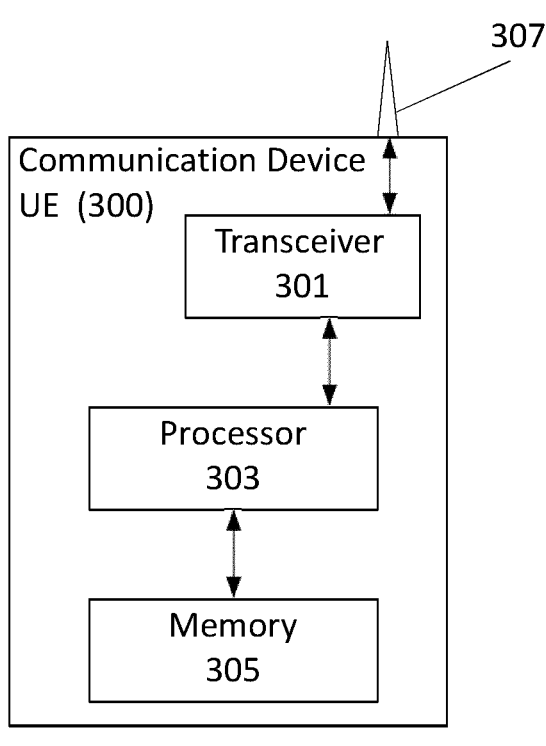
FIG. 34 is a block diagram illustrating a wireless device UE according to some embodiments of inventive concepts of the present disclosure.

FIG. 34 is a block diagram illustrating elements of a communication device UE 300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of the inventive concepts. (Communication device 300 may be provided, for example, as discussed below with respect to wireless device 4110 of FIG. 39.) As shown, communication device UE may include an antenna 307 (e.g., corresponding to antenna 4111 of FIG. 39), and transceiver circuitry 301 (also referred to as a transceiver, e.g., corresponding to interface 4114 of FIG. 39) including a transmitter and a receiver configured to provide uplink and downlink radio communications with a base station(s) (e.g., corresponding to network node 4160 of FIG. 39, also referred to as a RAN node) of a radio access network. Communication device UE may also include processing circuitry 303 (also referred to as a processor, e.g., corresponding to processing circuitry 4120 of FIG. 39) coupled to the transceiver circuitry, and memory circuitry 305 (also referred to as memory, e.g., corresponding to device readable medium 4130 of FIG. 39) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device UE may also include an interface (such as a user interface) coupled with processing circuitry 303, and/or communication device UE may be incorporated in a vehicle.

As discussed herein, operations of communication device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations for implementing the illustrated concepts, as explained above.

Figure 35:
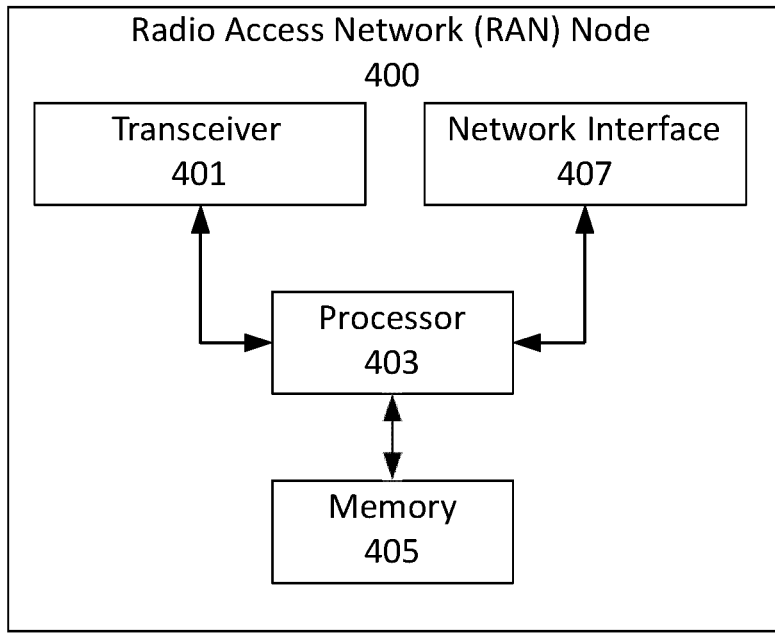
FIG. 35 is a block diagram illustrating a radio access network RAN node (e.g., a base station eNB/gNB) according to some embodiments of inventive concepts of the present disclosure.

FIG. 35 is a block diagram illustrating elements of a radio access network RAN node 400 of a Radio Access Network (RAN) configured to provide cellular communication according to embodiments of inventive concepts. The RAN node 400 may also referred to as a network node, base station, eNodeB/eNB, gNodeB/gNB, etc. RAN node 400 may be provided, for example, as discussed below with respect to network node 4160 of FIG. 39. As shown, the RAN node may include transceiver circuitry 401 (also referred to as a transceiver, e.g., corresponding to portions of interface 4190 of FIG. 39) including a transmitter and a receiver configured to provide uplink and downlink radio communications with mobile terminals. The RAN node may include network interface circuitry 407 (also referred to as a network interface, e.g., corresponding to portions of interface 4190 of FIG. 39) configured to provide communications with other nodes (e.g., with other base stations) of the RAN and/or core network CN. The network node may also include processing circuitry 403 (also referred to as a processor, e.g., corresponding to processing circuitry 4170) coupled to the transceiver circuitry, and memory circuitry 405 (also referred to as memory, e.g., corresponding to device readable medium 4180 of FIG. 39) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations for implementing the illustrated concepts, as explained above.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 36:
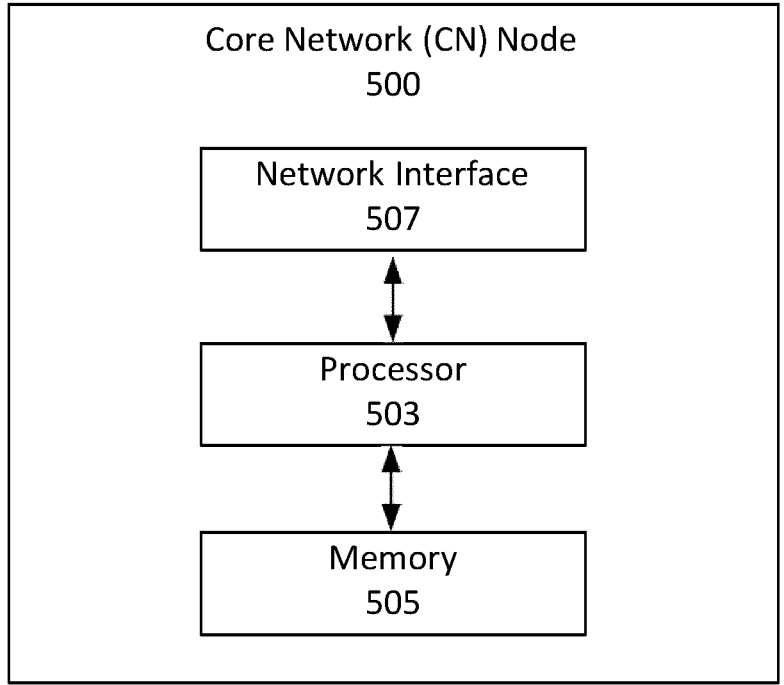
FIG. 36 is a block diagram illustrating a core network CN node (e.g., an AMF node, an SMF node, etc.) according to some embodiments of inventive concepts of the present disclosure.

FIG. 36 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations for implementing the illustrated concepts, as explained above.

Embodiments of operations of a RAN node 400, which may be implemented using the structure of FIG. 35, will now be discussed with reference to the flow chart of FIG. 37. For example, modules may be stored in memory 405 of FIG. 35, and these modules may provide instructions so that when the instructions of a module are executed by respective RAN node processing circuitry 403, processing circuitry 403 performs respective operations of the flow chart.

Various operations from the flow chart of FIG. 37 may be optional with respect to some embodiments of RAN nodes and related methods. For example, operations of block 3204 of FIG. 37 may be optional.

FIG. 37 illustrates a method of operating a radio access network (RAN) node according to embodiments of the present disclosure. As illustrated by block 3200 of FIG. 37, the method includes configuring a communication device operating in the communication network to transmit a first SRS at a first time instance and a second SRS at a second time instance separated in time by a gap period from the first time instance. For example, RAN 400 operates to configure communication device 300 operating in a communication network (e.g., see FIGS. 39-47) to transmit a first SRS at a first time instance and as second SRS at second time instance. The first time instance and the second time instance are separated in time by a gap period. In some embodiments, the gap period comprises one or more OFDM symbols.

As illustrated by block 3202, the method also includes configuring 3202 the communication device to transmit the first SRS and the second SRS using a same antenna port and to not transmit other SRS signals from the same antenna port during the gap period, as shown in FIG. 37. Continuing the previous example, the RAN node 400 may configure communication device 300 to transmit the first SRS and the second SRS using a same antenna port. RAN node 400 also configures communication device 300 to not transmit other SRS signals from the same antenna port of communication device 300 during the gap period. In some embodiments, the first SRS and the second SRS are configured for transmission on a same SRS resource. In an alternative embodiment, the first SRS and the second SRS are configured for transmission on different SRS resources. According to some embodiments, the method includes configuring the communication device to transmit the first and second SRS in a same slot. In an alternative embodiment, the method includes configuring the communication device to transmit the first and second SRS in different slots. Additional examples and embodiments regarding transmission of the SRS signals using either same or different SRS resources and same or different slots are also discussed above with regards to FIGS. 18-20.

In some embodiments, the method includes providing a SRS resource set to the communication device. In this embodiment the SRS resource set defines SRS resources to transmit the SRS at the first time instance and the second SRS signal at the second time instance. For example, RAN node 400 may provide a SRS resource set to communication device 300. The SRS resource set defines SRS resources for communication device 300 to transmit the first SRS at the first time instance and the second SRS at the second time instance.

In some embodiments, the method includes configuring the communication device with a higher layer parameter that indicates that two or more SRS resources of the SRS resource set are to be transmitted with a same antenna port of the communication device. For example, RAN node 400 may configure communication device 300 with a higher layer parameter that indicates that the two or more SRS resources are to be transmitted with a same antenna port of communication device 300. Additional examples and embodiments regarding configuration of a higher layer parameter is also discussed above with regards to FIGS. 18-20.

In some embodiments, the method includes configuring the communication device with a higher layer parameter that exceeds a maximum port switching capability of the communication device which forces the communication device to transmit using the same antenna port of the communication device. For example, RAN node 400 may configure communication device 300 with a higher layer parameter that exceeds a maximum port switching capability of communication device 300. This configuration forces communication device 300 to transmit the first and second SRS using the same antenna port of communication device 300.

In some embodiments, the method includes providing a first parameter and a second parameter per SRS resource of the SRS resource set. In such embodiments, the first parameter may indicate that the communication device is to repeat an SRS transmission, and the second parameter may indicate a gap period between each repetition of a SRS transmission. For example, RAN node 400 may provide a first parameter and a second parameter per SRS resource of the SRS resource set to communication device 300. The first parameter indicates to communication device 300 to repeat a SRS transmission. The second parameter indicates to communication device 300 a gap period between each repetition of the SRS transmission. In some embodiments, the method includes providing a parameter that indicates the communication device is to repeat the SRS transmission within each transmission instance. In some embodiments, the gap period is between a last symbol of an SRS resource transmission occasion and a first symbol of a subsequent SRS resource transmission occasion. Additional examples and embodiments regarding provision of the first parameter and the second parameter are also discussed above with regards to FIGS. 21-24.

In some embodiments, the method includes communicating information that implicitly indicates to the communication device to transmit the first SRS at the first time instance and the second SRS at the second time instance. For example, RAN node 400 may communicate information that implicitly indicates to communication device 300 to transmit the first SRS at the first time instance and the second SRS at the second time instance. In some embodiments, the information that implicitly indicates to the communication device to transmit the first SRS at the first time instance and the second SRS at the second time instance comprises a number of symbols for a SRS resource that is larger than a repetition factor, and frequency hopping is not configured for the SRS resource. Additional examples of information that implicitly indicates to the communication device to transmit the first SRS at the first time instance and the second SRS at the second time instance are also discussed above with regards to FIGS. 25-28.

In an further embodiment, the method includes communicating information that explicitly indicates to the communication device to transmit the first SRS at the first time instance and the second SRS at the second time instance. For example, RAN node 400 may communicate information that explicitly indicates to communication device 300 to transmit the first SRS at the first time instance and the second SRS at the second time instance. In some embodiments, the method includes including a parameter in an RRC message to the communication device. The parameter may explicitly indicate to the communication device to transmit the first SRS at the first time instance and the second SRS at the second time instance. Continuing the previous example, RAN node 400 may include a parameter in an RRC message to communication device 300 that explicitly indicates to communication device 300 to transmit the first SRS at the first time instance and the second SRS at the second time instance. Additional examples of information that explicitly indicates to the communication device to transmit the first SRS at the first time instance and the second SRS at the second time instance are also discussed above with regards to FIGS. 25-28.

In some embodiments, the method includes configuring the communication device to transmit SRSs at multiple different time instances with gap periods between each different time instance of the multiple different times instances. For example, RAN node 400 may configure communication device 300 to transmit SRSs at multiple different time instances with gap periods between each different time instance of the multiple different times instances. In some embodiments, the multiple different time instances are uniform throughout the time period. In alternative embodiments, the multiple different time instances are non-uniform throughout the time period.

In some embodiments, the multiple different time instances comprises the first time instance at a beginning of the SRS resource and the second time instance at an end of the SRS resource. In such embodiments, the SRSs may be are divided equally between the first time instance and the second time instance. The multitude of SRS sets are configured to be transmitted in a same or a different slot. Alternatively, a union or a subset of all SRS resources of the multitude of SRS resource sets are configured to be utilized for transmitting an SRS phase coherently and separated in a time domain. Additional examples of configuring the communication device to transmit SRSs at multiple different time instances are also discussed above with regards to FIGS. 25-28.

According to some embodiments, the method may include configuring the communication device to transmit uplink signals during the gap period, as illustrated by block 3204. In some embodiments, the method includes determining that the communication device is capable of transmitting uplink signals during the gap period based on capability information associated with the communication device and configuring the communication device to transmit uplink signals during the gap period based on determining the communication device is capable of transmitting uplink signals during the gap period. For example, RAN node 400 configures communication device 300 to transmit uplink signals during the gap period based on a determination that communication device 300 is capable of transmitting uplink signals during the gap period based on capability information associated with communication device 300. Additional examples and embodiments regarding configuring the communication device to transmit uplink signals during the gap period are also discussed herein above.

In some embodiments, the method may further include that the RAN node receives the first SRS and the second SRS. In such embodiments, the RAN node may perform estimation of Doppler frequency shift based on the received first SRS and the received second SRS. In some case, the RAN node may use the estimated Doppler frequency shift for pre-compensation Doppler effects in communication signals transmitted to or from the communication device.

Embodiments of operations of the communication device 300, which may be implemented using the structure of the block diagram of FIG. 34, will now be discussed with reference to the flow chart of FIG. 38. For example, modules may be stored in memory 305 of FIG. 34, and these modules may provide instructions so that when the instructions of a module are executed by respective communication device processing circuitry 303, processing circuitry 303 performs respective operations of the flow chart.

Various operations from the flow chart of FIG. 38 may be optional with respect to some embodiments of communication devices and related methods. For example, operations of block 3304 of FIG. 38 may be optional.

FIG. 38 illustrates a method of operating a communication device according to embodiments of the present disclosure. As illustrated by block 3300, the method includes transmitting a first Sounding Reference Signal, SRS, at a first time instance and a second SRS at a second time instance separated in time by a gap period from the first time instance. In some embodiments, the gap period comprises one or more OFDM symbols. For example, communication device 300 may transmit a first SRS at a first time instance and a second SRS at a second time instance separated in time by a gap period from the first time instance. As illustrated by block 3302, the method also includes transmitting 3302 the first SRS and the second SRS using a same antenna port and refraining from transmitting other SRS signals from the same antenna port during the gap period. Continuing the previous example, communication device 300 may transmit the first SRS and the second SRS using a same antenna port and refrain from transmitting other SRS signals from the same antenna port during the gap period.

In some embodiments, the method includes transmitting the first and second SRS in a same slot. In another embodiment, the method includes transmitting the first and second SRS in different slots. Additional examples and embodiments regarding the communication device transmitting the first and second SRS are also discussed above with regards to FIGS. 18-20.

According to some embodiments, the method may include obtaining a SRS resource set from a radio access network, RAN, node. The SRS resource set defines SRS resources to transmit the first SRS at the first time instance and the second SRS at the second time instance. For example, communication device 300 may obtains from RAN node 400 the SRS resource set defining SRS resources to transmit the first SRS at the first time instance and the second SRS at the second time instance. In some embodiments, the method includes obtaining a higher layer parameter that indicates that two or more SRS resources of the SRS resource set are to be utilized for transmission of SRS with a same antenna port of the communication device. In some other embodiments, the method includes obtaining a higher layer parameter from the RAN node that exceeds a maximum port switching capability of the communication device which forces the communication device to transmit the first and second SRS using the same antenna port of the communication device. Additional examples and embodiments of the communication device obtaining a higher layer parameter from the RAN node are also discussed above with regards to FIGS. 18-20.

According to some embodiments, the method may include obtaining a first parameter and a second parameter per SRS resource of the SRS resource set. The first parameter indicates that the communicate device is to repeat a SRS transmission and the second parameter indicates a gap period between each repetition of a SRS transmission. For example, communication device 300 may obtain a first parameter and a second parameter per SRS resource of the SRS resource set from RAN node 400. In some embodiments, the method may also include that the communication device obtains a parameter that indicates the communication device is to repeat the SRS transmission within each transmission instance. The gap period may be between a last symbol of an SRS resource transmission occasion and a first symbol of a subsequent SRS resource transmission occasion in some embodiments. In another example, communication device 300 may obtain a parameter that indicates communication device 300 is to repeat the SRS transmission within each transmission instance from RAN 400. Additional examples and embodiments of the communication device obtaining parameters associated with a SRS resource set are also discussed above with regards to FIGS. 21-24.

In some embodiments, the method may include obtaining information that implicitly indicates to the communication device to transmit the first SRS at the first time instance and the second SRS at the second time instance. In such embodiments, the information that implicitly indicates to the communication device to transmit the first SRS at the first time instance and the second SRS at the second time instance comprises a number of symbols for a SRS resource that is larger than a repetition factor and frequency hopping is not configured for the SRS resource. For example, communication device 300 may obtain information that implicitly indicates to the communication device to transmit the first SRS at the first time instance and the second SRS at the second time instance. In a further embodiment, the method includes obtaining information that explicitly indicates to the communication device to transmit the first SRS at the first time instance and the second SRS at the second time instance. In such embodiment, the information that explicitly indicates to the communication device to transmit the first SRS at the first time instance and the second SRS at the second time instance a parameter in a Radio Resource Control, RRC, message. In another example, communication device 300 may obtain information that explicitly indicates to the communication device to transmit the first SRS at the first time instance and the second SRS at the second time instance. Additional examples and embodiments of the communication device obtaining the information implicitly or explicitly are also discussed above with regards to FIGS. 25-28.

In another embodiment, the method includes transmitting SRSs at multiple different time instances with gap periods between each different time instance of the multiple different times instances. For example, communication device 300 transmits SRSs at multiple different time instances with gap periods between each different time instance of the multiple different times instances. In one embodiment, the multiple different time instances are uniform throughout the time period. In an alternative embodiment, the multiple different time instances are non-uniform throughout the time period. Additional examples and embodiments of the communication device transmitting SRSs at multiple different time instances with gap periods between each different time instance of the multiple different times instances is discussed above with regards to FIGS. 25-28.

In a further embodiment, the multiple different time instances comprise the first time instance at a beginning of the SRS resource and the second time instance at an end of the SRS resource. In this embodiment, the SRSs are divided equally between the first time instance and the second time instance. In some embodiments, the multitude of SRS sets are transmitted in a same or a different slot. A union or a subset of all SRS resources of the multitude of SRS resource sets are transmitted phase coherently and separated in a time domain according to some embodiments. Additional examples and embodiments of the communication device transmitting a multitude of SRS sets is also discussed herein above.

In some embodiments, the method may also include transmitting uplink signals during the gap period according to some embodiments, as illustrated by block 3304 of FIG. 38. In some embodiments, method includes obtaining information from a RAN node that configures the communication device to transmit uplink signals during the gap period. For example, communication device 300 may obtain information from RAN 400 that configures communication device 300 to transmit uplink signals during the gap period. Additional examples and embodiments with regards to transmission of uplink signals in the gap period by the communication device are also discussed herein above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 39:
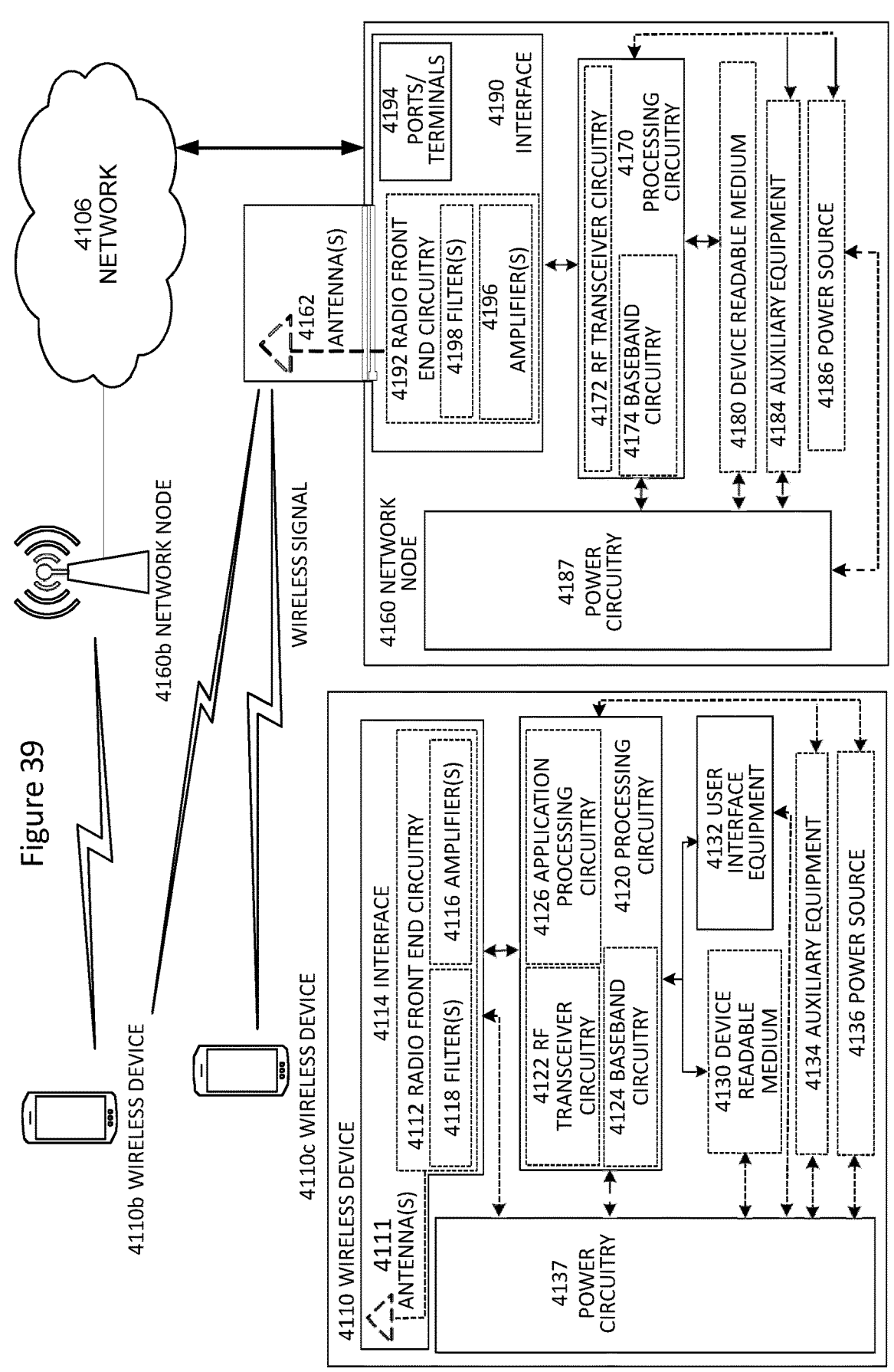
FIG. 39 is a block diagram of a wireless network in accordance with some embodiments of the present disclosure.

FIG. 39 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 39. For simplicity, the wireless network of FIG. 39 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G (2nd Generation), 3G (3rd Generation), 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes, e.g., MSCs (Mobile Switching Centres), MMEs (Mobility Management Entities), O&M (Operation and Maintenance) nodes, OSS (Operations Support System) nodes, SON (Self Optimized Network) nodes, positioning nodes, e.g., E-SMLCs (Evolved-Serving Mobile Location Centres), and/or MDT (Minimization of Drive Tests) nodes.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 39, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 39 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA (Wide Code Division Multiplexing Access), LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units.

In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signaling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with base-band processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 39 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptopembedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc.

The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 40:
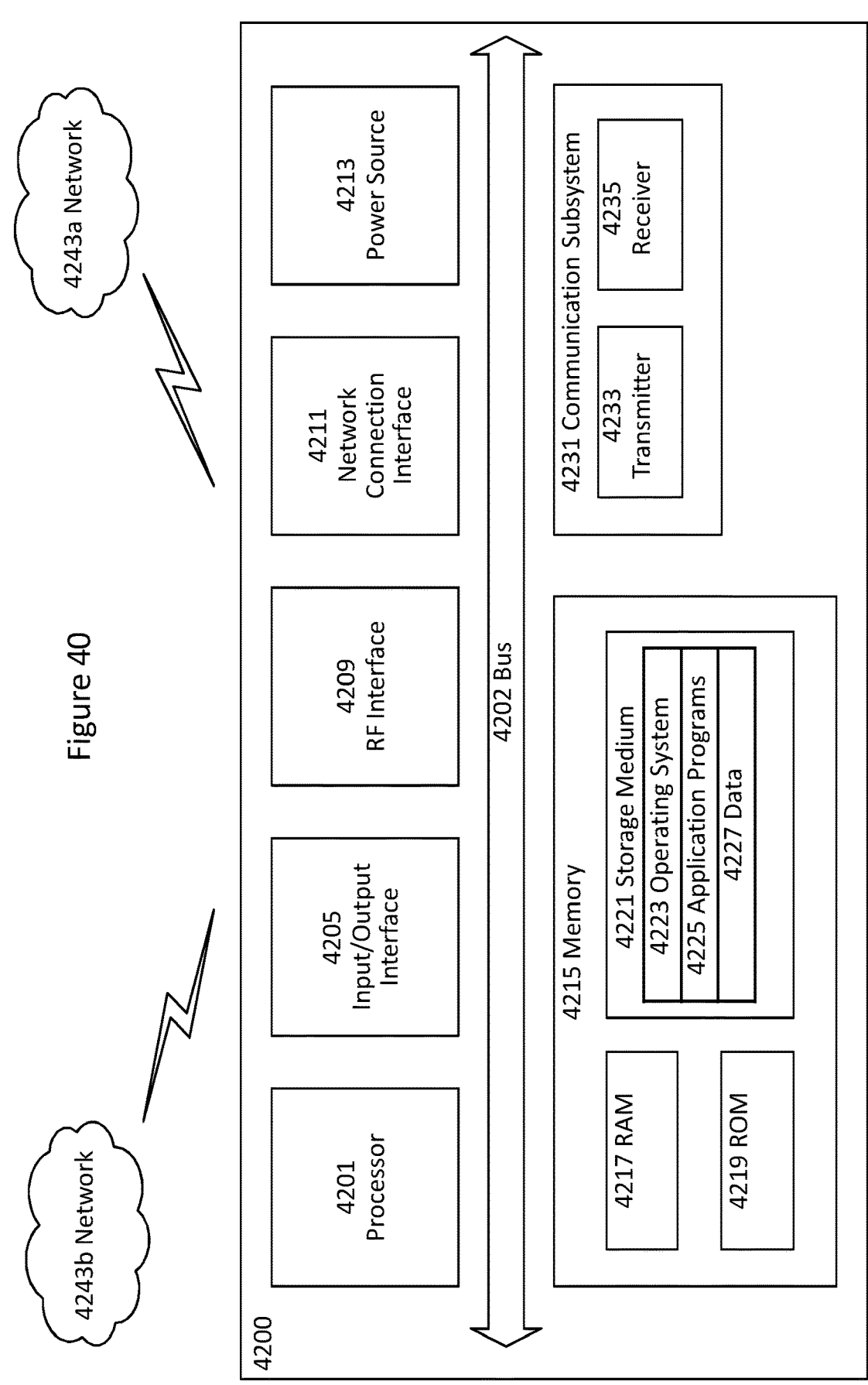
FIG. 40 is a block diagram of a user equipment in accordance with some embodiments of the present disclosure.

FIG. 40 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 40, is one example of a WD configured for communication in accordance with one or more communication standards promulgated by 3GPP, such as 3GPP's GSM, UMTS, LTE, and/or 5G standards. As mentioned previously, the term WD and UE may be used interchangeable. Accordingly, although FIG. 40 is a UE, the components discussed herein are equally applicable to a WD, and vice-versa.

In FIG. 40, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 40, or only a subset of the components. The level of integration between the components may vary from one UE to another UE. Further, certain UEs may contain multiple instances of a component, such as multiple processors, memories, transceivers, transmitters, receivers, etc.

In FIG. 40, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 40, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 40, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN (Universal Terrestrial Radio Access Network), WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 41:
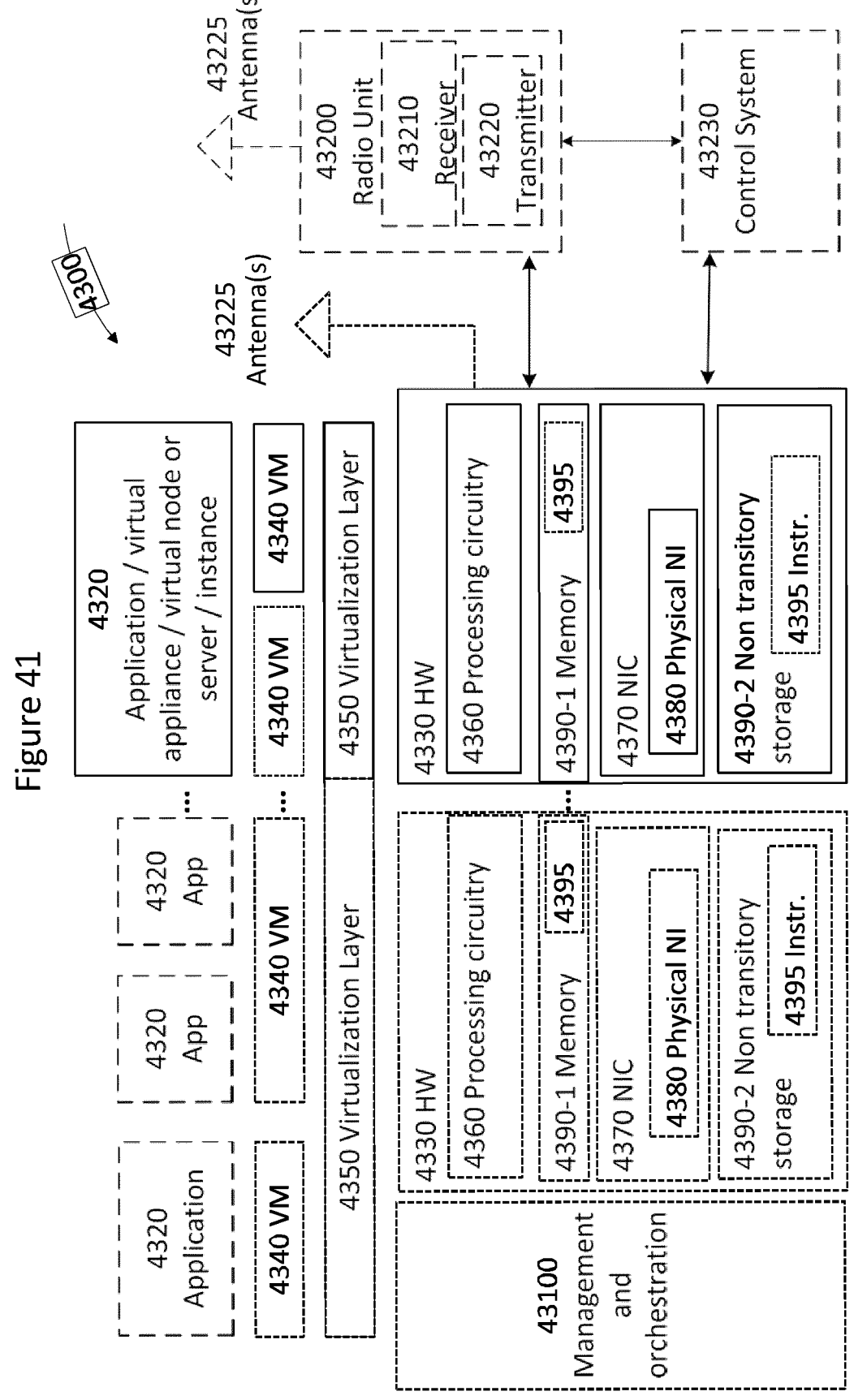
FIG. 41 is a block diagram of a virtualization environment in accordance with some embodiments of the present disclosure.

FIG. 41 illustrates a virtualization environment in accordance with some embodiments. FIG. 41 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 41, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 41.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signaling can be effected with the use of control system 43230 which may alternatively be used for communication between the hardware nodes 4330 and radio units 43200.

Figure 42:
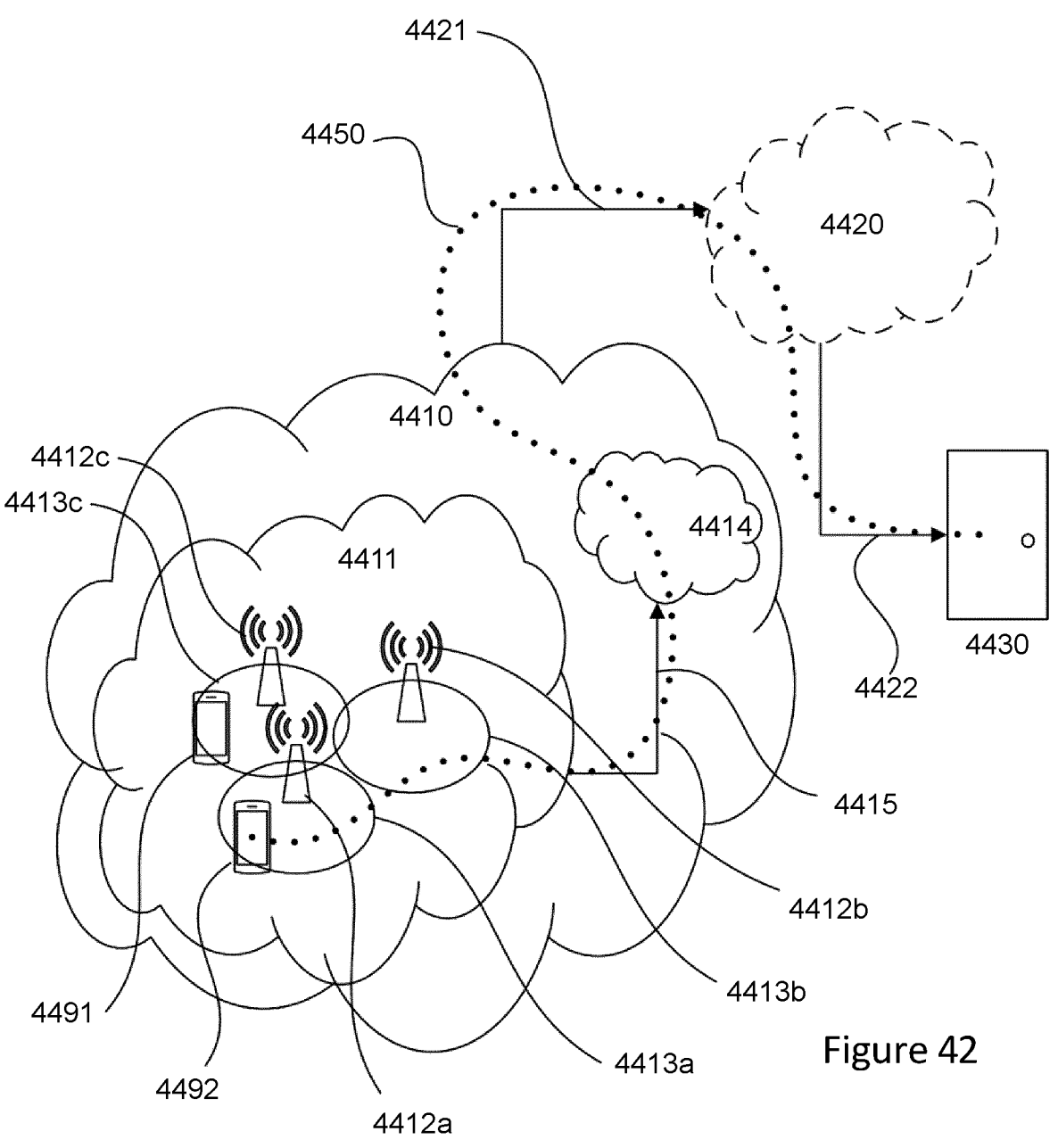
FIG. 42 is a block diagram of a telecommunication network connected via an intermediate network to a host computer in accordance with some embodiments of the present disclosure.

FIG. 42 illustrates a telecommunication network connected via an intermediate network to a host computer in accordance with some embodiments. With reference to FIG. 42, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 42 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 43:
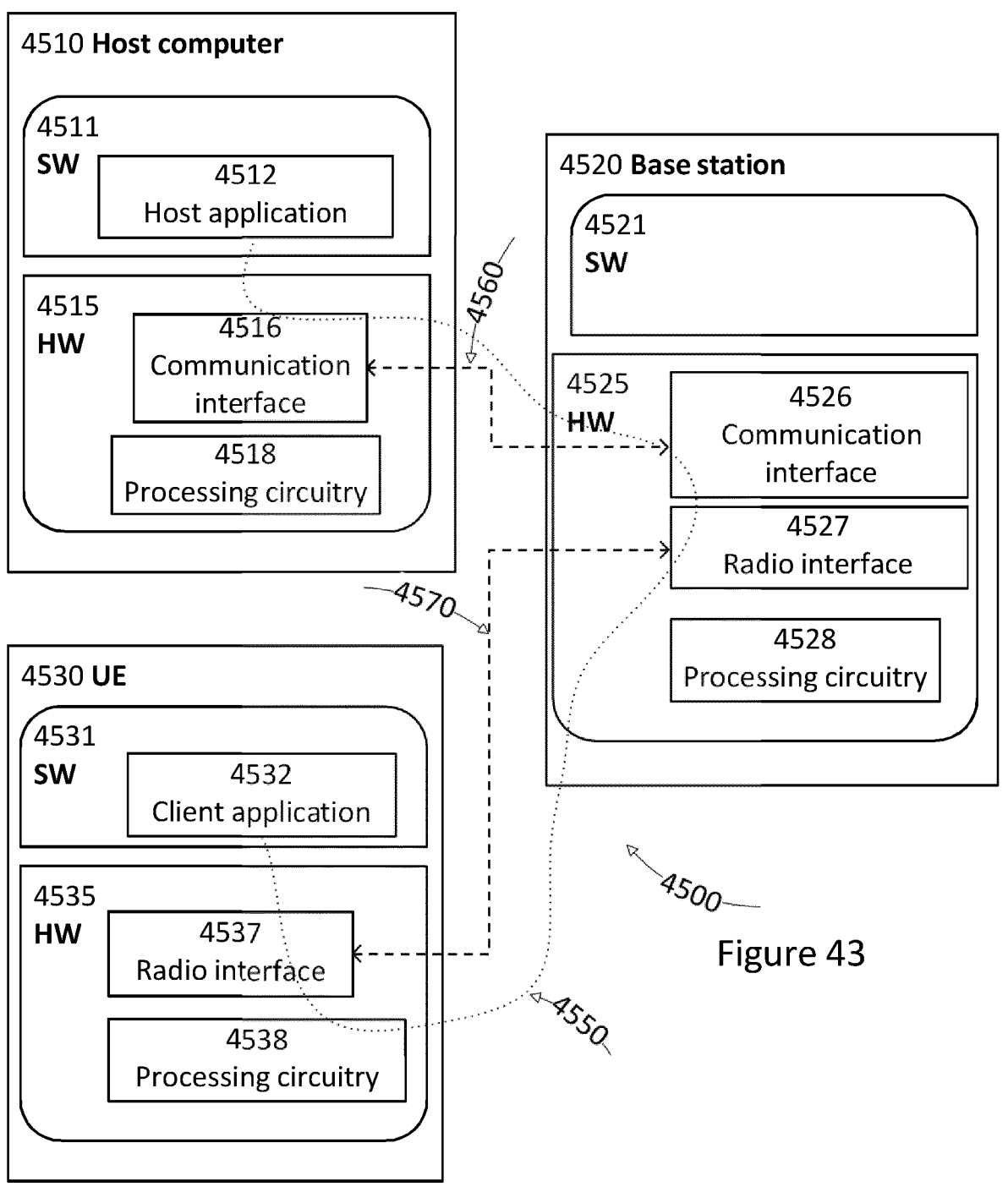
FIG. 43 is a block diagram of a host computer communicating via a base station with a user equipment over a partially wireless connection in accordance with some embodiments of the present disclosure.

FIG. 43 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 43. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 43) served by base station 4520. Communication interface 4526 may be configured to facilitate connection 4560 to host computer 4510. Connection 4560 may be direct or it may pass through a core network (not shown in FIG. 43) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 43 may be similar or identical to host computer 4430, one of base stations 4412a, 4412b, 4412c and one of UEs 4491, 4492 of FIG. 42, respectively. This is to say, the inner workings of these entities may be as shown in FIG. 43 and independently, the surrounding network topology may be that of FIG. 42.

In FIG. 43, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. In particular, the wireless connection 4570 may be based on SRS transmitted using a gap period as explained above, in particular based on Doppler estimation using the SRS. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 44:
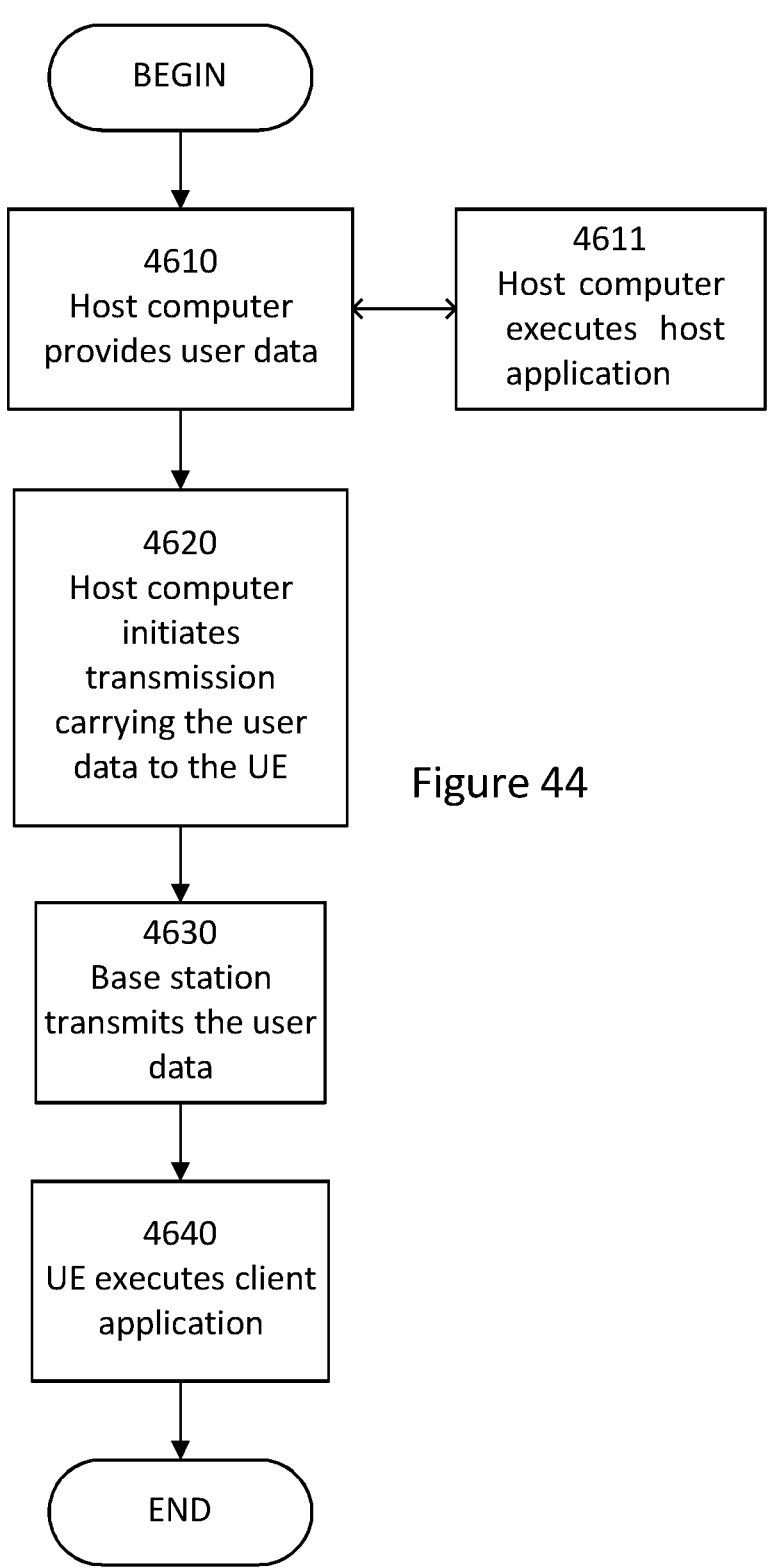
FIG. 44 is a block diagram of methods implemented in a communication system including a host computer, a base station and a user equipment in accordance with some embodiments of the present disclosure.

FIG. 44 illustrates methods implemented in a communication system including a host computer, a base station and a user equipment in accordance with some embodiments. FIG. 44 is a flowchart illustrating a method implemented in a communication system, in accordance with one embodiment. The communication system includes a host computer, a base station and a UE which may be those described with reference to FIGS. 42 and 43. For simplicity of the present disclosure, only drawing references to FIG. 44 will be included in this section. In step 4610, the host computer provides user data. In sub step 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 45:
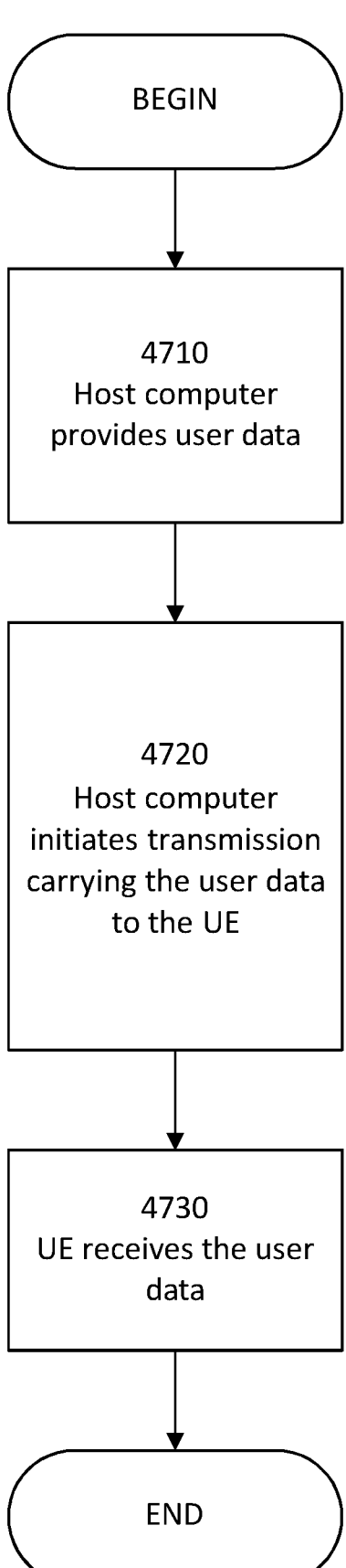
FIG. 45 is a block diagram of methods implemented in a communication system including a host computer, a base station and a user equipment in accordance with some embodiments of the present disclosure.

FIG. 45 illustrates methods implemented in a communication system including a host computer, a base station and a user equipment in accordance with some embodiments. FIG. 45 is a flowchart illustrating a method implemented in a communication system, in accordance with one embodiment. The communication system includes a host computer, a base station and a UE which may be those described with reference to FIGS. 42 and 43. For simplicity of the present disclosure, only drawing references to FIG. 45 will be included in this section. In step 4710 of the method, the host computer provides user data. In an optional sub step (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 46:
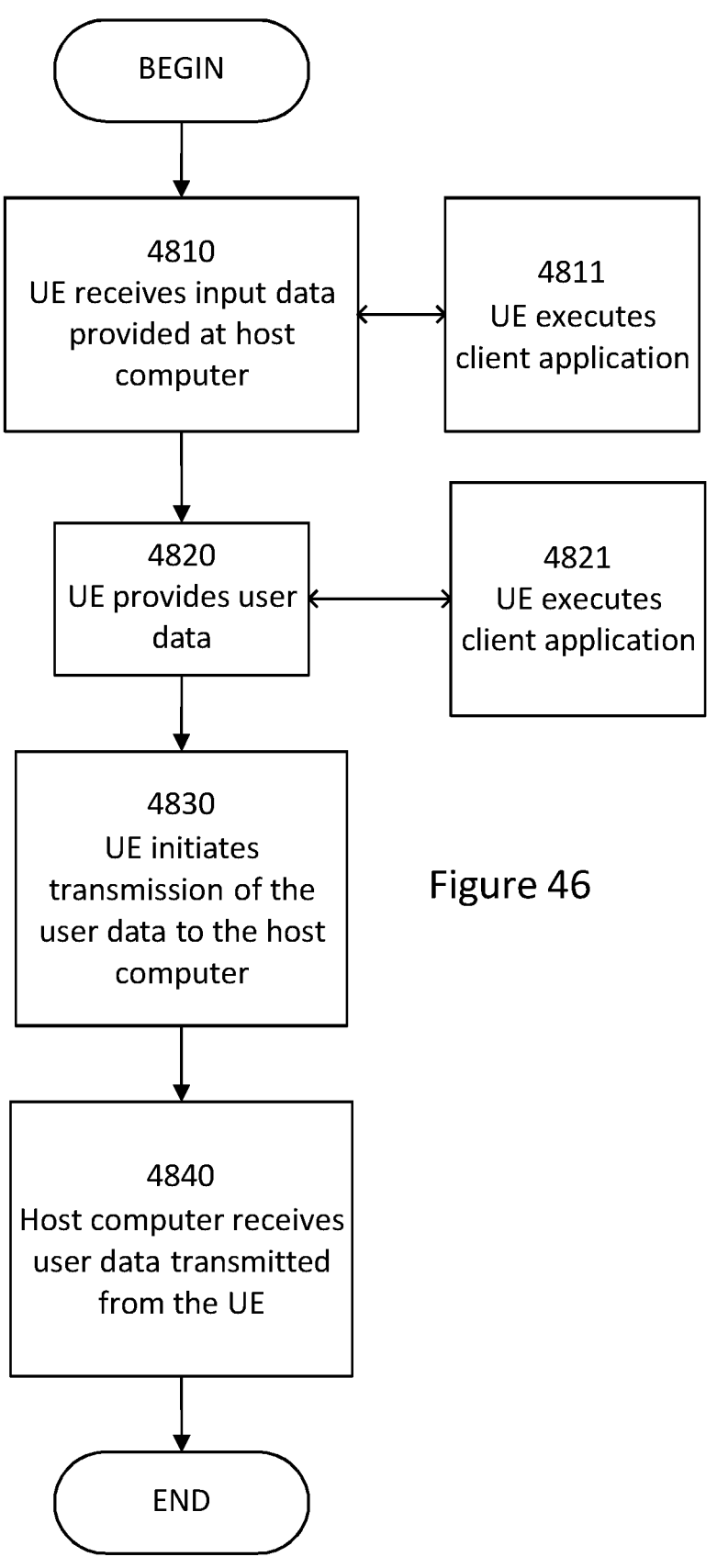
FIG. 46 is a block diagram of methods implemented in a communication system including a host computer, a base station and a user equipment in accordance with some embodiments of the present disclosure.

FIG. 46 illustrates methods implemented in a communication system including a host computer, a base station and a user equipment in accordance with some embodiments. FIG. 46 is a flowchart illustrating a method implemented in a communication system, in accordance with one embodiment. The communication system includes a host computer, a base station and a UE which may be those described with reference to FIGS. 42 and 43. For simplicity of the present disclosure, only drawing references to FIG. 46 will be included in this section. In step 4810 (which may be optional), the UE receives input data provided by the host computer. Additionally or alternatively, in step 4820, the UE provides user data. In sub step 4821 (which may be optional) of step 4820, the UE provides the user data by executing a client application. In sub step 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in sub step 4830 (which may be optional), transmission of the user data to the host computer. In step 4840 of the method, the host computer receives the user data transmitted from the UE, in accordance with the teachings of the embodiments described throughout this disclosure.

Figure 47:
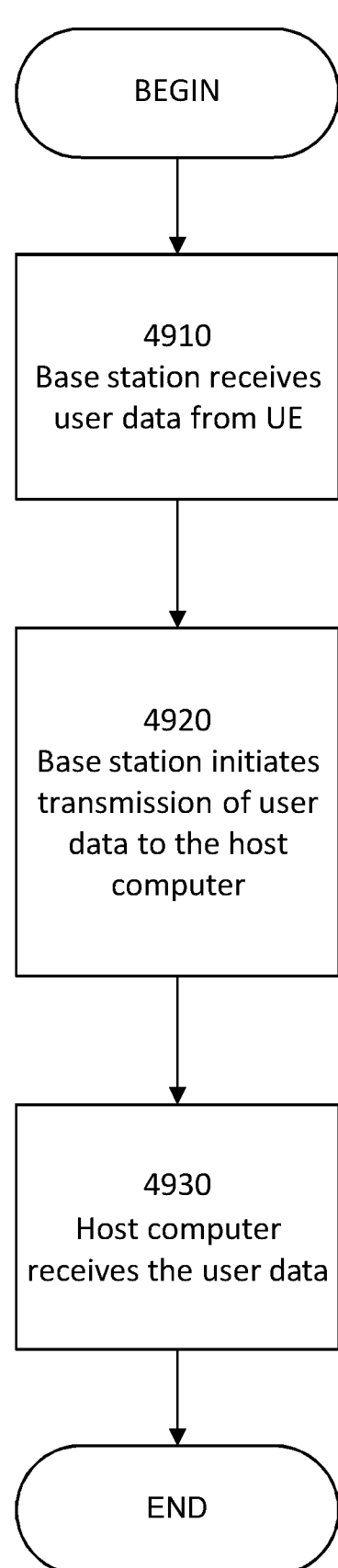
FIG. 47 is a block diagram of methods implemented in a communication system including a host computer, a base station and a user equipment in accordance with some embodiments of the present disclosure.

FIG. 47 illustrates methods implemented in a communication system including a host computer, a base station and a user equipment in accordance with some embodiments.

FIG. 47 is a flowchart illustrating a method implemented in a communication system, in accordance with one embodiment. The communication system includes a host computer, a base station and a UE which may be those described with reference to FIGS. 42 and 43. For simplicity of the present disclosure, only drawing references to FIG. 47 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flow- 53 54 chart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Example embodiments are also discussed below.

Example Embodiment 1

A method of operating a radio access network, RAN, node (400) in a communication network, the method comprising:
configuring (3200) a communication device (300) operating in the communication network to transmit a first Sounding Reference Signal, SRS, at a first time instance and a second SRS at a second time instance separated in time by a gap period from the first time instance; and
configuring (3202) the communication device (300) to transmit the first SRS and the second SRS using a same antenna port and to not transmit other SRS signals from the same antenna port during the gap period.

Example Embodiment 2

The method according to Example Embodiment 1, wherein the first SRS and the second SRS are configured as a same SRS resource.

Example Embodiment 3

The method according to Example Embodiment 1, wherein the first SRS and the second SRS are configured as different SRS resources.

Example Embodiment 4

The method according any one of Example Embodiments 1-3, wherein the gap period comprises one or more OFDM symbols.

Example Embodiment 5

The method according to any one of Example Embodiments 1-4, further comprising:
configuring the communication device (300) to transmit the first and second SRS in a same slot.

Example Embodiment 6

The method according to any one of Example Embodiments 1-4, further comprising:
configuring the communication device (300) to transmit the first and second SRS in different slots.

Example Embodiment 7

The method according to any one of Example Embodiments 3-6, wherein configuring (3200) the communication device (300) to transmit the first SRS at the first time instance and the second SRS at the second time instance comprises:
providing a SRS resource set to the communication device (300), the SRS resource set defining SRS resources to transmit the SRS at the first time instance and the second SRS signal at the second time instance.

Example Embodiment 8

The method according to Example Embodiment 7, wherein providing the SRS resource set comprises:
configuring the communication device (300) with a higher layer parameter that indicates that two or more SRS resources of the SRS resource set are to be transmitted with a same antenna port of the communication device (300).

Example Embodiment 9

The method according to Example Embodiment 7, wherein providing the SRS resource set comprises:
configuring the communication device (300) with a higher layer parameter that exceeds a maximum port switching capability of the communication device (300) which forces the communication device (300) to transmit using the same antenna port of the communication device (300).

Example Embodiment 10

The method according to Example Embodiment 7, wherein providing the SRS resource set comprises:
providing a first parameter and a second parameter per SRS resource of the SRS resource set, wherein the first parameter indicates the communicate device (300) is to repeat a SRS transmission and the second parameter indicates a gap period between each repetition of a SRS transmission.

Example Embodiment 11

The method according to any one of Example Embodiments 9-10, wherein providing the SRS resource set comprises:

providing a parameter that indicates the communication device (300) is to repeat the SRS transmission within each transmission instance.

Example Embodiment 12

The method according to any one of Example Embodiments 9-11, wherein the gap period is between a last symbol of an SRS resource transmission occasion and a first symbol of a subsequent SRS resource transmission occasion.

Example Embodiment 13

The method according to any one of Example Embodiments 1, 2, and 7, wherein configuring (3200) the communication device (300) operating in the communication network to transmit the first SRS at the first time instance and the second SRS at the second time instance comprises:
communicating information that implicitly indicates to the communication device (300) to transmit the first SRS at the first time instance and the second SRS at the second time instance.

Example Embodiment 14

The method according to Example Embodiment 13, wherein the information that implicitly indicates to the communication device (300) to transmit the first SRS at the first time instance and the second SRS at the second time instance comprises a number of symbols for a SRS resource that is larger than a repetition factor and frequency hopping is not configured for the SRS resource.

Example Embodiment 15

The method according to Example Embodiment 7, wherein configuring (3200) the communication device (300) operating in the communication network to transmit the first SRS at the first time instance and the second SRS at the second time instance comprises:
communicating information that explicitly indicates to the communication device (300) to transmit the first SRS at the first time instance and the second SRS at the second time instance.

Example Embodiment 16

The method according to Example Embodiment 15, wherein communicating information that explicitly indicates to the communication device (300) to transmit the first SRS at the first time instance and the second SRS at the second time instance comprises:
including a parameter in a Radio Resource Control, RRC, message to the communication device (300) explicitly indicating to the communication device (300) to transmit the first SRS at the first time instance and the second SRS at the second time instance.

Example Embodiment 17

The method according to Example Embodiment 1, wherein configuring (3200) the communication device (300) operating in the communication network to transmit the first SRS at the first time instance and the second SRS at the second time instance comprises:
configuring the communication device (300) to transmit SRSs at multiple different time instances with gap periods between each different time instance of the multiple different times instances.

Example Embodiment 18

The method according to Example Embodiment 17, wherein the multiple different time instances are uniform throughout the time period.

Example Embodiment 19

The method according to Example Embodiment 17, wherein the multiple different time instances are non-uniform throughout the time period.

Example Embodiment 20

The method according to Example Embodiment 17, wherein the multiple different time instances comprises the first time instance at a beginning of the SRS resource and the second time instance at an end of the SRS resource; and
wherein the SRSs are divided equally between the first time instance and the second time instance.

Example Embodiment 21

The method according to Example Embodiment 20, wherein a multitude of SRS sets are configured to be transmitted in a same or a different slot.

Example Embodiment 22

The method according to Example Embodiment 20, wherein a union or a subset of all SRS resources of the multitude of SRS resource sets are configured to be transmitted phase coherently and separated in a time domain

Example Embodiment 23

The method according to Example Embodiment 1, further comprising:
configuring (3204) the communication device (300) to transmit uplink signals during the gap period.

Example Embodiment 24

The method according to Example Embodiment 23, wherein configuring (3204) the communication device (300) to transmit uplink signals during the gap period comprises:
determining the communication device (300) is capable of transmitting uplink signals during the gap period based on capability information associated with the communication device (300); and
configuring the communication device (300) to transmit uplink signals during the gap period based on determining the communication device (300) is capable of transmitting uplink signals during the gap period.

Example Embodiment 25

A method of operating a communication device (300) in a communication network, the method comprising:
transmitting (3300) a first Sounding Reference Signal, SRS, at a first time instance and a second SRS at a second time instance separated in time by a gap period from the first time instance; and transmitting (3302) the first SRS and the second SRS using a same antenna port and refraining from transmitting other SRS signals from the same antenna port during the gap period.

Example Embodiment 26

The method according to Example Embodiment 25, wherein the first SRS and the second SRS are configured as a same SRS resource.

Example Embodiment 27

The method according to Example Embodiment 25, wherein the first SRS and the second SRS are configured as different SRS resources.

Example Embodiment 28

The method according any one of Example Embodiments 25-27, wherein the gap period comprises one or more OFDM symbols.

Example Embodiment 29

The method according to any one of Example Embodiments 25-28, further comprising:
transmitting the first and second SRS in a same slot.

Example Embodiment 30

The method according to any one of Example Embodiments 25-28, further comprising:
transmitting the first and second SRS in different slots.

Example Embodiment 31

The method according to any one of Example Embodiments 27-30, further comprising:
obtaining a SRS resource set from a radio access network, RAN, node (400), the SRS resource set defining SRS resources to transmit the first SRS at the first time instance and the second SRS at the second time instance.

Example Embodiment 32

The method according to Example Embodiment 31, wherein obtaining the SRS resource set comprises:
obtaining a higher layer parameter that indicates that two or more SRS resources of the SRS resource set are to be transmitted with a same antenna port of the communication device (300).

Example Embodiment 33

The method according to Example Embodiment 31, wherein obtaining the SRS resource set from a RAN node (400) comprises:
obtaining a higher layer parameter from the RAN node that exceeds a maximum port switching capability of the communication device (300) which forces the communication device (300) to transmit the first and second SRS using the same antenna port of the communication device (300).

Example Embodiment 34

The method according to Example Embodiment 31, wherein obtaining the SRS resource set from a RAN node (400) comprises:
obtaining a first parameter and a second parameter per SRS resource of the SRS resource set, wherein the first parameter indicates the communicate device (300) is to repeat a SRS transmission and the second parameter indicates a gap period between each repetition of a SRS transmission.

Example Embodiment 35

The method according to any one of Example Embodiments 33-34, wherein obtaining the SRS resource set from a RAN node (400) comprises:
obtaining a parameter that indicates the communication device (300) is to repeat the SRS transmission within each transmission instance.

Example Embodiment 36

The method according to any one of Example Embodiments 34-35, wherein the gap period is between a last symbol of an SRS resource transmission occasion and a first symbol of a subsequent SRS resource transmission occasion.

Example Embodiment 37

The method according to any one of Example Embodiments 25-26 and 31, further comprising: obtaining information that implicitly indicates to the communication device (300) to transmit the first SRS at the first time instance and the second SRS at the second time instance.

Example Embodiment 38

The method according to Example Embodiment 37, wherein the information that implicitly indicates to the communication device (300) to transmit the first SRS at the first time instance and the second SRS at the second time instance comprises a number of symbols for a SRS resource that is larger than a repetition factor and frequency hopping is not configured for the SRS resource.

Example Embodiment 39

The method according to Example Embodiment 31, further comprising:
obtaining information that explicitly indicates to the communication device (300) to transmit the first SRS at the first time instance and the second SRS at the second time instance.

Example Embodiment 40

The method according to Example Embodiment 39, wherein the information that explicitly indicates to the communication device (300) to transmit the first SRS at the first time instance and the second SRS at the second time instance a parameter in a Radio Resource Control, RRC, message.

Example Embodiment 41

The method according to Example Embodiment 25, wherein transmitting (3300) the first SRS at the first time instance and the second SRS at the second time instance comprises:
   transmitting SRSs at multiple different time instances with gap periods between each different time instance of the multiple different times instances.

Example Embodiment 42

The method according to Example Embodiment 41, wherein the multiple different time instances are uniform throughout the time period.

Example Embodiment 43

The method according to Example Embodiment 41, wherein the multiple different time instances are non-uniform throughout the time period.

Example Embodiment 44

The method according to Example Embodiment 41, wherein the multiple different time instances comprises the first time instance at a beginning of the SRS resource and the second time instance at an end of the SRS resource; and
   wherein the SRSs are divided equally between the first time instance and the second time instance.

Example Embodiment 45

The method according to Example Embodiment 44, wherein a multitude of SRS sets are transmitted in a same or a different slot.

Example Embodiment 46

The method according to Example Embodiment 45, wherein a union or a subset of all SRS resources of the multitude of SRS resource sets are transmitted phase coherently and separated in a time domain

Example Embodiment 47

The method according to Example Embodiment 25, further comprising:
   transmitting (3304) uplink signals during the gap period.

Example Embodiment 48

The method according to Example Embodiment 47, wherein transmitting (3304) uplink signals during the gap period comprises:
   obtaining information from a RAN node (400) that configures the communication device (300) to transmit uplink signals during the gap period.

Example Embodiment 49

A communication device (300) comprising:
processing circuitry (303); and
memory (305) coupled with the processing circuitry, wherein the memory includes instructions that when executed by the processing circuitry causes the communication device to perform operations according to any of Example Embodiments 25-48.

Example Embodiment 50

A communication device (300) adapted to perform according to any of Example Embodiments 25-48.

Example Embodiment 51

A computer program comprising program code to be executed by processing circuitry (303) of a communication device (300), whereby execution of the program code causes the communication device (300) to perform operations according to any of Example Embodiments 25-48.

Example Embodiment 52

A computer program product comprising a non-transitory storage medium including program code to be executed by processing circuitry (303) of a communication device (300), whereby execution of the program code causes the communication device (300) to perform operations according to any of Example Embodiments 25-48.

Example Embodiment 53

A radio access network, RAN, node (400) comprising:
   processing circuitry (403); and
   memory (405) coupled with the processing circuitry, wherein the memory includes instructions that when executed by the processing circuitry causes the RAN node to perform operations according to any of Example Embodiments 1-24.

Example Embodiment 54

A radio access network, RAN, node (400) adapted to perform according to any of Example Embodiments 1-24.

Example Embodiment 55

A computer program comprising program code to be executed by processing circuitry (403) of a radio access network, RAN, node (400), whereby execution of the program code causes the RAN node (400) to perform operations according to any of Example Embodiments 1-24.

Example Embodiment 56

A computer program product comprising a non-transitory storage medium including program code to be executed by processing circuitry (403) of a radio access network, RAN, node (400), whereby execution of the program code causes the RAN node (400) to perform operations according to any of Example Embodiments 1-24.

The invention claimed is:
   1. A method of operating a radio access network (RAN) node in a communication network, the method comprising:
   configuring a communication device operating in the communication network to transmit a first Sounding Reference Signal (SRS) at a first time instance and a second SRS at a second time instance separated in time by a gap period from the first time instance;

configuring the communication device to transmit the first SRS and the second SRS using a same antenna port and to not transmit other SRS signals from the same antenna port during the gap period;

configuring the communication device to transmit the first SRS and the second SRS in different slots; and configuring the communication device to transmit uplink signals during the gap period, wherein configuring the communication device to transmit uplink signals during the gap period comprises:

determining that the communication device is capable of transmitting uplink signals during the gap period based on capability information associated with the communication device; and configuring the communication device to transmit uplink signals during the gap period based on determining the communication device is capable of transmitting uplink signals during the gap period.

2. The method according to claim 1, wherein configuring the communication device to transmit the first SRS at the first time instance and the second SRS at the second time instance comprises providing a SRS resource set to the communication device, the SRS resource set defining SRS resources to transmit the first SRS at the first time instance and the second SRS signal at the second time instance.

3. The method according to claim 2, wherein providing the SRS resource set comprises configuring the communication device with a higher layer parameter that exceeds a maximum port switching capability of the communication device, thereby forcing the communication device to transmit the first SRS and the second SRS using the same antenna port of the communication device.

4. The method according to claim 1, wherein configuring the communication device to transmit the first SRS at the first time instance and the second SRS at the second time instance comprises communicating information that implicitly indicates to the communication device to transmit the first SRS at the first time instance and the second SRS at the second time instance, wherein the information that implicitly indicates to the communication device to transmit the first SRS at the first time instance and the second SRS at the second time instance comprises a number of symbols for an SRS resource that is larger than a repetition factor when frequency hopping is not configured for the SRS resource.

5. The method of claim 1, further comprising:

receiving the first SRS in the first time instance and receiving the second SRS in the second time instance separated in time by the gap period, wherein the first SRS and the second SRS are received in different slots; and based on the first SRS and the second SRS, estimating a Doppler frequency shift of carrier signals used in communication between the communication device and the communication network.

6. The method of claim 5, further comprising using the estimated Doppler frequency shift to pre-compensate for Doppler effects in communication signals transmitted to or from the communication device.

7. A method of operating a communication device in a communication network, the method comprising:

transmitting a first Sounding Reference Signal (SRS) at a first time instance and a second SRS at a second time instance separated in time by a gap period from the first time instance;

transmitting the first SRS and the second SRS using a same antenna port and without transmitting other SRS signals from the same antenna port during the gap period, wherein transmitting the first SRS and the second SRS comprises transmitting the first SRS and the second SRS in different slots;

obtaining information from a radio access network (RAN) node that configures the communication device to transmit uplink signals during the gap period; and transmitting uplink signals during the gap period.

8. The method according to claim 7, further comprising obtaining an SRS resource set from a radio access network (RAN) node, the SRS resource set defining SRS resources to transmit the first SRS at the first time instance and the second SRS at the second time instance.

9. The method according to claim 8, wherein obtaining the SRS resource set from a RAN node comprises obtaining a higher layer parameter from the RAN node that exceeds a maximum port switching capability of the communication device thereby forcing the communication device to transmit the first SRS and the second SRS using the same antenna port of the communication device.

10. The method according to claim 7, further comprising obtaining information that implicitly indicates to the communication device to transmit the first SRS at the first time instance and the second SRS at the second time instance, wherein the information that implicitly indicates to the communication device to transmit the first SRS at the first time instance and the second SRS at the second time instance comprises a number of symbols for a SRS resource that is larger than a repetition factor when frequency hopping is not configured for the SRS resource.

11. The method according to claim 7, further comprising transmitting capability information associated with the communication device based on which is determinable that the communication device is capable of transmitting uplink signals during the gap period.

12. The method of claim 7, wherein transmitting the first SRS and the second SRS comprises transmitting the first SRS and the second SRS phase coherently across the different slots even with the uplink signals transmitted during the gap period between the first and second time instances.

13. A radio access network (RAN) node for a communication network, comprising:

processing circuitry; and memory coupled with the processing circuitry, wherein the memory includes instructions that when executed by the processing circuitry causes the RAN node to:

configure a communication device operating in the communication network to transmit a first Sounding Reference Signal (SRS) at a first time instance and a second SRS at a second time instance separated in time by a gap period from the first time instance;

configure the communication device to transmit the first SRS and the second SRS using a same antenna port and to not transmit other SRS signals from the same antenna port during the gap period;

configure the communication device to transmit the first SRS and the second SRS in different slots; and configure the communication device to transmit uplink signals during the gap period, by:

determining that the communication device is capable of transmitting uplink signals during the gap period based on capability information associated with the communication device; and configuring the communication device to transmit uplink signals during the gap period based on determining the communication device is capable of transmitting uplink signals during the gap period.

14. The RAN node of claim 13, wherein the memory includes instructions that when executed by the processing circuitry further causes the RAN node to:

receive the first SRS in the first time instance and receiving the second SRS in the second time instance separated in time by the gap period, wherein the first SRS and the second SRS are received in different slots; and based on the first SRS and the second SRS, estimate a Doppler frequency shift of carrier signals used in communication between the communication device and the communication network.

15. The RAN node of claim 14, wherein the memory includes instructions that when executed by the processing circuitry further causes the RAN node to use the estimated Doppler frequency shift to pre-compensate for Doppler effects in communication signals transmitted to or from the communication device.

16. A communication device for operation in a communication network, the communication device comprising:

processing circuitry; and memory coupled with the processing circuitry, wherein the memory includes instructions that when executed by the processing circuitry causes the communication device to:

transmit a first Sounding Reference Signal (SRS) at a first time instance and a second SRS at a second time instance separated in time by a gap period from the first time instance;

transmit the first SRS and the second SRS using a same antenna port and without transmitting other SRS signals from the same antenna port during the gap period, wherein the instructions cause the communication device to transmit the first SRS and the second SRS in different slots;

obtain information from a radio access network (RAN) node that configures the communication device to transmit the uplink signals during the gap period; and transmit uplink signals during the gap period.

17. The communication device according to claim 16, the memory including instructions that when executed by the processing circuitry causes the communication device to obtain an SRS resource set from a radio access network (RAN) node, the SRS resource set defining SRS resources to transmit the first SRS at the first time instance and the second SRS at the second time instance.

18. The communication device according to claim 17, the memory including instructions that when executed by the processing circuitry causes the communication device to obtain the SRS resource set from a RAN node by obtaining a higher layer parameter from the RAN node that exceeds a maximum port switching capability of the communication device thereby forcing the communication device to transmit the first SRS and the second SRS using the same antenna port of the communication device.

19. The communication device according to claim 17, the memory including instructions that when executed by the processing circuitry causes the communication device to obtain information that implicitly indicates to the communication device to transmit the first SRS at the first time instance and the second SRS at the second time instance, wherein the information that implicitly indicates to the communication device to transmit the first SRS at the first time instance and the second SRS at the second time instance comprises a number of symbols for a SRS resource that is larger than a repetition factor when frequency hopping is not configured for the SRS resource.

20. The communication device of claim 16, wherein the memory includes instructions that when executed by the processing circuitry causes the communication device to transmit the first SRS and the second SRS by transmitting the first SRS and the second SRS phase coherently across the different slots even with the uplink signals transmitted during the gap period between the first and second time instances.

* * * * *